(12) United States Patent
Hosaka

(10) Patent No.: US 9,538,163 B2
(45) Date of Patent: *Jan. 3, 2017

(54) IMAGE PROCESSING APPARATUS, IMAGE PROCESSING METHOD, AND PROGRAM

(71) Applicant: Sony Corporation, Tokyo (JP)

(72) Inventor: Hajime Hosaka, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/729,309

(22) Filed: Jun. 3, 2015

(65) Prior Publication Data
US 2015/0312551 A1    Oct. 29, 2015

Related U.S. Application Data

(63) Continuation of application No. 13/538,139, filed on Jun. 29, 2012, now Pat. No. 9,083,957.

(30) Foreign Application Priority Data

Jul. 11, 2011  (JP) .................................. 2011-152885

(51) Int. Cl.
*H04N 13/02* (2006.01)
*G03B 35/10* (2006.01)
(Continued)

(52) U.S. Cl.
CPC ............ *H04N 13/026* (2013.01); *G03B 35/00* (2013.01); *G03B 35/08* (2013.01); *G03B 35/10* (2013.01);
(Continued)

(58) Field of Classification Search
None
See application file for complete search history.

(56) References Cited

U.S. PATENT DOCUMENTS 8,982,190 B2    3/2015  Kobayashi et al.
9,083,957 B2 *  7/2015  Hosaka .............. H04N 13/0239
(Continued)

FOREIGN PATENT DOCUMENTS

CN    101995758 A    3/2011
JP    06-054991 B2    7/1994
(Continued)

*Primary Examiner* — William C Vaughn, Jr.
*Assistant Examiner* — Lindsay Uhl
(74) *Attorney, Agent, or Firm* — Chip Law Group

(57) ABSTRACT

There is provided an image processing apparatus including a first polarizing unit that has a first polarization region and a second polarization region to transmit different polarized light corresponding to different viewing point images, a second polarizing unit that includes a third polarization region to transmit only transmission light of the first polarization region, a fourth polarization region to transmit only transmission light of the second polarization region, and a total transmission region to transmit the total transmission light of the first polarization region and the second polarization region, an imaging element, and an image processing unit that executes signal processing with respect to an output signal of the imaging element. The image processing unit executes correction processing to generate a two-dimensional image and executes image conversion of the two-dimensional image to generate a left eye image and a right eye image for three-dimensional image display.

8 Claims, 32 Drawing Sheets

(51) Int. Cl.
*G03B 35/08* (2006.01)
*G03B 35/00* (2006.01)
*H04N 13/00* (2006.01)

(52) U.S. Cl.
CPC ...... *H04N 13/0018* (2013.01); *H04N 13/0203* (2013.01); *H04N 13/0217* (2013.01); *H04N 13/0239* (2013.01); *H04N 13/0271* (2013.01); *H04N 13/0285* (2013.01)

(56) References Cited

U.S. PATENT DOCUMENTS

| | | | |
|---|---|---|---|
| 2002/0054208 A1 | 5/2002 | Goldstein et al. | |
| 2002/0154215 A1 | 10/2002 | Schechterman et al. | |
| 2010/0283883 A1* | 11/2010 | Sato et al. | G02B 27/283 348/335 |
| 2011/0025829 A1* | 2/2011 | McNamer | H04N 13/021 348/50 |
| 2011/0033177 A1 | 2/2011 | Kuroki | |
| 2012/0307128 A1* | 12/2012 | Vorovitchik | G02B 27/288 348/336 |
| 2013/0016189 A1 | 1/2013 | Hosaka | |

FOREIGN PATENT DOCUMENTS

| | | |
|---|---|---|
| JP | 10-051812 A | 2/1998 |
| JP | 2000-078611 A | 3/2000 |
| JP | 2000-112019 A | 4/2000 |
| JP | 2001-016611 A | 1/2001 |
| JP | 2003-241075 A | 8/2003 |
| JP | 2003-523646 A | 8/2003 |
| JP | 2004-309868 A | 4/2004 |
| JP | 2010-041720 A | 2/2010 |
| JP | 2011-035853 A | 2/2011 |
| WO | WO 2007/029446 A1 | 3/2007 |

* cited by examiner

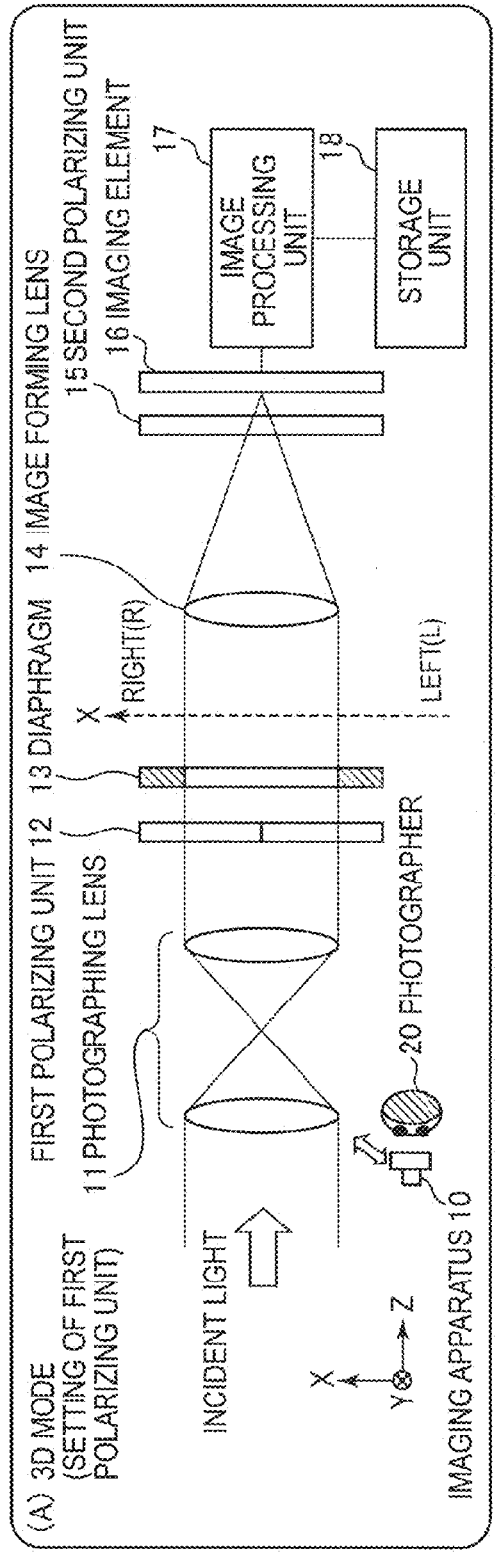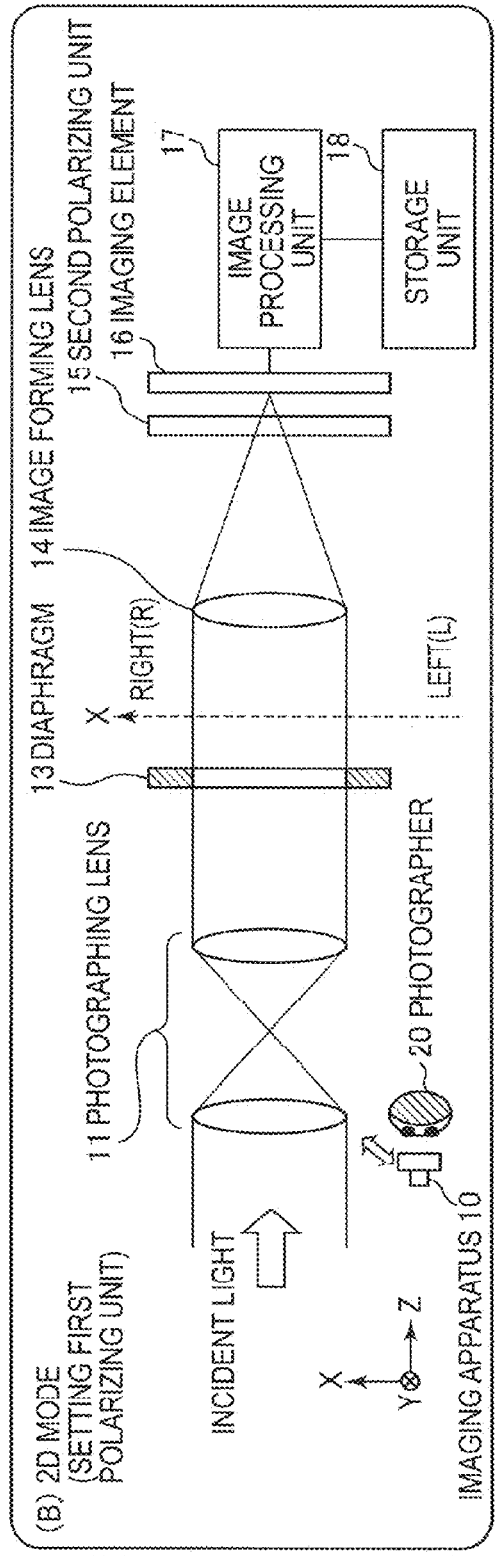

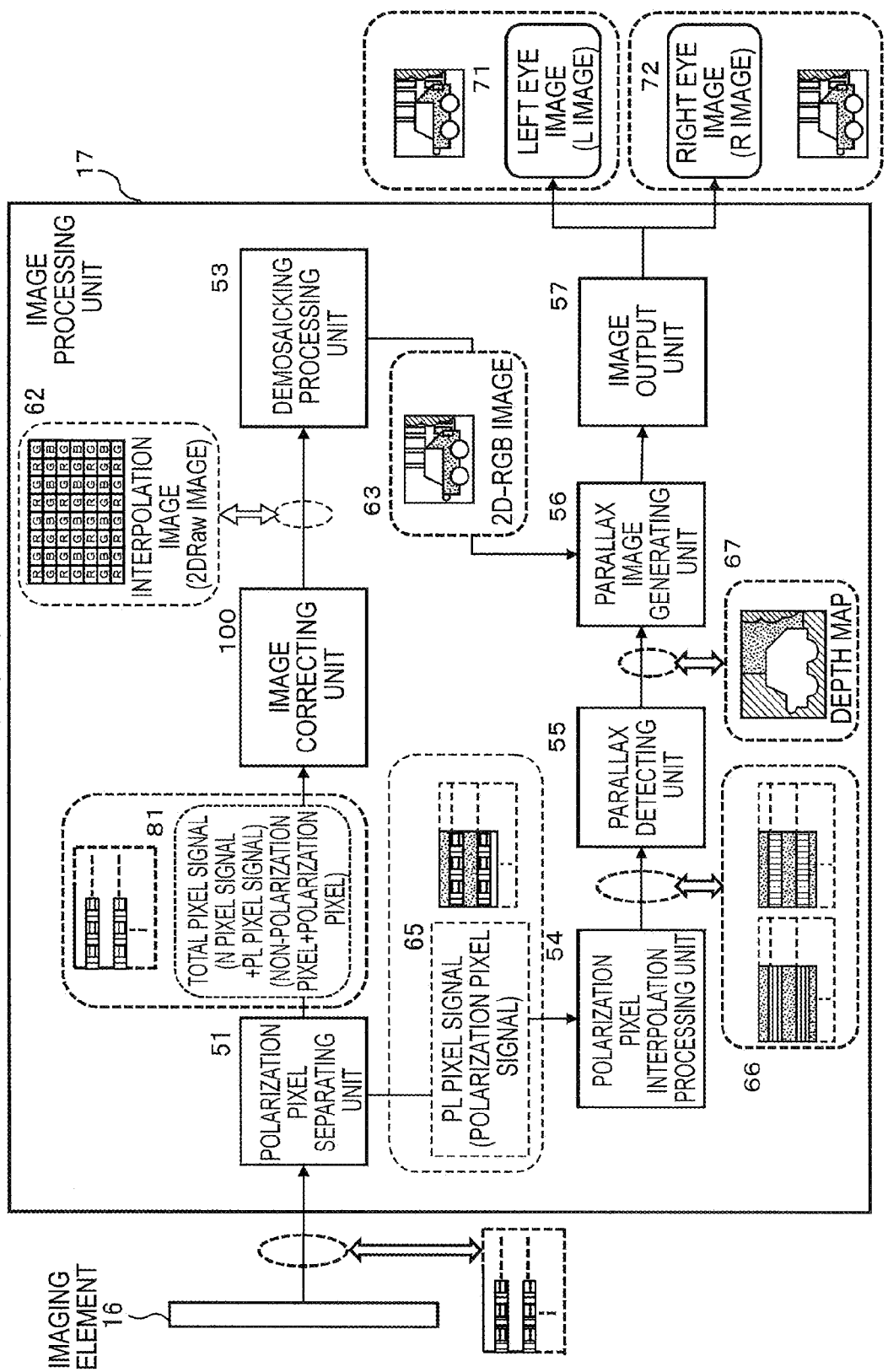

FIG. 13

| | |
|---|---|
| X COORDINATE ATTRIBUTE [X INDEX(xidx(x))] | $xidx(x) = ((x + xbase)\%4)$ |
| Y COORDINATE ATTRIBUTE [Y INDEX(yidx(x))] | $yidx(x) = \begin{cases} ((y+ybase)\%16)\|_{if\,(0\leq((y+ybase)\%16)<6)} \\ 5\|_{if\,((6\leq(y+ybase)\%16)\&((y+ybase)\%2=1)} \\ 0\|_{if\,((6\leq(y+ybase)\%16)\&((y+ybase)\%2=0)} \end{cases}$ |

IN THIS CASE, a%b IS OPERATOR TO CALCULATE REMAINDER OBTAINED BY DIVIDING a BY b. xbase AND ybase ARE CONSTANT VALUES TO ABSORB DIFFERENCE OF STARTING COORDINATES OF PIXEL ARRANGEMENT. min(a, b) IS OPERATOR TO SELECT SMALLER VALUE OF a AND b.

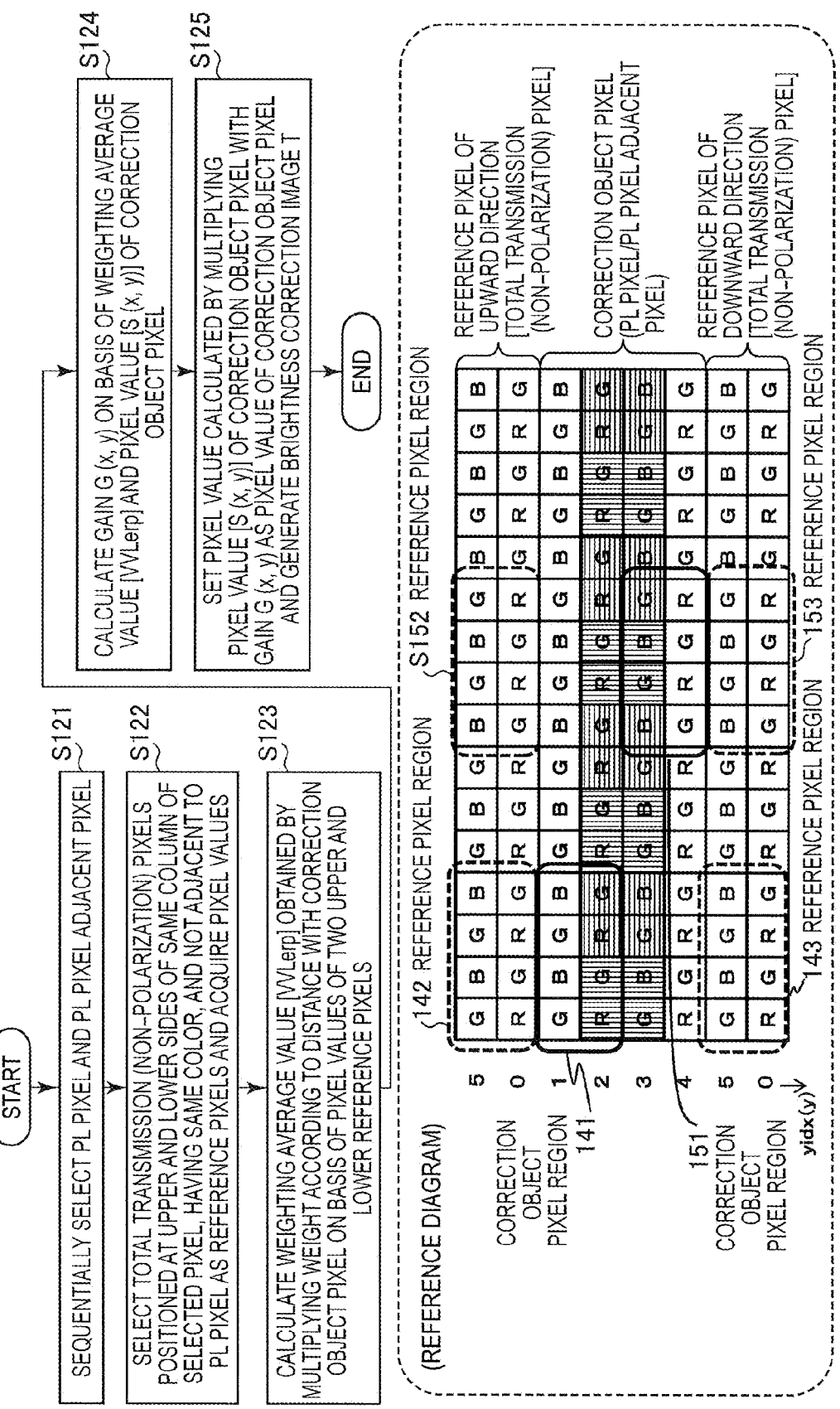

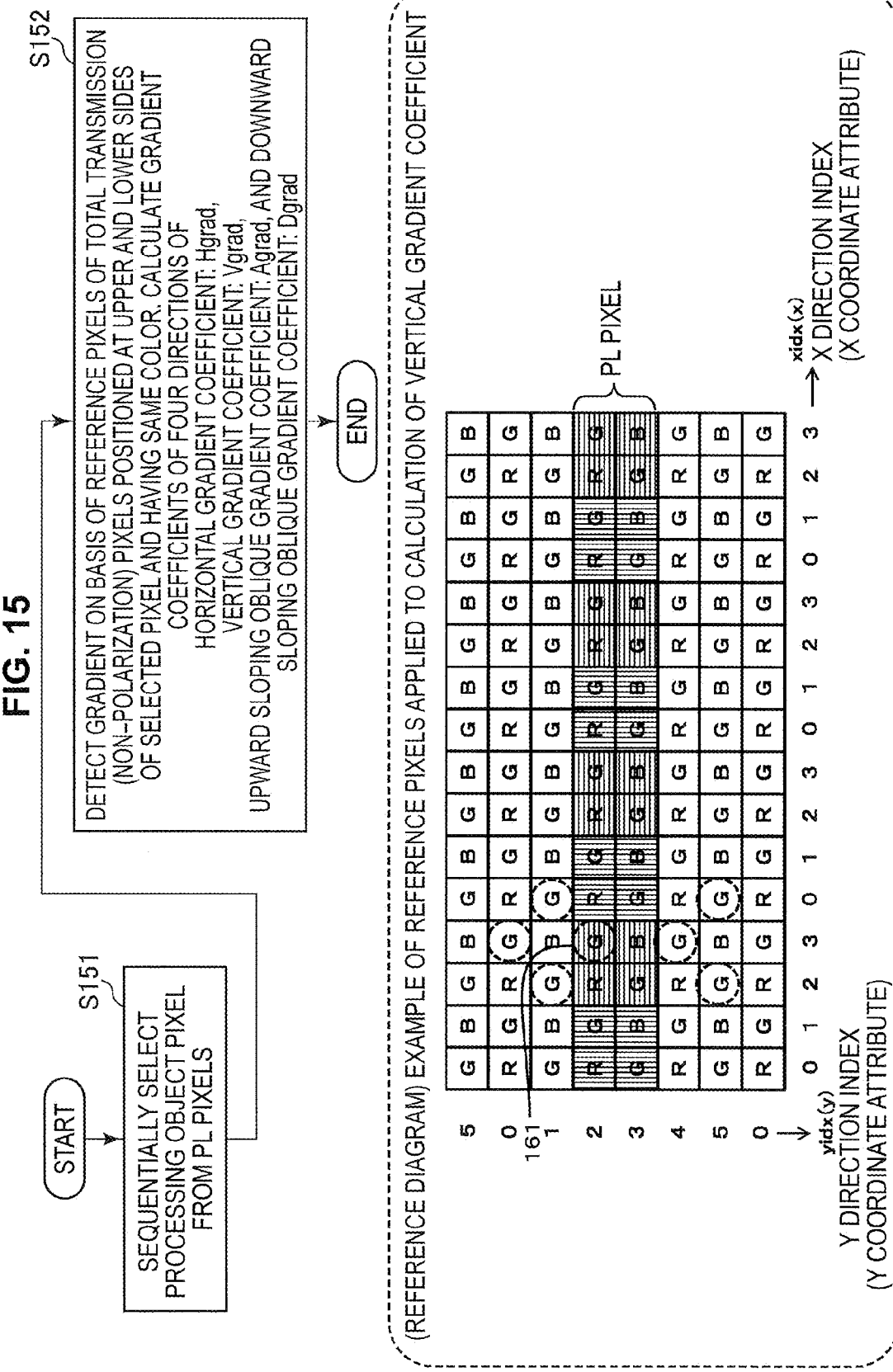

FIG. 17 a. EXAMPLE OF REFLECTION PRESENCE OR ABSENCE DETECTION PROCESSING BASED ON APPLICATION OF REFLECTION DETECTION FILTER (CALCULATION OF PARAMETER: Href(x, y))

FILTER 0    +1   −2   −3   +4   +3   −2   −1
FILTER 1    −1   −2   +3   +4   −3   −2   +1

$Href(x, y)$ { IN CASE OF xidx (x) = 0, 2, FILTER 1 APPLICATION RESULT
IN CASE OF xidx (x) = 1, 3, FILTER 0 APPLICATION RESULT (a1) IN CASE OF xidx (x) = 0, 2

FILTER 1   −1   −2   +3   +4   −3   −2   +1

(a2) IN CASE OF xidx (x) = 1, 3

FILTER 0   +1   −2   −3   +4   +3   −2   −1

FIG. 18
b. EXAMPLE OF REFLECTION PRESENCE OR ABSENCE DETECTION PROCESSING BASED ON APPLICATION OF REFLECTION DETECTION FILTER (CALCULATION OF PARAMETER: Hnoref(x, y))
$$H_{noref}(x, y) = \begin{cases} \text{IN CASE OF xidx}(x) = 0, 2, \text{FILTER 0 APPLICATION RESULT} \\ \text{IN CASE OF xidx}(x) = 1, 3, \text{FILTER 1 APPLICATION RESULT} \end{cases}$$
(b1) IN CASE OF xidx (x) = 0, 2
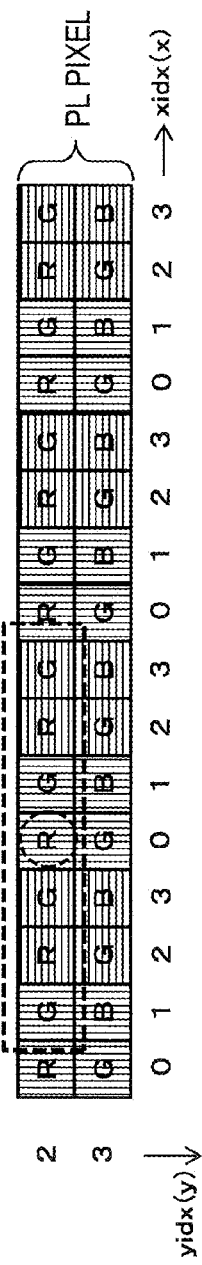
(b2) IN CASE OF xidx (x) = 1, 3
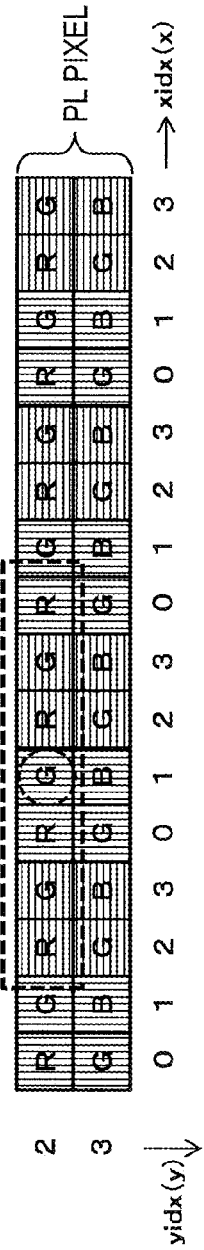

FIG. 19 c. EXAMPLE OF REFLECTION PRESENCE OR ABSENCE DETECTION PROCESSING BASED ON APPLICATION OF REFLECTION DETECTION FILTER (CALCULATION OF PARAMETER: ref(x, y) AND noref(x, y))

$$ref(x, y) = \begin{cases} \text{IN CASE OF yidx (y) = 2: Href (x, y) + Href (x, y + 1)} \\ \text{IN CASE OF yidx (y) = 3 : Href (x, y−1) + Href (x, y)} \end{cases}$$

$$nonref(x, y) = \begin{cases} \text{IN CASE OF yidx (y) = 2: Hnoref (x, y) + Hnoref (x, y + 1)} \\ \text{IN CASE OF yidx (y) = 3 : Hnoref (x, y−1) + Hnoref (x, y)} \end{cases}$$

yidx (y) = 2 PROCESSING EXAMPLE IN CASE OF yidx (y) = 2

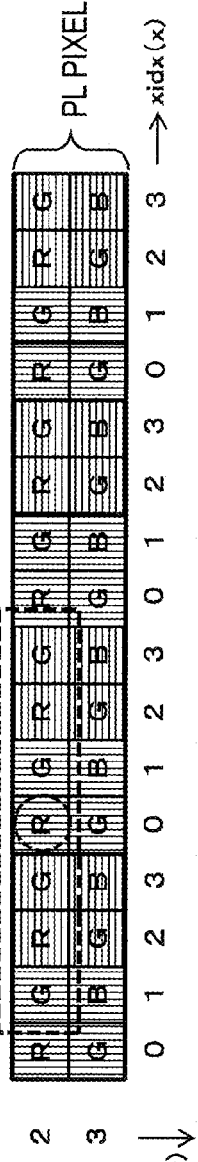

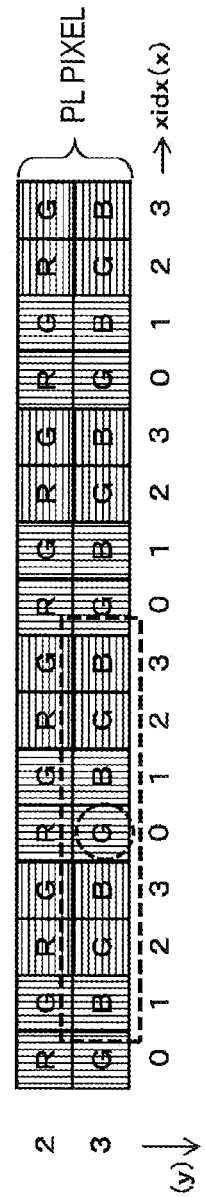

FIG. 20 d. EXAMPLE OF REFLECTION PRESENCE OR ABSENCE DETECTION PROCESSING BASED ON APPLICATION OF REFLECTION DETECTION FILTER (CALCULATION OF REFLECTION PRESENCE DETERMINATION RESULT: refDetect (x, y))

$$\text{ref}(x, y) = \begin{cases} \text{IN CASE OF yidx(y) = 2: Href}(x, y) + \text{Href}(x, y + 1) \\ \text{IN CASE OF yidx(y) = 3: Href}(x, y-1) + \text{Href}(x, y) \end{cases}$$

$$\text{nonref}(x, y) = \begin{cases} \text{IN CASE OF yidx(y) = 2: Hnoref}(x, y) + \text{Hnoref}(x, y + 1) \\ \text{IN CASE OF yidx(y) = 3: Hnoref}(x, y-1) + \text{Hnoref}(x, y) \end{cases}$$

$$\text{refDetect}(x, y) = \begin{cases} \begin{rcases} \text{ref}(x, y) \leq \text{noref}(x, y) ] \\ \text{ref}(x, y) \leq \text{noref}(x, y+2) ] \\ \text{ref}(x, y) \leq \text{ref}(x, y+2) ] \\ \text{ref}(x, y) \leq \text{noref}(x, y-2) ] \\ \text{ref}(x, y) \leq \text{ref}(x, y-2) ] \end{rcases} \text{false (REFLECTION ABSENCE)} \\ \text{OTHERS (OTHER THAN THE ABOVE)} \quad \text{true (REFLECTION PRESENCE)} \end{cases}$$

FIG. 32

| X COORDINATE ATTRIBUTE [X INDEX (xidx(x))] | xindx(x)=0, 1, 2, 3 =LEFT EYE PIXELS OR NON-POLARIZATION (TOTAL TRANSMISSION) PIXELS OF COLUMN INCLUDING LEFT EYE PIXELS | xindx(x)=4, 5, 6, 7 =RIGHT EYE PIXELS OR NON-POLARIZATION (TOTAL TRANSMISSION) PIXELS OF COLUMN INCLUDING RIGHT EYE PIXELS |
|---|---|---|
| Y COORDINATE ATTRIBUTE [Y INDEX (yidx(x))] | yindx(y)=0, 7 =NON-POLARIZATION (TOTAL TRANSMISSION) PIXELS APART FROM POLARIZATION PIXEL (PL PIXEL) | yindx(y)=1, 6 =NON-POLARIZATION (TOTAL TRANSMISSION) PIXELS ADJACENT TO POLARIZATION PIXEL (PL PIXEL) | yindx(y)=2, 3, 4, 5 =POLARIZATION PIXEL (PL PIXEL) |
| VIEWING POINT ATTRIBUTE [VIEWING POINT INDEX (ep(x,y))] | ex(x, y)=0 =TOTAL TRANSMISSION PIXEL (NON-POLARIZATION PIXEL) | ex(x, y)=−1 =LEFT EYE PIXEL (VERTICAL POLARIZATION PIXEL) | ex(x, y)=+1 =RIGHT EYE PIXEL (HORIZONTAL POLARIZATION PIXEL) |
| COLOR ATTRIBUTE [COLOR INDEX (color(x,y))] | color(x, y)=0 =RED(R)PIXEL | color(x, y)=1 =GREEN(G)PIXEL | color(x, y)=2 =BLUE(B)PIXEL |

IMAGE PROCESSING APPARATUS, IMAGE PROCESSING METHOD, AND PROGRAM

RELATED APPLICATIONS

This Application claims the benefit under 35 U.S.C. §120 of U.S. application Ser. No. 13/538,139, entitled "IMAGE PROCESSING APPARATUS, IMAGE PROCESSING METHOD, AND PROGRAM" filed on Jun. 29, 2012, which is herein incorporated by reference in its entirety. Foreign priority benefits are claimed under 35 U.S.C. §119(a)-(d) or 35 U.S.C. §365(b) of Japanese application number 2011-152885, filed Jul. 11, 2011.

BACKGROUND

The present disclosure relates to an image processing apparatus, an image processing method, and a program. More specifically, the present disclosure relates to an image processing apparatus, an image processing method, and a program that execute processing for generating a three-dimensional image (3D image) to be stereoscopically viewed (three-dimensionally viewed).

A stereoscopic image (three-dimensional image) that can be viewed as a three-dimensional image having depth is configured of a combination of two images of an image for a left eye and an image for a right eye, which are images from different viewing points. In order to obtain the images from the two viewing points, that is, binocular parallax images, two imaging apparatuses are arranged at left and right sides to be apart from each other and capture images.

A pair of captured stereoscopic images are configured using a pair of images including an image for a left eye to be captured by the left imaging apparatus and observed by the left eye and an image for a right eye to be captured by the right imaging apparatus and observed by the right eye.

The pair of stereoscopic images that are configured using the pair of images including the image for the left eye and the image for the right eye are displayed on a display apparatus that can separate the image for the left eye and the image for the right eye to be viewed by the left eye and the right eye of an observer, such that the observer can recognize the images as a three-dimensional image.

However, when the images from the two viewing points are photographed using the two cameras, precise synchronization control of the two cameras should be performed, the synchronization control is very difficult, and accurate control of a convergence angle is very difficult.

A three-dimensional photographing apparatus in which polarization filters polarized to become orthogonal in relation are combined to facilitate adjustment of a lens system to perform three-dimensional photographing and an optical system is shared is disclosed in Japanese Patent Application Publication No. 6-054991.

A method of performing three-dimensional photographing by an imaging apparatus including two lenses and one imaging unit is disclosed in Japanese Patent Application Publication No. 2004-309868. The imaging apparatus that is disclosed in Japanese Patent Application Publication No. 2004-309868 sets (a) a combination configuration of a lens and a horizontal component polarization filter and (b) a combination configuration of a lens and a vertical component polarization filter arranged to be apart from each other by an interval according to human parallax to positions apart from an imaging surface of a CCD by a predetermined distance and acquires an image for a left eye and an image for a right eye using the two combination configurations of (a) and (b).

SUMMARY

According to technology that is disclosed in Japanese Patent Application Publication No. 6-054991, the lens system is shared by overlapping outputs of the two polarization filters and forming a single optical path.

However, a polarization filter should be further provided to extract the image for the left eye and the image for the right eye in the following step, the optical path should be divided again, and light should be incident on each polarization filter. For this reason, light loss is generated in the lens system and it is difficult to decrease a size of the apparatus.

According to technology that is disclosed in Japanese Patent Application Laid-Open No. 2004-309868, because the two sets of lenses and polarization filters should be provided, the apparatus becomes complex and a size of the apparatus increases.

The present disclosure has been made in view of the above circumstances and provides an image processing apparatus, an image processing method, and a program that execute processing with respect to an image photographed by one imaging apparatus and generate an image observed as a three-dimensional image.

The present disclosure provides an image processing apparatus, an image processing method, and a program that execute interpolation processing of a two-dimensional image used for generating an image to be applied to three-dimensional image display.

According to a first embodiment of the present disclosure, there is provided an image processing apparatus which includes a first polarizing unit that has a first polarization region and a second polarization region to transmit different polarized light corresponding to different viewing point images, a second polarizing unit that causes transmission light of the first polarizing unit to be incident and includes a third polarization region to transmit only the transmission light of the first polarization region, a fourth polarization region to transmit only transmission light of the second polarization region, and a total transmission region to transmit the transmission light of the first polarization region and the second polarization region, an imaging element that receives the transmission light of the second polarizing unit, and an image processing unit that executes signal processing with respect to an output signal of the imaging element. The image processing unit includes a parallax detecting unit that applies two different viewing point images of an image based on the transmission light of the third polarization region of the second polarizing unit and an image based on the transmission light of the fourth polarization region of the second polarizing unit and generates parallax information in which an object distance is reflected, an image correcting unit that executes correction processing with respect to an input image from the imaging element and generates a two-dimensional image, and a parallax image generating unit that applies the parallax information generated by the parallax detecting unit, executes image conversion processing of the two-dimensional image generated by the image correcting unit, and generates a left eye image and a right eye image for three-dimensional image display.

In the image processing apparatus according to the embodiment of the present disclosure, the image correcting unit includes a brightness correcting unit that executes brightness correction to match brightness of polarization region pixels (PL pixels) and polarization region pixel adjacent pixels (PL pixel adjacent pixels), which are pixels corresponding to the third polarization region and the fourth polarization region of the second polarizing unit, with brightness of total transmission region pixels (N pixels) corresponding to the total transmission region, a reflection detecting unit that generates reflection information, which is determination information on whether a reflection light component is included in each pixel value, in units of polarization region pixels (PL pixels), a gradient detecting unit that generates gradient information corresponding to pixel value change rates of a plurality of directions of peripheral pixels in units of polarization region pixels (PL pixels), and an interpolation processing unit that selects reference pixels according to the reflection information and the gradient information, applies pixel values of the selected reference pixels, and executes pixel value interpolation processing of the polarization region pixels (PL pixels).

In the image processing apparatus according to the embodiment of the present disclosure, the interpolation processing unit determines a direction having a high correlation where a gradient is small on the basis of gradient information of non-polarization region pixels (N pixels) becoming interpolation processing objects, and executes interpolation processing using pixels in the direction having the high correlation as the reference pixels.

In the image processing apparatus according to the embodiment of the present disclosure, the interpolation processing unit determines a direction having a high correlation where a gradient is small on the basis of gradient information of non-polarization region pixels (N pixels) becoming interpolation processing objects, and executes interpolation processing using the non-polarization region pixels (N pixels) in the direction having the high correlation as the reference pixels.

In the image processing apparatus according to the embodiment of the present disclosure, when reflection information of the polarization region pixels (PL pixels) becoming interpolation processing objects shows that there is reflection, the interpolation processing unit selects non-polarization region pixels (N pixels) in a direction having a high correlation as the reference pixels on the basis of the gradient information, and executes interpolation processing to which the selected reference pixels are applied.

In the image processing apparatus according to the embodiment of the present disclosure, when reflection information of the polarization region pixels (PL pixels) becoming interpolation processing objects shows that there is no reflection, the interpolation processing unit selects non-polarization region pixels (N pixels) in a direction having a high correlation or the polarization region pixels (PL pixels) as the reference pixels on the basis of the gradient information, and executes interpolation processing to which the selected reference pixels are applied.

In the image processing apparatus according to the embodiment of the present disclosure, in interpolation processing with respect to a photographed image of a 2D mode photographed in a state in which the first polarizing unit is removed from an optical path, the interpolation processing unit outputs a pixel value in which the brightness is corrected by the brightness correcting unit, without executing the interpolation processing of the polarization region pixels (PL pixels), when reflection information of the polarization region pixels (PL pixels) becoming interpolation processing objects shows that there is no reflection.

In the image processing apparatus according to the embodiment of the present disclosure, the brightness correcting unit calculates gains corresponding to brightness ratios with the total transmission region pixels (N pixels) around the polarization region pixels (PL pixels) and the polarization region pixel adjacent pixels (PL pixel adjacent pixels) becoming brightness correction objects, multiplies the brightness correction object pixels with the calculated gains, and executes brightness correction.

In the image processing apparatus according to the embodiment of the present disclosure, the reflection detecting unit detects the difference of a pixel value of an imaging element corresponding to a position of the third polarization region of the second polarizing unit and a pixel value of an imaging element corresponding to a position of the fourth polarization region of the second polarizing unit and generates reflection information, which is determination information on whether a reflection light component is included in a pixel value of the polarization region pixel (PL pixel), on the basis of the difference.

In the image processing apparatus according to the embodiment of the present disclosure, the image correcting unit sets an index showing a pixel attribute in units of pixels forming an output image from the imaging element and determines processing according to the index.

In the image processing apparatus according to the embodiment of the present disclosure, the index includes a coordinate attribute showing a pixel position, a viewing point attribute showing a viewing point position, and a color attribute showing a pixel color.

According to a second embodiment of the present disclosure, there is provided an image processing method that is executed in an image processing apparatus including a first polarizing unit that has a first polarization region and a second polarization region to transmit different polarized light corresponding to different viewing point images, a second polarizing unit that causes transmission light of the first polarizing unit to be incident and includes a third polarization region to transmit only the transmission light of the first polarization region, a fourth polarization region to transmit only transmission light of the second polarization region, and a total transmission region to transmit the transmission light of the first polarization region and the second polarization region, an imaging element that receives the transmission light of the second polarizing unit, and an image processing unit that executes signal processing with respect to an output signal of the imaging element, wherein the image processing unit executes parallax detection processing for applying two different viewing point images of an image based on the transmission light of the third polarization region of the second polarizing unit and an image based on the transmission light of the fourth polarization region of the second polarizing unit and generating parallax information in which an object distance is reflected, image correction processing for executing correction processing with respect to an input image from the imaging element and generating a two-dimensional image, and parallax image generation processing for applying the parallax information generated by the parallax detection processing, executing image conversion processing of the two-dimensional image generated by the image correction processing, and generating a left eye image and a right eye image for three-dimensional image display.

According to a third embodiment of the present disclosure, there is provided a program for causing an image processing apparatus to execute image processing, the image processing apparatus including a first polarizing unit that has a first polarization region and a second polarization region to transmit different polarized light corresponding to different viewing point images, a second polarizing unit that causes transmission light of the first polarizing unit to be incident and includes a third polarization region to transmit only the transmission light of the first polarization region, a fourth polarization region to transmit only transmission light of the second polarization region, and a total transmission region to transmit the transmission light of the first polarization region and the second polarization region, an imaging element that receives the transmission light of the second polarizing unit, and an image processing unit that executes signal processing with respect to an output signal of the imaging element, wherein the program causes the image processing unit to execute parallax detection processing for applying two different viewing point images of an image based on the transmission light of the third polarization region of the second polarizing unit and an image based on the transmission light of the fourth polarization region of the second polarizing unit and generating parallax information in which an object distance is reflected, image correction processing for executing correction processing with respect to an input image from the imaging element and generating a two-dimensional image, and parallax image generation processing for applying the parallax information generated by the parallax detection processing, executing image conversion processing of the two-dimensional image generated by the image correction processing, and generating a left eye image and a right eye image for three-dimensional image display.

The program according to the present disclosure is recorded in a recording medium and is provided to an information processing apparatus or a computer system that can execute various program codes. By executing the program by a program executing unit on the information processing apparatus or the computer system, processing according to the program is realized.

Other objects, features, and advantages of the present disclosure will be more apparent from the following description taken in conjunction with the embodiments and the accompanying drawings. In the present disclosure, a system has a logical set configuration of a plurality of apparatuses and each apparatus may not be provided in the same casing.

According to the embodiments of the present disclosure described above, a configuration that executes interpolation processing of a two-dimensional image used for generating an image to be applied to three-dimensional image display is provided.

For example, an image processing apparatus according to the present disclosure includes a first polarizing unit that has a first polarization region and a second polarization region to transmit different polarized light corresponding to different viewing point images, a second polarizing unit that includes a third polarization region to transmit only transmission light of the first polarization region, a fourth polarization region to transmit only transmission light of the second polarization region, and a total transmission region to transmit the total transmission light of the first polarization region and the second polarization region, an imaging element, and an image processing unit that executes signal processing with respect to an output signal of the imaging element. In this configuration, the image processing unit executes correction processing to which presence or absence of reflection light or gradient information is applied, with respect to an input image from the imaging element, and generates a two-dimensional image. The image processing unit applies parallax information generated on the basis of each transmission light of the third polarization region and the fourth polarization region, executes image conversion of the two-dimensional image, and generates a left eye image and a right eye image for three-dimensional image display.

By this configuration, a two-dimensional image that has a small error can be generated by interpolation processing based on the reflection light or the gradient information and a left eye image and a right eye image for high-definition three-dimensional image display can be generated by 2D3D conversion processing based on the two-dimensional image having high quality.

BRIEF DESCRIPTION OF THE DRAWINGS

FIG. 7A is a diagram illustrating a switching configuration of a 3D mode in an imaging apparatus;

FIG. 7B is a diagram illustrating a switching configuration of a 2D mode in an imaging apparatus;

FIG. 8 is a diagram illustrating a configuration example of the image processing unit of the image processing apparatus according to the present disclosure;

FIG. 13 is a diagram illustrating a setting example of each index of an X-coordinate attribute (X index) [xidx (x)] and a Y-coordinate attribute (Y index) [yidx (y)];

FIG. 14 is a diagram illustrating a specific example of brightness correction processing that is executed by a brightness correcting unit;

FIG. 15 is a diagram illustrating a specific example of gradient detection processing that is executed by a gradient detecting unit;

FIG. 17 is a diagram illustrating a specific example of reflection detection processing that is executed by the reflection detecting unit;

FIG. 18 is a diagram illustrating a specific example of reflection detection processing that is executed by the reflection detecting unit;

FIG. 19 is a diagram illustrating a specific example of reflection detection processing that is executed by the reflection detecting unit;

FIG. 20 is a diagram illustrating a specific example of reflection detection processing that is executed by the reflection detecting unit;

FIG. 32 is a diagram illustrating a configuration of an index showing a pixel attribute.

DETAILED DESCRIPTION OF THE EMBODIMENT(S)

Hereinafter, an image processing apparatus, an image processing method, and a program of the present disclosure will be described in detail with reference to the appended drawings. The following description will be made in the order described below.

1. Basic Configuration and Processing Example of Image Processing Apparatus according to Present Disclosure
2. Specific Processing Example of Interpolation Processing
   2-(1). Interpolation Processing Example with respect to Image Photographed in 2D Image Photographing Mode
   2-(2). Interpolation Processing Example 1 with respect to Image Photographed in 3D Image Photographing Mode
   2-(3). Interpolation Processing Example 2 with respect to Image Photographed in 3D Image Photographing Mode
   2-(4). Interpolation Processing Example 3 with respect to Image Photographed in 3D Image Photographing Mode
3. Summary of Configuration according to Present Disclosure

[1. Basic Configuration and Processing Example of Image Processing Apparatus according to Present Disclosure]

First, a basic configuration and a processing example of an image processing apparatus according to the present disclosure will be described.

Figure 1:
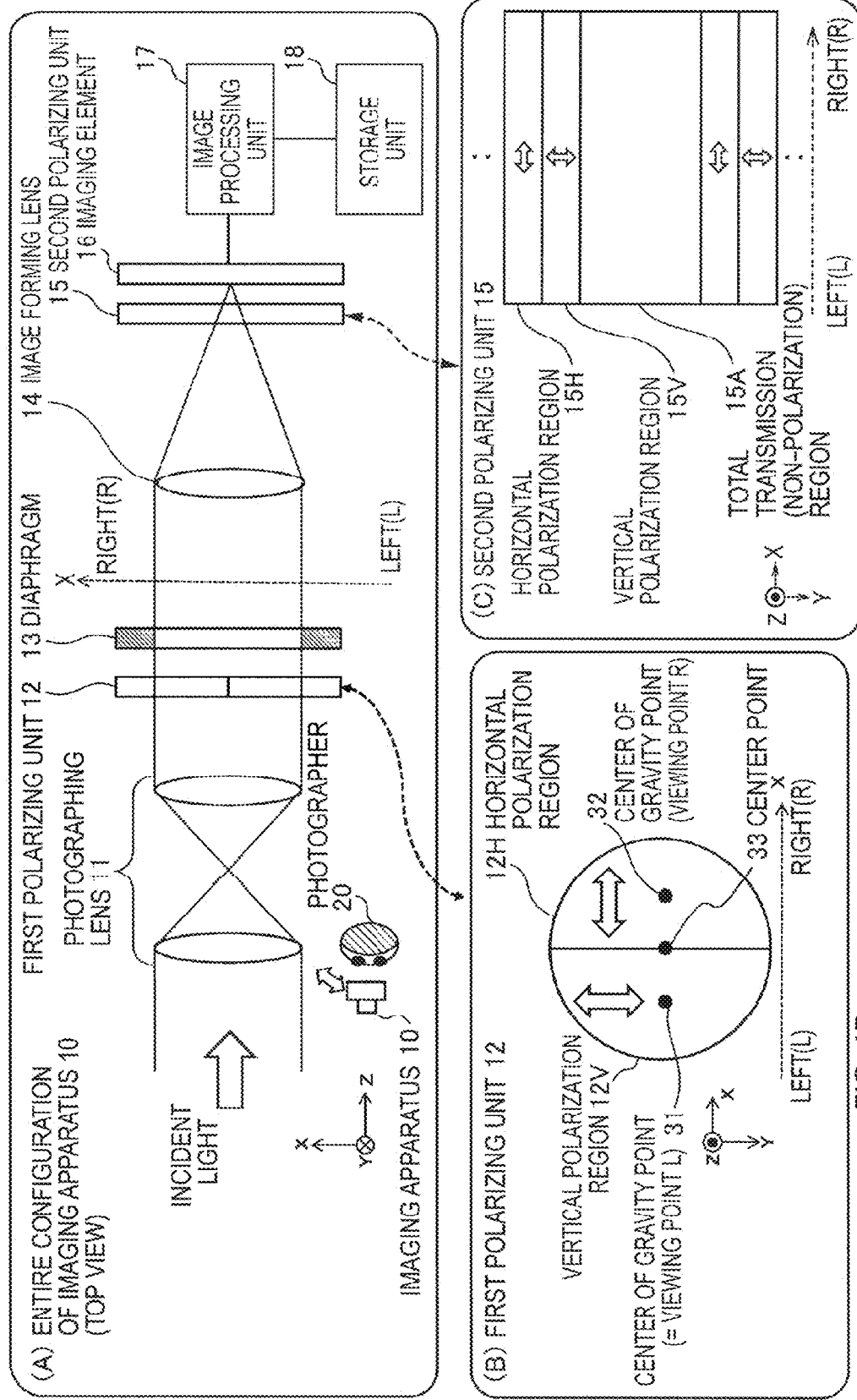
FIG. 1A is a diagram illustrating an entire configuration of an image processing apparatus according to the present disclosure.
FIG. 1B is a diagram illustrating details of the first polarizing unit shown in FIG. 1A.
FIG. 1C is a diagram illustrating details of the second polarizing unit shown in FIG. 1A.

FIGS. 1A to 1C illustrate a configuration of an imaging apparatus that is an example of an image processing apparatus.

Incident light that corresponds to a photographing object is input through a photographing lens 11 of an imaging apparatus 10 illustrated in FIG. 1A.

The incident light that is input through the photographing lens 11 is input to an imaging element 16 through a first polarizing unit 12, a diaphragm 13, an image forming lens 14, and a second polarizing unit 15.

FIG. 1A is a diagram of the imaging apparatus (camera) 10 viewed from the upper side, that is, a top view. As illustrated in a schematic diagram of the imaging apparatus 10 and a photographer 20, along with XYZ coordinate axes, at the lower left of FIG. 1A, a configuration diagram of the imaging apparatus of FIG. 1A is a diagram of the imaging apparatus (camera) 10 viewed from the upper side.

As illustrated by a vertical dotted line (X axis) near the center of FIG. 1A, the upper side of FIG. 1A becomes a right (R) side from the photographer and the lower side of FIG. 1A becomes a left (L) side from the photographer.

The imaging element 16 is a photoelectric conversion element such as a CCD and a CMOS and generates an electrical signal according to object light and outputs the electrical signal to an image processing unit 17.

The image processing unit 17 executes signal processing according to a predetermined algorithm and stores image data as the processing result in a storage unit 18.

The configuration and the processing of the image processing unit 17 will be described in detail below.

In the configuration illustrated in FIG. 1A, the first polarizing unit 12 has a configuration illustrated in FIG. 1B and the second polarizing unit 15 has a configuration illustrated in FIG. 1C.

The first polarizing unit 12 is divided into two portions of left and right portions, as illustrated in FIG. 1B. In the first polarizing unit 12, different polarization regions of a vertical polarization region 12V formed in a region of the left half and a horizontal polarization region 12H formed in a region of the right half are configured. The polarization regions are configured using polarization filters.

The vertical polarization region 12V passes only polarized light of a vertical direction and light that has passed through the vertical polarization region 12V becomes the polarized light of the vertical direction.

The horizontal polarization region 12H passes only polarized light of a horizontal direction and light that has passed through the horizontal polarization region 12H becomes the polarized light of the horizontal direction.

A center of gravity point 31 illustrated in FIG. 1B is a position of a center of gravity of the vertical polarization region 12V. Transmission light of the vertical polarization region 12V corresponds to an image observed using the center of gravity point 31 as a viewing point.

Likewise, a center of gravity point 32 illustrated in FIG. 1B is a position of a center of gravity of the horizontal polarization region 12H. Transmission light of the horizontal polarization region 12H corresponds to an image observed using the center of gravity point 32 as the viewing point.

That is, an image that is observed using the center of gravity point 31, which is the position of the center of gravity of the vertical polarization region 12V, as the viewing point corresponds to a left eye viewing point image (L image) that is an observation image from the left eye and an image that is observed using the center of gravity point 32, which is the position of the center of gravity of the horizontal polarization region 12H, as the viewing point corresponds to a right eye viewing point image (R image) that is an observation image from the right eye.

As such, an image that transmits the first polarizing unit 12 becomes an image that is obtained by transmitting two different left and right viewing point images as vertically polarized light and horizontally polarized light, respectively.

Light of the two different viewing point images, that is, the L image (vertically polarized light) corresponding to the image for the left eye and the R image (horizontally polarized light) corresponding to the image for the right eye, reaches the second polarizing unit 15 through the image forming lens 14.

In the following description, the "image for the right eye" is simply referred to as the "right eye image" and the "image for the left eye" is simply referred to as the "left eye image".

The second polarizing unit 15 has the configuration illustrated in FIG. 1C.

As illustrated in FIG. 1C, the second polarizing unit 15 has a configuration in which three kinds of regions including the horizontal polarization region 15H, the vertical polarization region 15V, and a total transmission (non-polarization) region 15A are repetitively set sequentially from the upper side.

The horizontal polarization region 15H selectively transmits the polarized light of the horizontal direction to cause the imaging element 16 to image only the horizontally polarized light.

The vertical polarization region 15V selectively transmits the polarized light of the vertical direction to cause the imaging element 16 to image only the vertically polarized light.

The total transmission (non-polarization) region 15A transmits both the polarized light of the horizontal direction and the polarized light of the vertical direction to cause the imaging element 16 to image incident light thereof.

Each polarization region that is set to the second polarizing unit 15 is configured using a wire grid polarizer. Each polarization region is a polarizing element that has a configuration in which minute wires (for example, aluminum (Al) lines) are arranged at a small interval and achieves a polarization characteristic according to a wire arrangement direction.

Figure 2:
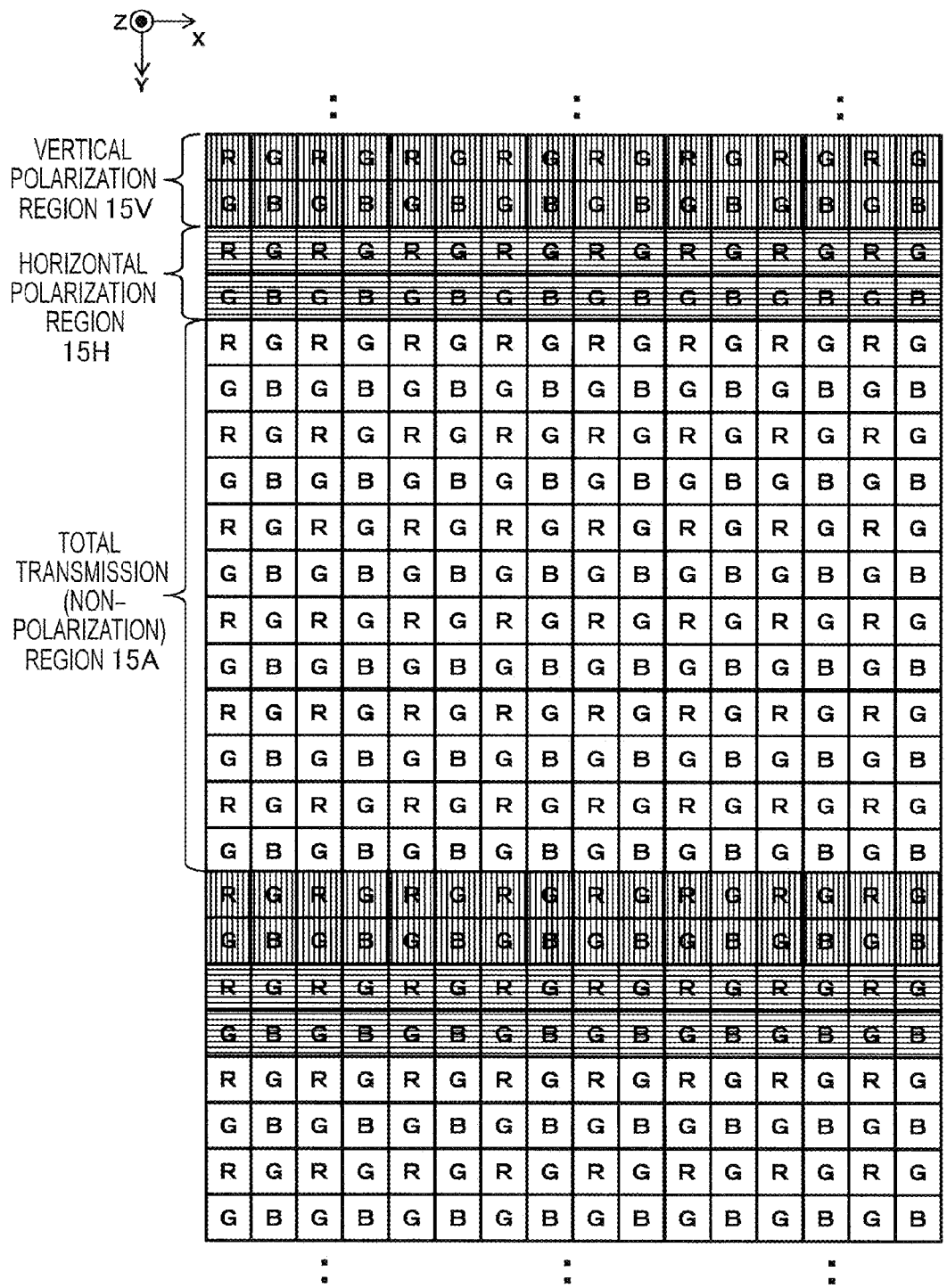
FIG. 2 is a diagram illustrating a configuration example of a second polarizing unit and an imaging element.

FIG. 2 illustrates a state in which the second polarizing unit 15 and the imaging element 16 receiving the transmission light of the second polarizing unit 15 overlap.

The imaging element 16 is an imaging element that has an RGB arrangement (Bayer arrangement).

A configuration example illustrated in FIG. 2 is an example in which the vertical polarization region 15V and the horizontal polarization region 15H set to the second polarizing unit 15 are set to be adjacent in a unit of two lines of the imaging element and the total transmission (non-polarization) region 15A is set in a unit of twelve lines. That is, three kinds of regions of (a) the vertical polarization region 15V of the two lines, (b) the horizontal polarization region 15H of the two lines, and (c) the total transmission (non-polarization) region 15V of the twelve lines are repetitively set in a vertical direction (Y direction) of the imaging element 16.

The horizontal polarization region 15H selectively transmits the polarized light of the horizontal direction, that is, only the R image (horizontally polarized light) corresponding to the right eye image transmitted through the horizontal polarization region 12H illustrated in FIG. 1B, and causes the imaging element 16 to image the right eye image (R image).

The vertical polarization region 15V selectively transmits the polarized light of the vertical direction, that is, only the L image (vertically polarized light) corresponding to the left eye image transmitted through the vertical polarization region 12V illustrated in FIG. 1B, and causes the imaging element 16 to image the left eye image (L image).

The total transmission (non-polarization) region 15A transmits both the R image (horizontally polarized light) corresponding to the right eye image transmitted through the horizontal polarization region 12H illustrated in FIG. 1B and the L image (vertically polarized light) corresponding to the left eye image transmitted through the vertical polarization region 12V illustrated in FIG. 1B. The images become images that correspond to images viewed from a center point 33, which is a center position of the center of gravity point 31 and the center of gravity point 32 illustrated in FIG. 1B. That is, the images become the same images as normal images photographed by a normal monocular camera that do not have a deviation in the viewing point due to the polarization.

The configuration example illustrated in FIG. 2 is a configuration example of the second polarizing unit 15 and is an example in which the vertical polarization region 15V and the horizontal polarization region 15H are set to be adjacent in a unit of the two lines of the imaging element and the total transmission (non-polarization) region 15A is set in a unit of the twelve lines.

As the configuration of the second polarizing unit 15, other configurations can be used.

Figure 3:
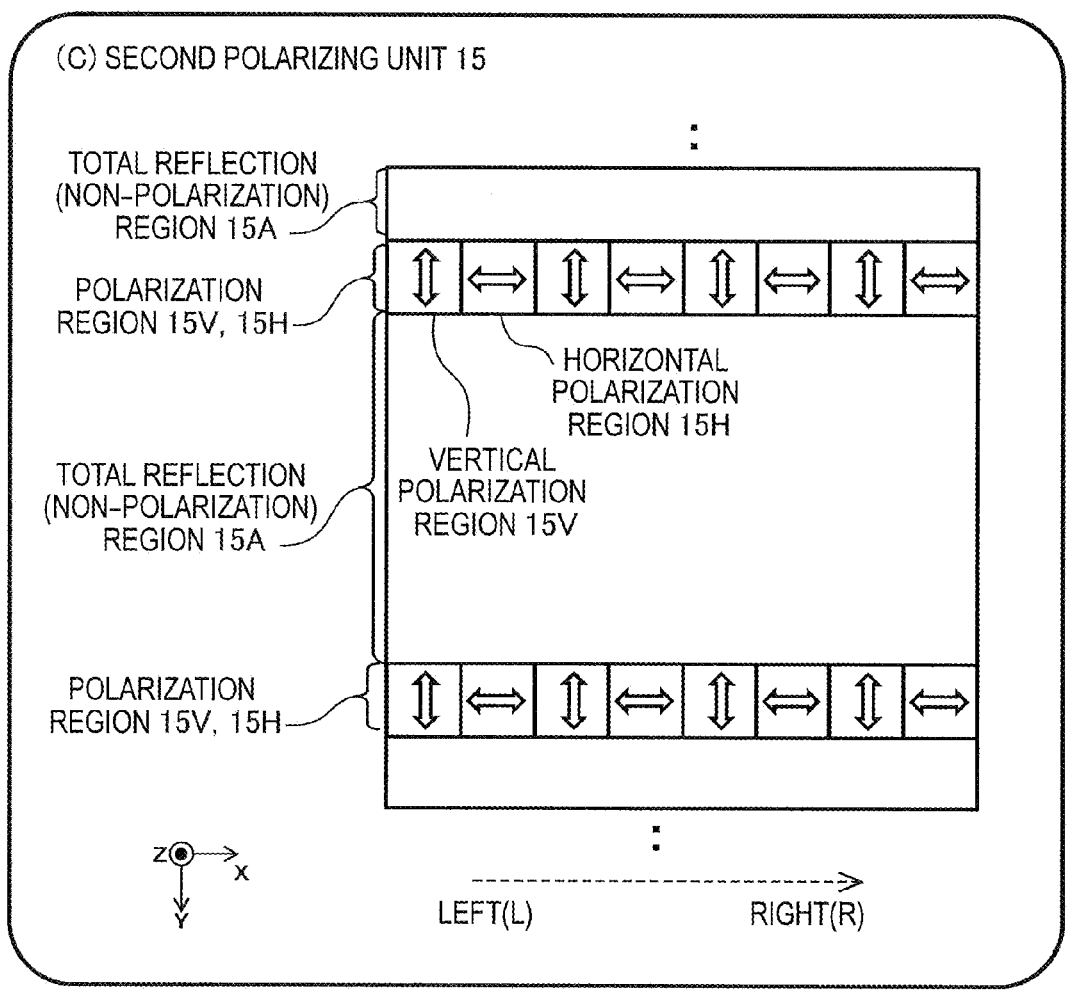
FIG. 3 is a diagram illustrating a configuration example of the second polarizing unit.

For example, as illustrated in FIG. 3, the vertical polarization region 15V and the horizontal polarization region 15H can be set to rectangular regions and can be arranged alternately.

Figure 4:
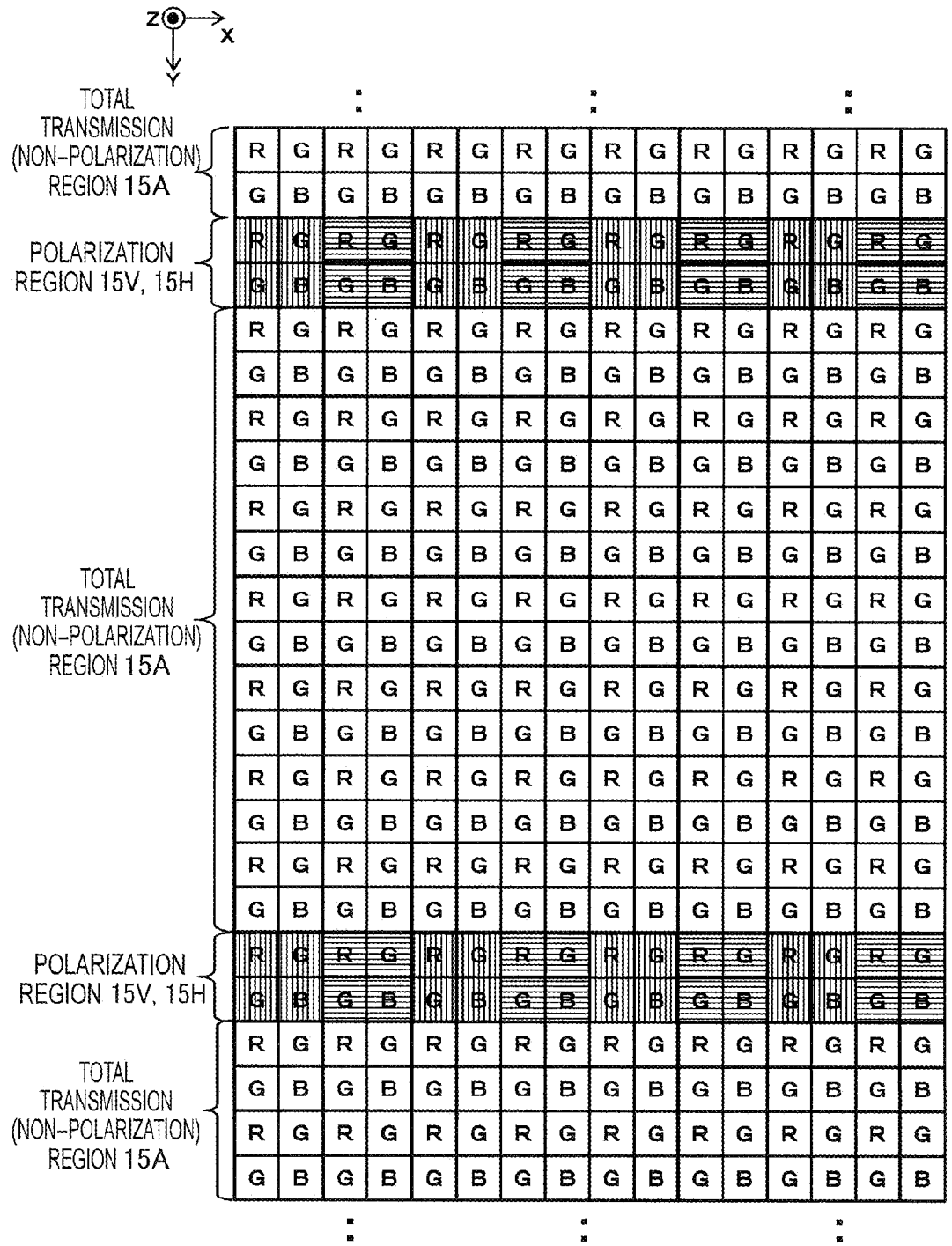
FIG. 4 is a diagram illustrating a configuration example of the second polarizing unit and the imaging element.

FIG. 4 is a diagram illustrating a state in which the second polarizing unit and the imaging element 16 having the RGB arrangement illustrated in FIG. 3 overlap.

An example illustrated in FIG. 4 is a configuration in which regions of two rows where the vertical polarization region 15V and the horizontal polarization region 15H are set are alternately arranged in units of rectangular regions including four pixels of 2×2 and the total transmission (non-polarization) regions 15A of fourteen rows are repetitively arranged in the vertical direction (Y direction).

In this configuration, the horizontal polarization region 15H that is configured using the rectangular region including the four pixels of 2×2 selectively transmits only the polarized light of the horizontal direction, that is, the R image (horizontally polarized light) corresponding to the right eye image transmitted through the horizontal polarization region 12H illustrated in FIG. 1B, and causes the imaging element 16 to image the right eye image (R image).

The vertical polarization region 15V that is configured using the rectangular region including the four pixels of 2×2 selectively transmits only the polarized light of the vertical direction, that is, the L image (vertically polarized light) corresponding to the left eye image transmitted through the vertical polarization region 12V illustrated in FIG. 1B, and causes the imaging element 16 to image the left eye image (L image).

The total transmission (non-polarization) region 15A transmits both the R image (horizontally polarized light) corresponding to the right eye image transmitted through the horizontal polarization region 12H illustrated in FIG. 1B and the L image (vertically polarized light) corresponding to the left eye image transmitted through the vertical polarization region 12V illustrated in FIG. 1B. The images become images that correspond to images viewed from the center point 33, which is the center position of the center of gravity point 31 and the center of gravity point 32 illustrated in FIG. 1B. That is, the images become the same images as normal images observed from the center point 33 that do not have a deviation in the viewing point due to the polarization.

Figure 5:
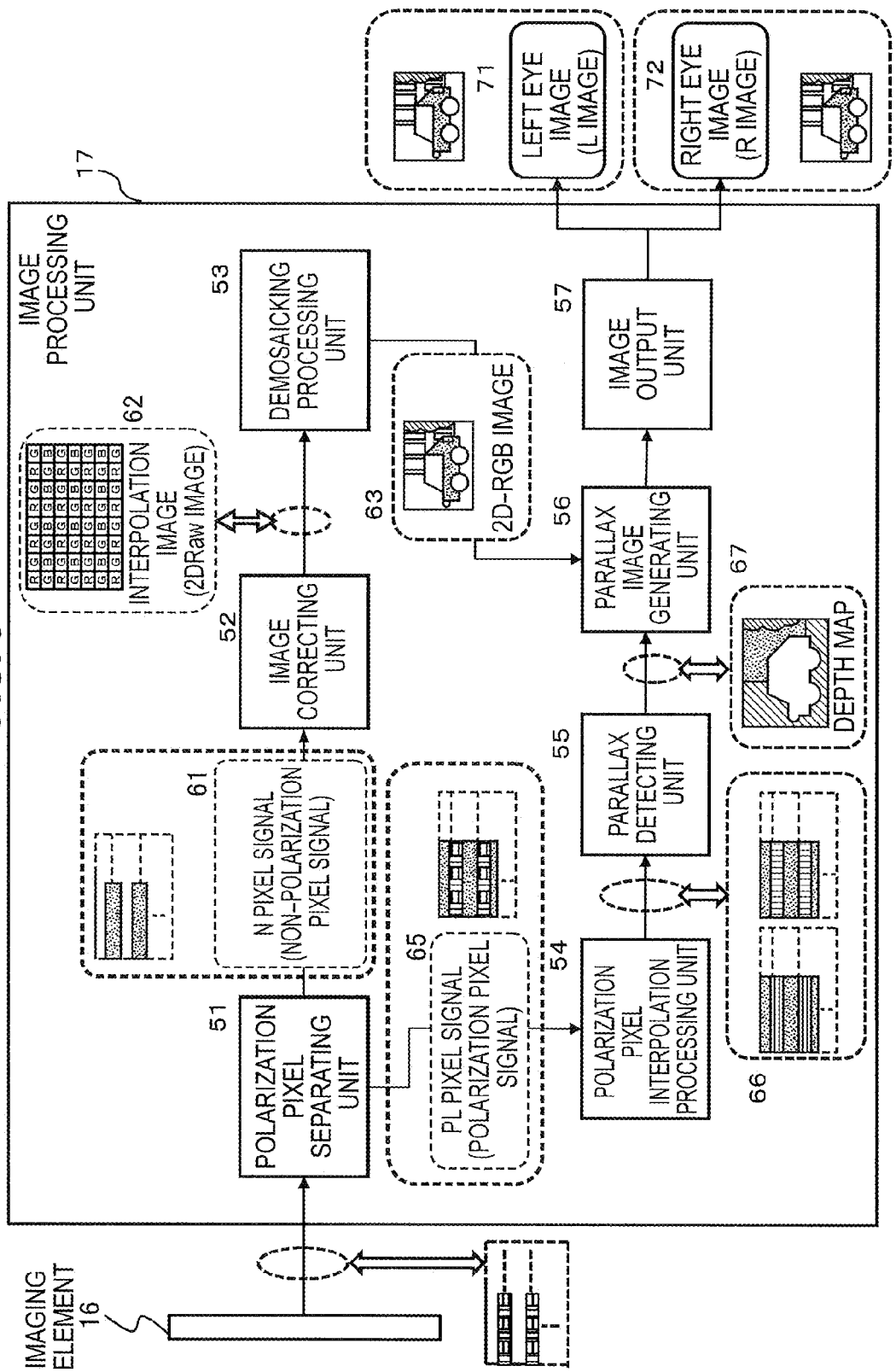
FIG. 5 is a diagram illustrating a configuration example of an image processing unit of the image processing apparatus according to the present disclosure.

FIG. 5 is a diagram illustrating a detailed configuration of the image processing unit 17 illustrated in FIG. 1A.

The imaging element 16 is divided into the three kinds of regions of (a) the vertical polarization region, (b) the horizontal polarization region, and (c) the total transmission (non-polarization) region and inputs a signal corresponding to each region to the image processing unit 17, as described with reference to FIGS. 2 to 4.

In the following description, the pixels corresponding to (a) the vertical polarization regions and (b) the horizontal polarization regions in the imaging element 16 are referred to as polarization (PL) pixels.

The pixels corresponding to the total polarization (non-polarization) regions are referred to as non-polarization (N) pixels.

An output of the imaging element 16 includes a PL pixel output (=output of the pixels corresponding to the vertical polarization region and the horizontal polarization region) and an N pixel output (=output of the pixels corresponding to the total transmission (non-polarization) region).

In this case, a processing example when the PL pixel output and the N pixel output are output from the imaging element 16 having the combination configuration of the second polarizing unit 15 and the imaging element 16 described with reference to FIGS. 3 and 4 to the image processing unit 17 will be described.

That is, the imaging element 16 has a configuration in which regions of two rows where the vertical polarization region 15V and the horizontal polarization region 15H are alternately arranged in units of rectangular regions including four pixels of 2×2 and the total transmission (non-polarization) regions 15A of fourteen rows are repetitively arranged in the vertical direction (Y direction), as described with reference to FIG. 4.

Separation processing of the pixel output of each region of the polarization region pixel (PL pixel) and the non-polarization region pixel (N pixel) is executed with respect to the pixel signal that is output from the imaging element 16 illustrated in FIG. 5, in a polarization pixel separating unit 51 of the image processing unit 17.

An N pixel signal (non-polarization pixel signal) 61 that is separated by the separation processing of the polarization pixel separating unit 51 is input to the image correcting unit 52.

The image correcting unit 52 executes pixel interpolation processing with respect to a pixel region missed from the N pixel signal (non-polarization pixel signal) 61, that is, the pixels of the PL pixel region. Specifically, the image correcting unit 52 executes interpolation processing for calculating a pixel value of the PL pixel region with reference to pixel values of the upper and lower N pixels and setting the pixel value.

An interpolation image (2D-Raw image) 62 that has the same pixel number as the input image is generated by setting the pixel values of all of the PL pixel regions of which the pixel values are missing, by the pixel interpolation processing. The interpolation image (2D-Raw image) 62 is an image in which a pixel value of any one of RGB is set to each pixel.

The interpolation image (2D-Raw image) 62 that is generated by the image correcting unit 52 becomes an image in which N pixel signals (non-polarization pixel signals) are set to all of the pixels forming the imaging element 16. The image is one two-dimensional (2D) Raw image that corresponds to an image observed from the center point 33 of the first polarizing unit 12 illustrated in FIG. 1B.

The interpolation image (2D-Raw image) 62 that is generated by the image correcting unit 52 is input to a demosaicking processing unit 53.

The demosaicking processing unit 53 executes demosaicking processing and other camera signal processing with respect to the interpolation image (2D-Raw image) 62 and converts the interpolation image into a normal 2D image.

The demosaicking processing is processing for setting all color signals, for example, pixel values of individual colors of RGB, to all pixel positions and is processing executed in a general camera.

The 2D-RGB image 63 that is generated by the demosaicking processing unit 53 is input to a parallax image generating unit 56.

Meanwhile, the PL pixel signal (polarization pixel signal) 65 that is one separation signal to be generated by the separation processing of the polarization pixel separating unit 51 becomes a pixel signal having only a pixel value of the polarization region pixel (PL pixel), rather than the pixel value of the non-polarization region pixel (N pixel).

The PL pixel signal (polarization pixel signal) 65 is input to the polarization pixel interpolation processing unit 54.

The processing example described above is a configuration in which the regions of the two rows where the vertical polarization region 15V and the horizontal polarization region 15H are alternately arranged in units of rectangular regions including the four pixels of 2×2 and the total transmission (non-polarization) regions 15A of the fourteen rows are repetitively arranged in the vertical direction (Y direction), as described with reference to FIG. 4.

Therefore, the PL pixel signal (polarization pixel signal) 65 that is generated by the separation processing of the polarization pixel separating unit 51 becomes an image in which the regions of the two rows where the vertical polarization region 15V and the horizontal polarization region 15H are alternately arranged in units of rectangular regions including the four pixels of 2×2 are set in the vertical direction, for every 14 rows.

Figure 6:
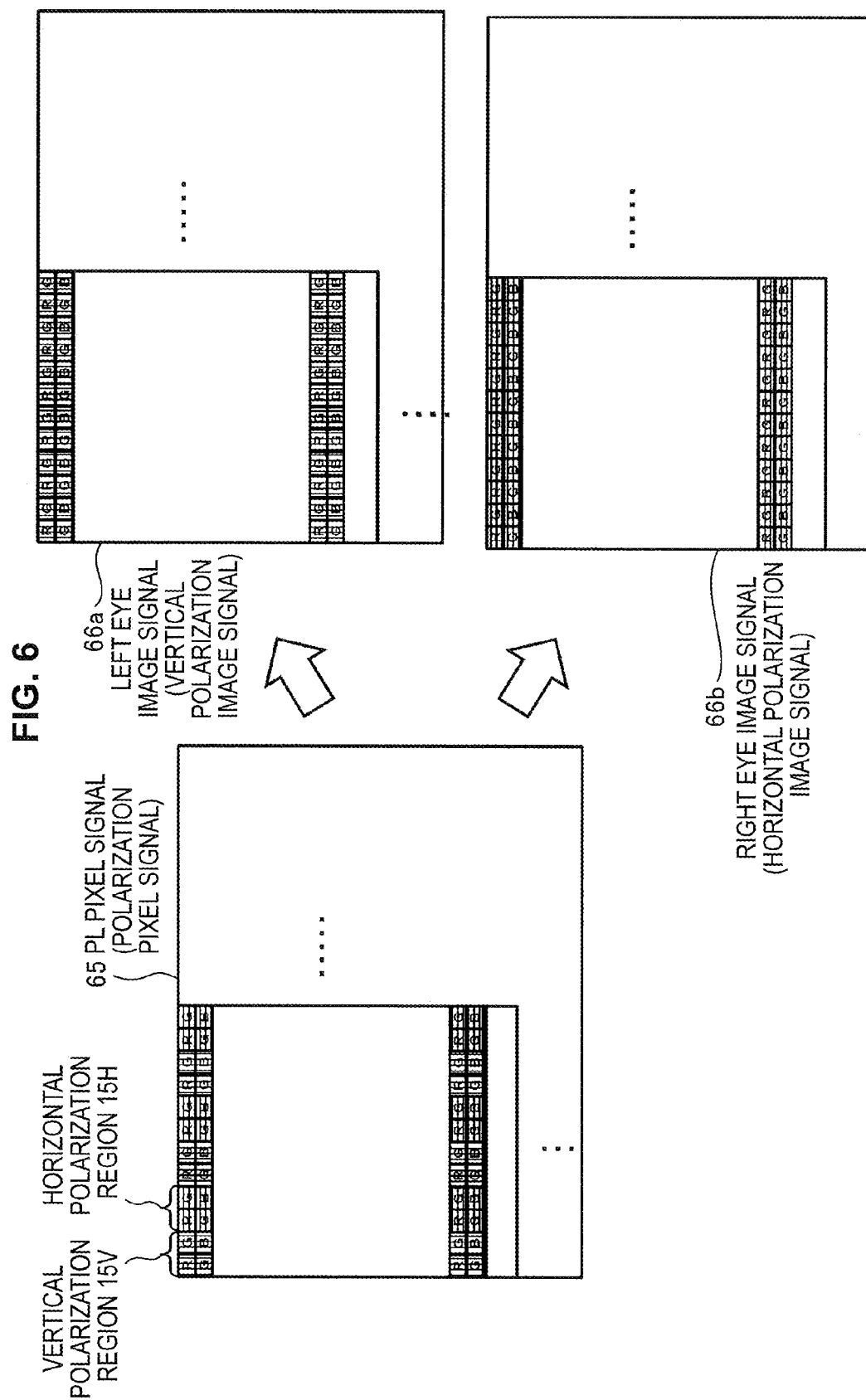
FIG. 6 is a diagram illustrating a processing example of a polarization pixel interpolation processing unit.

The polarization pixel interpolation processing unit 54 selects only the regions of the two rows where the vertical polarization region 15V and the horizontal polarization region 15H are alternately arranged in units of rectangular regions including the four pixels of 2×2 as processing objects and executes processing illustrated in FIG. 6 with respect to the PL pixel regions.

That is, the polarization pixel interpolation processing unit 54 generates each image of a left eye image signal (vertical polarization image signal) 66a to which the pixel value corresponding to the vertical polarization region 15V is set and a right eye image signal (horizontal polarization image signal) 66b to which the pixel value corresponding to the horizontal polarization region 15H is set, with respect to the PL pixel region included in the PL pixel signal (polarization pixel signal) 65.

The left eye image signal (vertical polarization image signal) 66a illustrated in FIG. 6 is generated by pixel value interpolation processing for resetting (removing) a pixel value of the horizontal polarization pixel region of the PL pixel region included in the PL pixel signal (polarization pixel signal) 65 and setting the pixel value of the reset pixel using the pixel values of the peripheral vertical polarization pixels.

Likewise, the right eye image signal (horizontal polarization image signal) 66*b* illustrated in FIG. 6 is generated by pixel value interpolation processing for resetting (removing) a pixel value of the horizontal polarization pixel region of the PL pixel region included in the PL pixel signal (polarization pixel signal) 65 and setting the pixel value of the reset pixel using the pixel values of the peripheral horizontal polarization pixels.

As a result, the image to which the pixel value included in the left eye image signal (vertical polarization image signal) 66*a* is set becomes an image viewed from the left center of gravity point 31 of the first polarizing unit 12 illustrated in FIG. 1B, that is, an image corresponding to the left eye image.

Likewise, the image to which the pixel value included in the right eye image signal (horizontal polarization image signal) 66*b* is set becomes an image viewed from the right center of gravity point 32 of the first polarizing unit 12 illustrated in FIG. 1B, that is, an image corresponding to the right eye image.

As such, the polarization pixel interpolation processing unit 54 interpolates information missing in a horizontal direction of each of the left eye image and the right eye image with respect to the PL pixel region included in the PL pixel signal (polarization pixel signal) 65 and generates the left eye image signal (vertical polarization image signal) 66*a* and the right eye image signal (horizontal polarization image signal) 66*b* that have the same horizontal pixel number as the input image.

The image that is generated by the polarization pixel interpolation processing unit 54 is input to the parallax detecting unit 55.

The parallax detecting unit 55 compares corresponding pixels using block matching processing with respect to the two images of the left eye image signal (vertical polarization image signal) 66*a* and the right eye image signal (horizontal polarization image signal) 66*b* having the same horizontal pixel number as the input image and illustrated in FIG. 6, calculates an object deviation amount, and detects the object distance as parallax information.

That is, the parallax detecting unit 55 detects the deviation between the pixels of the left eye image and the right eye image by the block matching processing and calculates the object distance according to the deviation amount.

The parallax detecting unit 55 generates a depth map 67 having the object distance information corresponding to each pixel and outputs the depth map.

The depth map 67 is data that has the object distance information with respect to each of the pixels forming the image. For example, the depth map 67 is configured as an image to which a brightness value according to the object distance is set.

Specifically, a region having the short object distance (close to the camera) has high brightness and a region having the long object distance (far from the camera) has low brightness. The parallax detecting unit 55 generates the depth map to which the pixel value is set and outputs the depth map to the parallax image generating unit 56.

The images of the left eye image signal (vertical polarization image signal) 66*a* and the right eye image signal (horizontal polarization image signal) 66*b* that are generated by the polarization pixel interpolation processing unit 54 do not have an image signal with respect to the N pixel (non-polarization pixel) region of the input image, as illustrated in FIG. 6. However, the parallax detecting unit 55 calculates the left eye image to which an interpolation pixel value based on the left eye image signal (vertical polarization image signal) 66*a* is set and the right eye image to which the interpolation pixel value based on the right eye image signal (horizontal polarization image signal) 66*b* is set with respect to the N pixel (non-polarization pixel) not having the pixel value, and calculates the distance information corresponding to all of the pixels by the matching processing between the images.

As the pixel value interpolation processing, linear interpolation processing can be used.

The parallax image generating unit 56 generates two images of a left eye image (L image) 71 and a right eye image (R image) 72, using the 2D-RGB image 63, which is the two-dimensional image output from the demosaicking processing unit 53, and the depth map 67 corresponding to the parallax information output from the parallax detecting unit 55.

That is, the parallax image generating unit 56 executes image conversion processing for setting the parallax according to the object distance on the basis of the depth map 67 corresponding to the parallax information with respect to the 2D-RGB image 63, generates the left eye image (L image) 71 and the right eye image (R image) 72, and outputs the left eye image and the right eye image.

The image conversion processing that is executed by the parallax image generating unit 56 is processing for generating the left eye image (L image) 71 and the right eye image (R image) 72 to be applicable to three-dimensional image display by the image conversion based on one two-dimensional image (2D image) and outputting the left eye image and the right eye image and is generally referred to as 2D3D conversion processing.

As the 2D3D conversion processing for generating the left eye image (L image) 71 and the right eye image (R image) 72 to be applicable to the three-dimensional image display by the image conversion based on one two-dimensional image (2D image), various processing is suggested. In the parallax image generating unit 56, the 2D3D conversion processing to which the existing method is applied is executed.

Specifically, the parallax image generating unit 56 executes image shift processing according to the parallax with respect to the 2D-RGB image 63, using the depth map 67 corresponding to the parallax information output from the parallax detecting unit 55, and generates the two images of the left eye image (L image) 71 and the right eye image (R image) 72.

For example, 2D3D conversion using a configuration described in the previous Japanese Patent Application No. 2009-283080 of the applicants may be executed.

As such, the parallax image generating unit 56 executes 2D3D conversion processing for executing parallax setting according to the object distance using the depth map 67 input from the parallax detecting unit 55 with respect to the 2D-RGB image 63 input from the demosaicking processing unit 53, generates the left eye image (L image) 71 and the right eye image (R image) 72 applied to the 3D image display, and outputs the left eye image and the right eye image through the image output unit 57.

As described above, the image processing unit 17 illustrated in FIG. 5 acquires the images from the different viewing points acquired according to the polarizer arranged on the imaging element 16, that is, the left eye image and the right eye image, and generates the depth map corresponding to the parallax information on the basis of the images.

The image processing unit 17 acquires a normal 2D image by the pixels in which the polarizer is not arranged and outputs high-definition left and right eye images applied to the 3D image display by image processing from information thereof.

In the embodiment described above, the first polarizing unit 12 described with reference to FIGS. 1A to 1C has the configuration in which the horizontal polarization region is set to the right side and the vertical polarization region is set to the left side. However, the setting may be inverted.

In addition to the combination of the horizontally polarized light and the vertically polarized light, any combination of polarization regions that have two different polarization directions, such as polarization regions transmitting polarized light of oblique directions, may be applied.

The second polarizing unit 15 should set to the polarization regions having the same combination as the polarization regions set to the first polarizing unit 12, to correspond to the setting of the polarization regions of the first polarizing unit 12.

[2. Specific Processing Example of Interpolation Processing]

The image correcting unit 52 of the image processing unit 17 of FIG. 5 described above executes processing for inputting the N pixel (non-polarization pixel) signal 61 input from the polarization pixel separating unit 51 and including the total transmission pixels and setting the pixel value of the PL pixel (polarization pixel) region not included in the N pixel signal (non-polarization pixel) signal 61 by the interpolation processing.

As illustrated in FIGS. 7A and 7B, the imaging apparatus 10 has a configuration in which a mode to photograph an image can be switched into a 2D mode to photograph a 2D image and a 3D mode to photograph the left eye image and the right eye image to be applicable to the 3D image display.

As illustrated in FIGS. 7A and 7B, the first polarizing unit 12 is set to an optical path in the 3D mode and the first polarizing unit 12 is removed from the optical path in the 2D mode.

When an image is photographed in the 3D mode, the following images are photographed in the PL pixels (polarization pixels), as described above.

The left eye image (image viewed from the center of gravity point 31 of FIG. 1B) is photographed in the vertical polarization pixels and the right eye image (image viewed from the center of gravity point 32 of FIG. 1B) is photographed in the horizontal polarization pixels. In the N pixels (non-polarization pixels), which are the total transmission pixels, an image viewed from the center of the lens (image viewed from the center point 33 of FIG. 1B) is photographed.

Meanwhile, in the setting of the 2D mode illustrated in FIG. 7B, because the first polarizing unit 12 is not on the optical path, light incident on the imaging element 16 is only controlled by the second polarizing unit 15.

In this case, in all of the vertical polarization pixels and the horizontal polarization pixels corresponding to the PL pixels (polarization pixels) and the total transmission pixels corresponding to the N pixels (non-polarization pixels), images viewed from the center of the lens (images viewed from the center point 33 of FIG. 1B) are photographed.

However, the incident light amounts of the vertical polarization pixels and the horizontal polarization pixels corresponding to the PL pixels (polarization pixels) become smaller than the incident light amounts of the N pixels (non-polarization pixels) by polarization processing. That is, the brightness decreases. This is the same in the photographing processing in the 3D mode.

The image correcting unit 52 described above with reference to FIG. 5 executes processing for inputting only the N pixel (non-polarization pixel) signal 61 input from the polarization pixel separating unit 51 and including the total transmission pixels and setting the pixel value of the PL pixel (polarization pixel) region not included in the N pixel (non-polarization pixel) signal 61 by the interpolation processing.

In an embodiment to be described below, as illustrated in FIG. 8, the image correcting unit 100 receives a total pixel signal 81 from the polarization pixel separating unit 51.

That is, the image correcting unit 100 receives the N pixel (non-polarization pixel) signal configured by the total transmission pixels and the PL pixel (polarization pixel) signal.

The image correcting unit 100 illustrated in FIG. 8 receives all of the signals generated by the imaging element and generates an interpolation image (2D-Raw image) 62.

Hereinafter, a plurality of examples of specific processing that is executed by the image correcting unit 52 will be described sequentially. The following processing aspects will be described sequentially.

(1). Interpolation Processing Example with respect to Image Photographed in 2D Image Photographing Mode
(2). Interpolation Processing Example 1 with respect to Image Photographed in 3D Image Photographing Mode
(3). Interpolation Processing Example 2 with respect to Image Photographed in 3D Image Photographing Mode
(4). Interpolation Processing Example 3 with respect to Image Photographed in 3D Image Photographing Mode

[2-(1). Interpolation Processing Example with Respect to Image Photographed in 2D Image Photographing Mode]

First, an interpolation processing example with respect to an image photographed in the 2D image photographing mode to photograph a 2D image in the imaging apparatus will be described.

Figure 9:
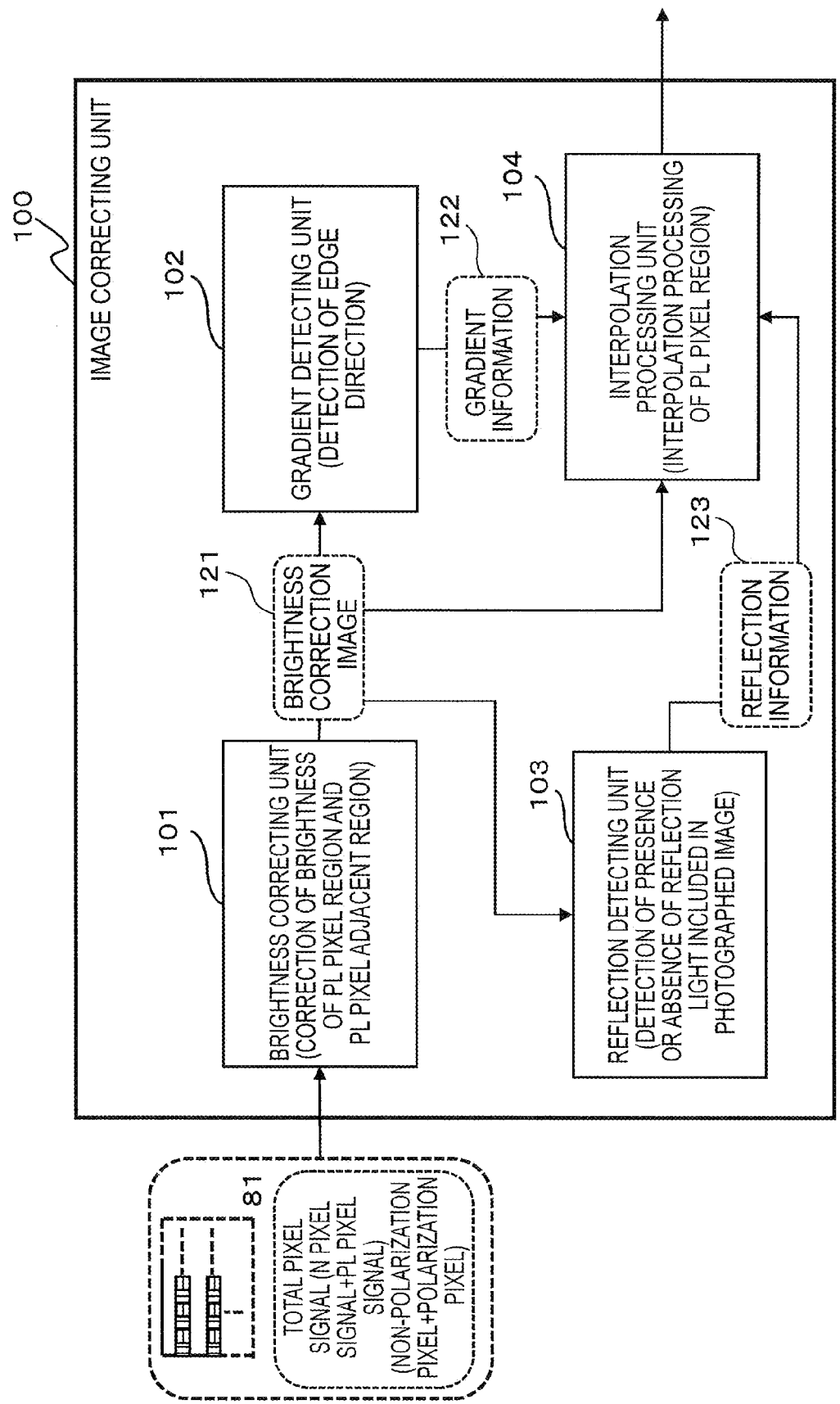
FIG. 9 is a diagram illustrating a configuration example of an image correcting unit of the image processing unit of the image processing apparatus according to the present disclosure.

A detailed configuration of the image correcting unit 100 illustrated in FIG. 8 is illustrated in FIG. 9.

As illustrated in FIG. 9, the image correcting unit 100 includes a brightness correcting unit 101, a gradient detecting unit 102, a reflection detecting unit 103, and an interpolation processing unit 104.

As described above, the image correcting unit 100 receives the total pixel signal 81 from the polarization pixel separating unit 51 illustrated in FIG. 8.

That is, the image correcting unit 100 receives the N pixel (non-polarization pixel) signal configured by the total transmission pixels and the PL pixel (polarization pixel) signal.

The brightness correcting unit 101 of the image correcting unit 100 first corrects brightness of the PL pixel and the PL pixel adjacent pixel included in the total pixel signal 81.

As described above, in the PL pixel (polarization pixel), the incident light amount is restricted by the polarization processing by the second polarizing unit 15 and the pixel value (brightness) decreases as compared with the N pixel (non-polarization pixel), which is the total transmission pixel.

In the N pixel adjacent to the PL pixel, the brightness decreases as compared with the N pixel of which all of the peripheral pixels are the N pixels. This is because light leaked from the adjacent pixels (PL pixels) decreases in the N pixels adjacent to the PL pixel.

Therefore, the brightness correcting unit 101 corrects the brightness of the PL pixel and the PL pixel adjacent pixel included in the total pixel signal 81. For example, the brightness correcting unit 101 executes brightness correction to match the brightness of the polarization region pixel (PL pixel) and the pixel adjacent to the polarization region pixel (pixel adjacent to the PL pixel) with the brightness of the total transmission region pixel (N pixel) corresponding to the total transmission region.

A specific processing example will be described below.

A brightness correction image 121 that is generated by the brightness correcting unit 101 is output to the gradient detecting unit 102, the reflection detecting unit 103, and the interpolation processing unit 104.

The gradient detecting unit 102 receives the brightness correction image 121 generated by the brightness correcting unit 101 and performs detection of the gradient direction of the pixel value with respect to each PL pixel, which is the interpolation object pixel, on the basis of the pixel value of the N pixel region around the PL pixel.

That is, the gradient detecting unit 102 generates gradient information corresponding to pixel value change rates of a plurality of directions of the peripheral pixels in units of polarization region pixels (PL pixels). This processing is the same processing as edge detection. The change rates of the pixels are calculated as gradient coefficients of four directions, which are a horizontal gradient coefficient: Hgrad, a vertical gradient coefficient: Vgrad, an upward sloping gradient coefficient: Agrad, and a downward sloping gradient coefficient: Dgrad.

Gradient information 122 that includes the gradient coefficients is input to the interpolation processing unit 104.

The reflection detecting unit 103 receives the brightness correction image 121 that is generated by the brightness correcting unit 101 and determines whether a reflection light component is included with respect to each PL pixel.

Specific polarized light, in this example, vertically polarized light or horizontally polarized light, is selectively incident on the PL pixel (polarization pixel).

For example, in light reflected from a surface of water or glass, a polarized light component of a specific direction strongly appears. If the reflection light is included in a photographed image, a deviation, in which one of the pixel values of the horizontal polarization pixel and the vertical polarization pixel of the PL pixels may increase and the other may decrease, is caused.

The reflection detecting unit 103 determines whether the reflection light is included in the photographed image. A specific example of the determination processing will be described below.

Reflection information 123 that is detected by the reflection detecting unit 103 is input to the interpolation processing unit 104.

The interpolation processing unit 104 receives the brightness correction image 121 that is generated by the brightness correcting unit 101, the gradient information 122 that is generated by the gradient detecting unit 102, and the reflection information 123 that is detected by the reflection detecting unit 103.

The interpolation processing unit 104 executes pixel interpolation processing as correction processing of the pixel value of the PL pixel region. When the interpolation processing unit 104 executes the interpolation processing, the interpolation processing unit 104 uses the gradient information 122 generated by the gradient detecting unit 102 and the reflection information 123 detected by the reflection detecting unit 103 and executes the interpolation processing according to an interpolation aspect determined according to the information.

A specific processing example will be described below.

As the result of the interpolation processing, the 2D-Raw image 62 that is the output of the image correcting unit 100 illustrated in FIG. 8 is generated.

Figure 10:
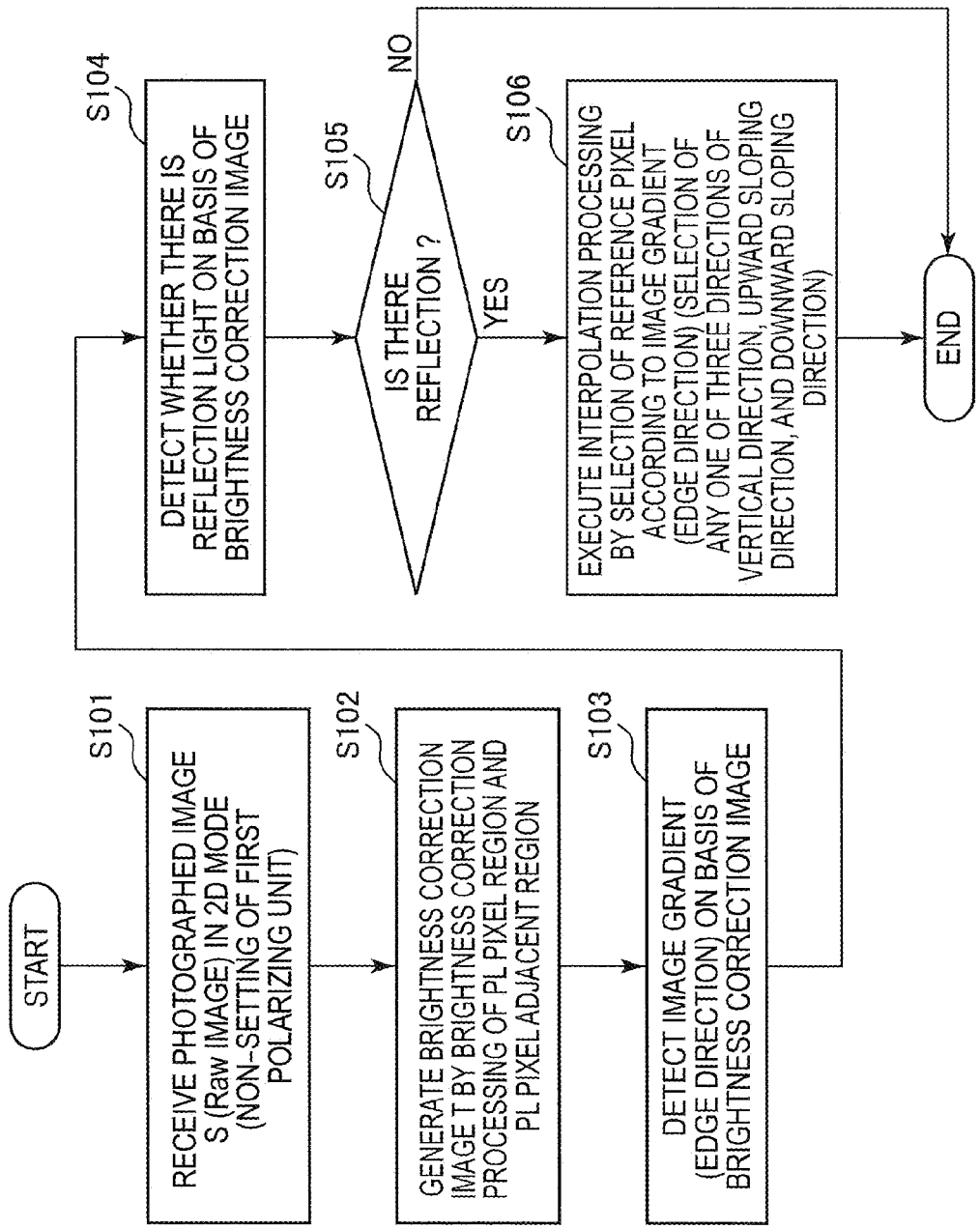
FIG. 10 is a flowchart illustrating an example of a sequence of processing that is executed by the image correcting unit.

FIG. 10 is a flowchart illustrating a sequence of processing that is executed by the image correcting unit 100.

Processing of each step will be described.

In step S101, the image correcting unit 100 receives an image S (Raw image) that is photographed in the 2D mode (non-setting of the first polarizing unit).

Next, in step S102, the image correcting unit 100 generates a brightness correction image T by the brightness correction processing of the PL pixel region and the PL pixel peripheral area.

This processing is processing that is executed by the brightness correcting unit 101 illustrated in FIG. 9.

Next, in step S103, the image correcting unit 100 detects the image gradient (edge direction) on the basis of the brightness correction image T.

This processing is processing that is executed by the gradient detecting unit 102 illustrated in FIG. 9.

Next, in step S104, the image correcting unit 100 detects whether there is reflection light on the basis of the brightness correction image.

This processing is processing that is executed by the reflection detecting unit 103 illustrated in FIG. 9.

In step S105, with respect to the pixel (PL pixel) in which it is determined that the reflection light is not detected, the image correcting unit 100 outputs the brightness corrected pixel value as it is.

Meanwhile, in step S105, with respect to the pixel (PL pixel) in which it is determined that the reflection light is detected, the image correcting unit 100 executes the correction processing, specifically, the interpolation processing using the peripheral N pixels as the reference pixels, in step S106.

The interpolation processing in step S106 is executed by determining setting directions of the reference pixels according to gradient information of three directions of a vertical direction, an upward sloping direction, and a downward sloping direction, among the gradient information generated by the gradient detecting unit 102. Specifically, the N pixels of the specific direction in which the gradient is small, that is, the pixel value change is small, are selected as the reference pixels and the interpolation processing using the pixel values of the specific direction, for example, the linear interpolation processing, is executed.

A specific example of the processing that is executed by the image correcting unit 100 will be described with reference to FIG. 11.

Figure 11:
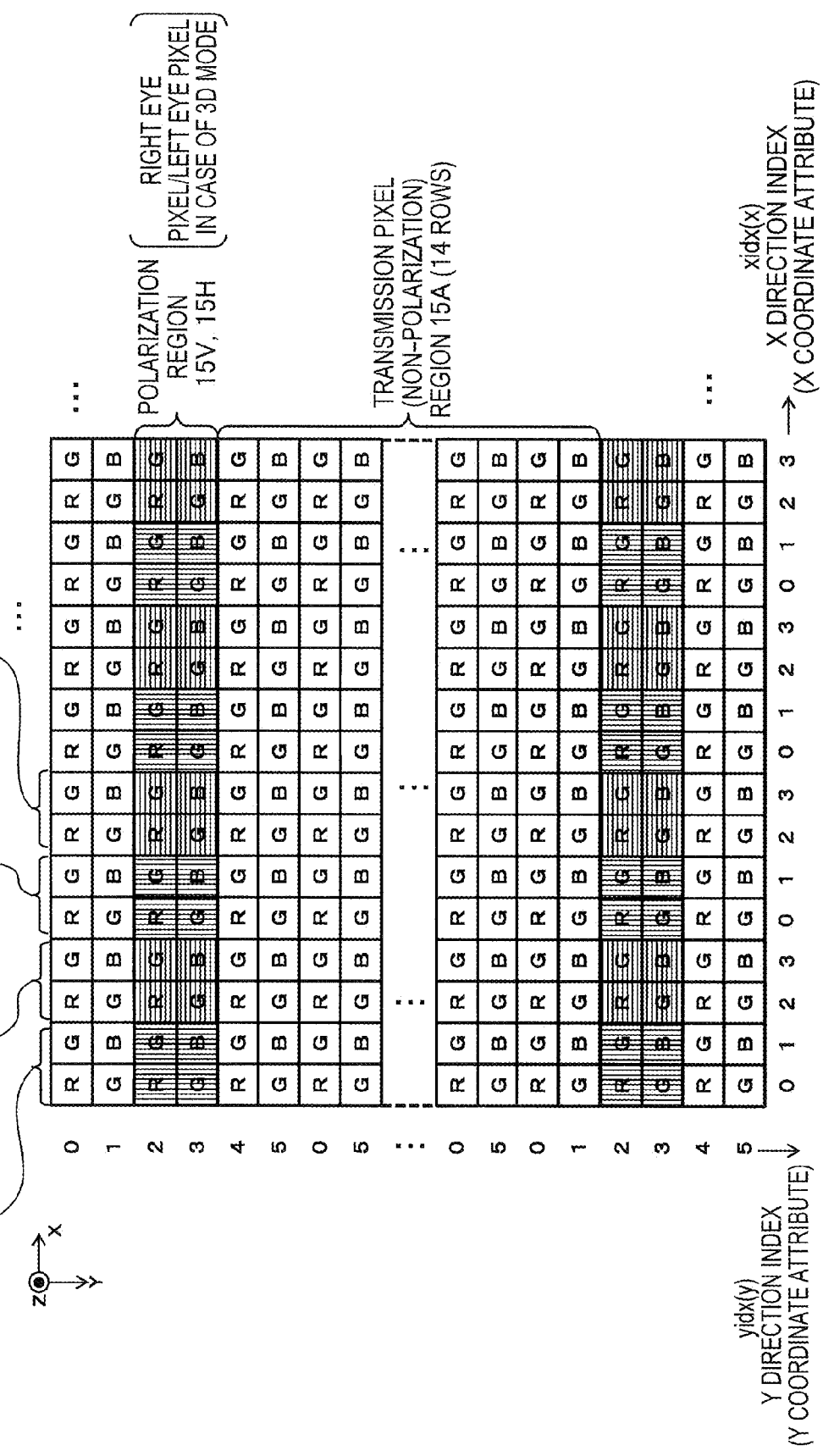
FIG. 11 is a diagram illustrating an example of an input image (Raw image) of an image correcting unit 100 and a setting example of an index to determine an attribute of each pixel of an image.

FIG. 11 is a diagram illustrating an example of an input image (Raw image) of the image correcting unit 100 and a setting example of an index to determine an attribute of each pixel of the image.

An image illustrated in FIG. 11 has the same configuration as described above with reference to FIG. 4. That is, PL pixel (polarization pixel) regions of two rows in which the vertical polarization region 15V and the horizontal polarization region 15H are set and are alternately arranged in units of rectangular regions including four pixels of 2×2 and N pixel (non-polarization pixel) regions 15A, which are total transmission pixels of fourteen rows, are repetitively arranged in the vertical direction (Y direction).

When the 3D mode is set, the left eye image, which is the image from the left viewing point, is photographed in the vertical polarization region 15V and the right eye image, which is the image from the right viewing point, is photographed in the horizontal polarization region 15H.

In the 2D mode, the image from the same viewing point as the N pixel (non-polarization pixel) region 15A, that is, the image from the viewing point that is the lens center, is photographed in both of the polarization regions 15V and 15H. However, the light amount decreases.

As illustrated in FIG. 11, an X direction index (X-coordinate attribute) and a Y direction index (Y coordinate attribute) are set to each pixel.

In the X direction index [xidx (x)], any one of 0 to 3 is set to correspond to each pixel.

In the Y direction index [yidx (y)], any one of 0 to 5 is set to correspond to each pixel.

The attributes of the pixels are determined on the basis of the values of the indexes. For example, yidx (y)=0, 5 show the N pixels not adjacent to the PL pixels, yidx (y)=1, 4 show the N pixels adjacent to the PL pixels, and yidx (y)=2, 3 show the PL pixels.

Figure 12:
FIG. 12 is a diagram illustrating a configuration of an index showing a pixel attribute.

The configurations of the indexes that show the pixel attributes are illustrated in FIG. 12.

As illustrated in FIG. 12, kinds of the indexes showing the pixel attributes are as follows.
(1) X Coordinate Attribute (X index) [xidx (x)]
(2) Y Coordinate Attribute (Y index) [yidx (y)]
(3) Viewing Point Attribute (viewing point index) [ep (x, y)]
(4) Color Attribute (color index) [color (x, y)]

A correspondence relation between a value of each attribute (index) and identification information is as follows.
(1) X Coordinate Attribute (X index) [xidx (x)]
xidx (x)=0, 1: left eye pixels or non-polarization (total transmission) pixels of column including left eye pixels
xindx (x)=2, 3: right eye pixels or non-polarization (total transmission) pixels of column including right eye pixels
(2) Y Coordinate Attribute (Y index) [yidx (y)]
yindx (y)=0, 5: non-polarization (total transmission) pixels apart from polarization pixel (PL pixel)
yindx (y)=1, 4: non-polarization (total transmission) pixels adjacent to polarization pixel (PL pixel)
yindx (y)=2, 3: polarization pixels (PL pixels)
(3) Viewing Point Attribute (viewing point index) [ep (x, y)]
ex (x, y)=0: total transmission pixel (non-polarization pixel)
ex (x, y)=−1: left eye pixel (vertical polarization pixel)
ex (x, y)=+1: right eye pixel (horizontal polarization pixel)
(4) Color Attribute (color index) [color (x, y)]
Color (x, y)=0: red (R) pixel
Color (x, y)=1: green (G) pixel
Color (x, y)=2: blue (B) pixel The image correcting unit 100 sets the index to correspond to the pixel of the input processing object image and executes processing based on the index information.

FIG. 13 is a diagram illustrating a setting example of each index of (1) an X coordinate attribute (X index) [xidx (x)] and (2) a Y coordinate attribute (Y index) [ydix (y)].

FIG. 13 illustrates an example in which coordinates of (xbase, ybase) of a pixel of a left upper end of an image are set as reference coordinates and setting is performed on the basis of a relative position from a reference point.

When the image correcting unit 100 executes processing with respect to the pixel of the input processing object image, the image correcting unit 100 determines the index (attribute) set to the pixel, determines a processing aspect, and sequentially executes processing.

Next, a specific example of processing that is executed in each structural element of the image correcting unit 100 illustrated in FIG. 9 will be described with reference to FIG. 14.

(Specific Example of Processing of Brightness Correcting Unit 101)

First, a specific example of the brightness correction processing that is executed by the brightness correcting unit 101 illustrated in FIG. 9 will be described with reference to FIG. 14.

The processing corresponds to processing of step S102 in a flowchart of FIG. 10.

As described above, the brightness correcting unit 101 receives a total pixel signal 81 from the polarization pixel separating unit 51 illustrated in FIG. 8.

That is, the brightness correcting unit 101 receives the N pixel (non-polarization pixel) signal configured by the total transmission pixels and the PL pixel (polarization pixel) signal.

The brightness correcting unit 101 corrects the brightness of the PL pixel and the PL pixel adjacent pixel included in the total pixel signal 81. As described above, in the PL pixel (polarization pixel), the incident light amount is restricted by the polarization processing by the second polarizing unit 15 and the pixel value (brightness) decreases as compared with the N pixel (non-polarization pixel), which is the total transmission pixel.

In the N pixel adjacent to the PL pixel, the brightness decreases as compared with the N pixel of which all of the peripheral pixels are the N pixels. This is because light leaked from the adjacent pixels (PL pixels) decreases in the N pixels adjacent to the PL pixel.

Therefore, the brightness correcting unit 101 corrects the brightness of the PL pixel and the PL pixel adjacent pixel included in the total pixel signal 81.

FIG. 14 is a diagram illustrating a flow of a sequence of brightness correction executed by the brightness correcting unit 101 and a specific example of brightness correction processing.

Processing of each step of the flow will be described.

First, in step S121, the brightness correcting unit 101 sequentially selects the PL pixels and the PL pixel adjacent pixels that become the brightness correction objects.

As illustrated at the lower side (reference diagram) of FIG. 14, the PL pixels and the PL pixel adjacent pixels that become the brightness correction objects are pixels having Y coordinate indexes: yidx (y)=1 to 4.

The processing of step S122 and the following processing are sequentially executed for each pixel selected in step S121.

In step S122, the brightness correcting unit 101 selects the total transmission (non-polarization) pixels positioned at the upper and lower sides of the same column of the selected pixels, having the same color, and not adjacent to the PL pixels as the reference pixels and acquires the pixel values of the reference pixels.

For example, in FIG. 14 (reference diagram), when pixels having the Y coordinate indexes: yidx (y)=1, 2 are selected as the correction object pixels, that is, when pixels included in a correction object region 141 of FIG. 14 are selected, the reference pixels are selected from a reference pixel region 142 and a reference pixel region 143 illustrated in FIG. 14.

When pixels having the Y coordinate indexes: yidx (y)=3, 4 are selected as the correction object pixels, that is, when pixels included in a correction object region 151 of FIG. 14 are selected, the reference pixels are selected from a reference pixel region 152 and a reference pixel region 153 illustrated in FIG. 14.

The total transmission (non-polarization) pixels that are positioned at the upper and lower sides of the same column of the selected pixels, have the same color, and are not adjacent to the PL pixels are selected from the upper and lower reference regions one by one and the pixel values thereof are acquired.

Next, in step S123, the brightness correcting unit 101 calculates a weighting average value [VVLerp] obtained by multiplying the weight according to the distance with the correction object pixel on the basis of the pixel values of the upper and lower two reference pixels.

In step S124, the brightness correcting unit 101 calculates gain G (x, y) on the basis of the weighting average value [VVLerp] and the pixel value [S (x, y)] of the correction object pixel.

The gain is calculated according to the following expression.

$$G(x,y)=(VVLerp)/(S(x,y))$$

Finally, in step S125, the brightness correcting unit 101 multiplies the pixel value [S (x, y)] of the correction object pixel with the gain G (x, y) and calculates the brightness correction pixel value.

The brightness correcting unit 101 executes the processing with respect to the PL pixels and the PL pixel adjacent pixels, corrects the brightness, sets the obtained values as the pixel values of the PL pixels and the PL pixel adjacent pixels, and generates the brightness correction image T.
(Specific Example of Processing of Gradient Detecting Unit 102)

Next, a specific example of the gradient detection processing that is executed by the gradient detecting unit 102 illustrated in FIG. 9 will be described with reference to FIG. 15.

This processing corresponds to the processing of step S103 in the flowchart of FIG. 10.

As described above, the gradient detecting unit 102 receives the brightness correction image 121 generated by the brightness correcting unit 101 and detects the gradient direction of the pixel value with respect to each of the PL pixels, which are the interpolation object pixels, on the basis of the pixel value of the N pixel region around the PL pixels. This processing is the same processing as the edge detection. The change rates of the pixels are calculated as gradient coefficients of four directions, including a horizontal gradient coefficient: Hgrad, a vertical gradient coefficient: Vgrad, an upward sloping gradient coefficient: Agrad, and a downward sloping gradient coefficient: Dgrad.

Processing of each step of the flow will be described.

First, in step S151, the gradient detecting unit 102 sequentially selects the processing object pixels from the PL pixels becoming the interpolation processing objects.

Next, the gradient detecting unit 102 sequentially executes the processing of step S152 with respect to the selected pixels.

In step S152, the gradient detecting unit 102 selects the total transmission (non-polarization) pixels positioned at the upper and lower sides around the selected pixels and having the same color as the reference pixels and executes the gradient detection processing based on the pixel values of the reference pixels.

Specifically, the gradient detecting unit 102 calculates gradient coefficients of four directions, including a horizontal gradient coefficient: Hgrad, a vertical gradient coefficient: Vgrad, an upward sloping gradient coefficient: Agrad, and a downward sloping gradient coefficient: Dgrad, using the pixel values of the reference pixels of the N pixel region.

As illustrated at the lower side (reference diagram) of FIG. 15, a calculation example of the vertical gradient coefficient: Vgrad is illustrated.

The selected pixel is a G pixel 161 that is positioned in the PL pixel region. The selected pixel is the G pixel 161 of xidx (x)=3 and yidx (y)=2.

When the vertical gradient coefficient with respect to the G pixel 161, which is the selected pixel, is calculated, the following processing is executed.

The brightness difference is calculated on the basis of the two upper and lower G pixels of the N pixel region of xidx=2, which is a left adjacent column of the selected pixel.

The brightness difference is calculated on the basis of the two upper and lower G pixels of the N pixel region of xidx (x)=3, which are the same column as the selected pixel.

The brightness difference is calculated on the basis of the two upper and lower G pixels of the N pixel region of xidx=0, which are a right adjacent column of the selected pixel.

The three brightness differences are calculated, the weight according to the distance from the selected pixel (G pixel 161) is set, the three brightness differences are added, and the vertical gradient coefficient Vgrad is calculated.

The gradient coefficients of the horizontal gradient coefficient: Hgrad, the vertical gradient coefficient: Vgrad, the upward sloping gradient coefficient: Agrad, and the downward sloping gradient coefficient: Dgrad are calculated by changing the combination of the reference pixels according to each direction.

As such, in step S152, the total transmission (non-polarization) pixels that are positioned at the upper and lower sides around the selected pixel and have the same color are selected as the reference pixels and the gradient detection processing based on the pixel values of the reference pixels is executed.
(Specific Example of Processing of Reflection Detecting Unit 103)

Next, a specific example of the reflection detection processing that is executed by the reflection detecting unit 103 illustrated in FIG. 9 will be described with reference to FIG. 16.

This processing corresponds to the processing of step S104 in the flowchart of FIG. 10.

As described above, the reflection detecting unit 103 receives the brightness correction image 121 generated by the brightness correcting unit 101 and determines whether reflection light is included with respect to each PL pixel.

The processing of each step of the flow will be described.

First, in step S161, the reflection detecting unit 103 sequentially selects the processing object pixels from the PL pixels becoming the interpolation processing objects.

Next, the reflection detecting unit 103 sequentially executes the processing of step S162 with respect to the selected pixels.

In step S162, the reflection detecting unit 103 executes the reflection detection processing based on the pixel values of the peripheral pixels (PL pixels) of the horizontal direction of the row of the selected pixels. Specifically, the reflection detecting unit 103 executes application processing of the reflection detection filter.

As described above, specific polarized light, in this example, vertically polarized light or horizontally polarized light, is selectively incident on the PL pixel (polarization pixel).

For example, in light reflected from a surface of water or glass, a polarized light component of a specific direction strongly appears. If the reflection light is included in a photographed image, a deviation, in which one of the pixel values of the horizontal polarization pixel and the vertical polarization pixel of the PL pixels may increase and the other may decrease, is caused.

Figure 16:
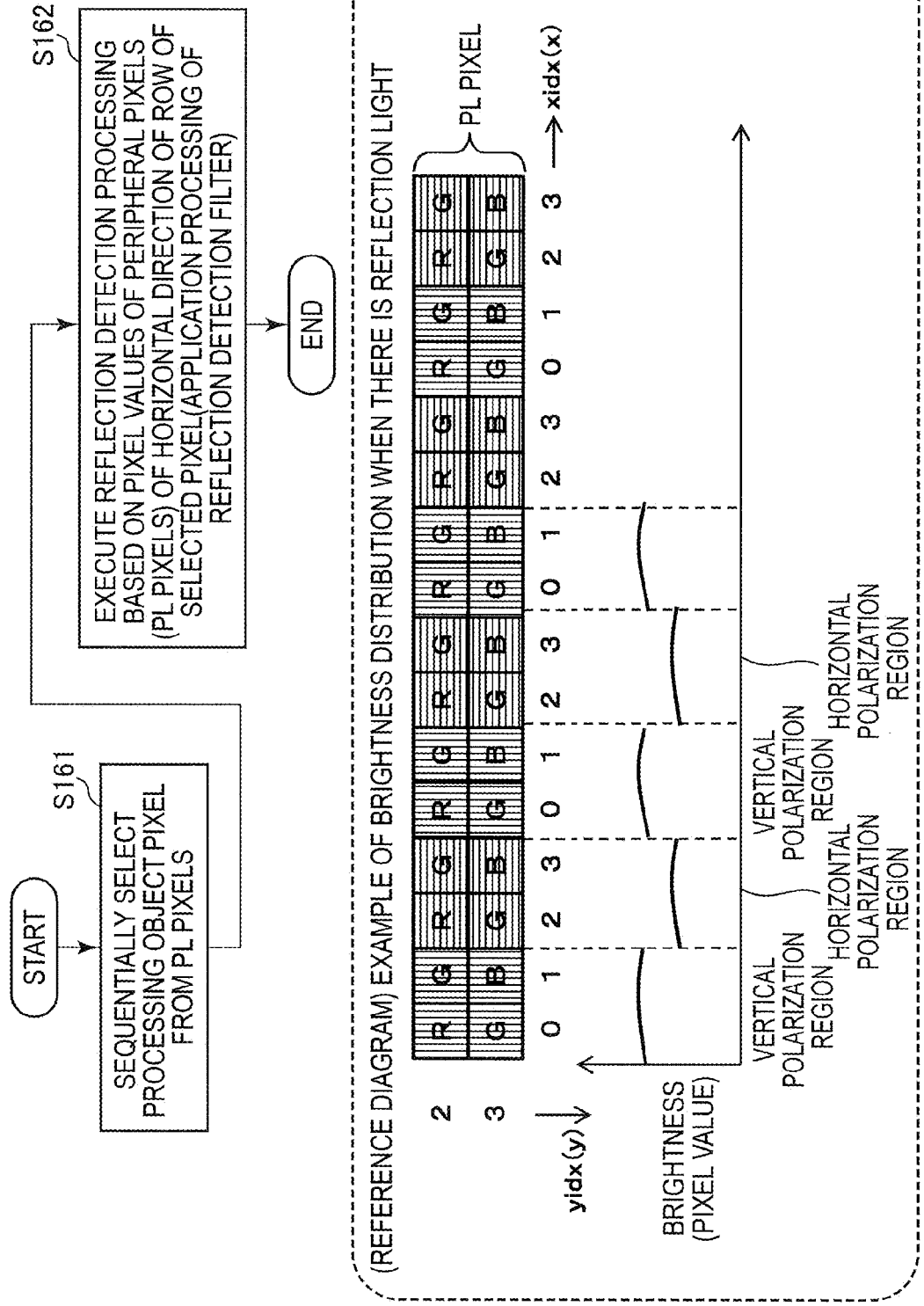
FIG. 16 is a diagram illustrating a specific example of reflection detection processing that is executed by a reflection detecting unit.

As illustrated in FIG. 16 (reference diagram), when the brightness difference (difference of the pixel values) due to the polarization is generated in the vertical polarization region and the horizontal polarization region, it can be determined that the reflection light is included.

Presence or absence of the deviation of the brightness based on the polarization is detected using the reflection detection filter.

The specific processing will be described with reference to FIGS. 17 to 20.

The reflection detection processing using the reflection detection filter is executed according to the following processing sequence: a. calculation of a parameter: Href (x, y) (refer to FIG. 17), b. calculation of a parameter: Hnoref (x, y) (refer to FIG. 18), c. calculation of parameters: ref (x, y) and noref (x, y) (refer to FIG. 19), and d. determination of a reflection presence determination result refDetect (x, y) (refer to FIG. 20).

First, processing of a. calculation of a parameter: Href (x, y) will be described with reference to FIG. 17.

As the reflection detection filter, two filters of the setting illustrated in FIG. 17 are used. That is, the two filters in which the following coefficients are set as the coefficients multiplied with respect to the seven pixels in the x direction are used.

Filter 0: +1, −2, −3, +4, +3, −2, −1
Filter 1: −1, −2, +3, +4, −3, −2, +1,

The two kinds of filters in which the above coefficients are set are applied.

As illustrated in FIG. 17, when the parameter: Href (x, y) is calculated, the selected pixel of the PL pixel that is selected as the reflection detection processing object calculates the parameter: Href (x, y) by applying the filter 1, in the case of xidx (x)=0, 2, as illustrated in FIG. 17($a1$).

FIG. 17($a1$) illustrates filter application processing when the selected pixel is the R pixel shown by a dotted circle.

In this case, the pixel values of the R pixel, the three left pixels, and the three right pixels are multiplied by each coefficient of the filter 1, the pixel values are added, and the parameter: Href (x, y) is calculated.

In addition, the selected pixel of the PL pixel that is selected as the reflection detection processing object calculates the parameter: Href (x, y) by applying the filter 0, in the case of xidx (x)=1, 3, as illustrated in FIG. 17($a2$).

FIG. 17($a2$) illustrates filter application processing when the selected pixel is the G pixel shown by a dotted circle.

In this case, the pixel values of the G pixel, the three left pixels, and the three right pixels are multiplied by each coefficient of the filter 0, the pixel values are added, and the parameter: Href (x, y) is calculated.

Next, processing of b. calculation of a parameter: Hnoref (x, y) will be described with reference to FIG. 18.

As the reflection detection filter, the same filters as the filters described with reference to FIG. 17 are applied. That is, the two filters in which the following coefficients are set as the coefficients multiplied with respect to the seven pixels in the x direction are applied.

Filter 0: +1, −2, −3, +4, +3, −2, −1
Filter 1: −1, −2, +3, +4, −3, −2, +1,

The two kinds of filters in which the above coefficients are set are applied.

When the processing of b. calculation of a parameter: Hnoref (x, y) illustrated in FIG. 18 is executed, filer application processing that is inverse to the filter application aspect of the calculation processing of the parameter: Href (x, y) described with reference to FIG. 17 is executed.

That is, as illustrated in FIG. 18, when the parameter: Hnoref (x, y) is calculated, the selected pixel of the PL pixel that is selected as the reflection detection processing object calculates the parameter: Hnoref (x, y) by applying the filter 0, in the case of xidx (x)=0, 2, as illustrated in FIG. 18($b1$).

FIG. 18($b1$) illustrates filter application processing when the selected pixel is the R pixel shown by a dotted circle.

In this case, the pixel values of the R pixel, the three left pixels, and the three right pixels are multiplied with each coefficient of the filter 0, the pixel values are added, and the parameter: Hnoref (x, y) is calculated.

In addition, the selected pixel of the PL pixel that is selected as the reflection detection processing object calculates the parameter: Hnoref (x, y) by applying the filter 1, in the case of xidx (x)=1, 3, as illustrated in FIG. 18($b2$).

FIG. 18($b2$) illustrates filter application processing when the selected pixel is the G pixel shown by a dotted circle.

In this case, the pixel values of the G pixel, the three left pixels, and the three right pixels are multiplied by each coefficient of the filter 1, the pixel values are added, and the parameter: Hnoref (x, y) is calculated.

Next, processing of c. calculation of parameters: ref (x, y) and noref (x, y) will be described with reference to FIG. 19.

The parameters: ref (x, y) and noref (x, y) are calculated by the following expressions.

In the case of yidx (y)=2, ref (x, y)=Href (x, y)+H (ref (x, y+1) and noref (x, y)=Hnoref (x, y)+Hnoref (x, y+1)

In the case of yidx (y)=3, ref (x, y)=Href (x, y−1)+H (ref (x, y)) and noref (x, y)=Hnoref (x, y−1)+Hnoref (x, y)

FIG. 19 (reference diagram) illustrates the calculation processing example of ref (x, y)=Href (x, y)+H (ref (x, y+1)) in the case of yidx (y)=2.

The sum of the value of Href in the two rows of the PL pixels is calculated and ref (x, y) is calculated.

Next, determination processing of d. a reflection presence determination result: refDetect (x, y) will be described with reference to FIG. 20.

The determination processing of d. a reflection presence determination result: refDetect (x, y) is executed as the determination processing based on the parameters: ref (x, y) and noref (x, y) described with reference to FIG. 19.

Specifically, as illustrated in FIG. 20, when a conditional expression of any one of ref (x, y)≤noref (x, y), ref (x, y)≤noref (x, y+2), ref (x, y)≤ref (x, y+2), ref (x, y)≤noref (x, y−2), and ref (x, y)≤noref (x, y−2), is realized, refDetect (x, y)=false, that is, it is determined that there is no reflection in the pixel.

When none of the conditional expressions is realized, refDetect (x, y)=true, that is, it is determined that there is reflection in the pixel.

The reflection detecting unit 103 illustrated in FIG. 9 executes the processing described with reference to FIGS. 17 to 20 with respect to each of the PL pixels and determines whether the reflection light is included with respect to the PL pixel. The reflection detecting unit 103 generates reflection light presence information corresponding to the PL pixel as the reflection information 123 illustrated in FIG. 9 and outputs the information to the interpolation processing unit 104.

(Specific Example of Processing of Interpolation Processing Unit 104)

Next, a specific example of the interpolation processing that is executed by the interpolation processing unit 104 illustrated in FIG. 9 will be described with reference to FIGS. 21 and 22.

This processing corresponds to the processing of step S106 in the flowchart of FIG. 10.

The interpolation processing unit 104 receives the brightness correction image 121 that is generated by the brightness correcting unit 101, the gradient information 122 that is generated by the gradient detecting unit 102, and the reflection information 123 that is detected by the reflection detecting unit 103, as described with reference to FIG. 9.

The interpolation processing unit 104 executes pixel interpolation processing as correction processing of the pixel value of the PL pixel region. When the interpolation processing unit 104 executes the interpolation processing, the interpolation processing unit 104 uses the gradient information 122 generated by the gradient detecting unit 102 and the reflection information 123 detected by the reflection detecting unit 103 and executes the interpolation processing according to an interpolation aspect determined according to the information.

As the result of the interpolation processing, the 2D-Raw image 62 that is the output of the image correcting unit 100 illustrated in FIG. 8 is generated.

Figure 21:
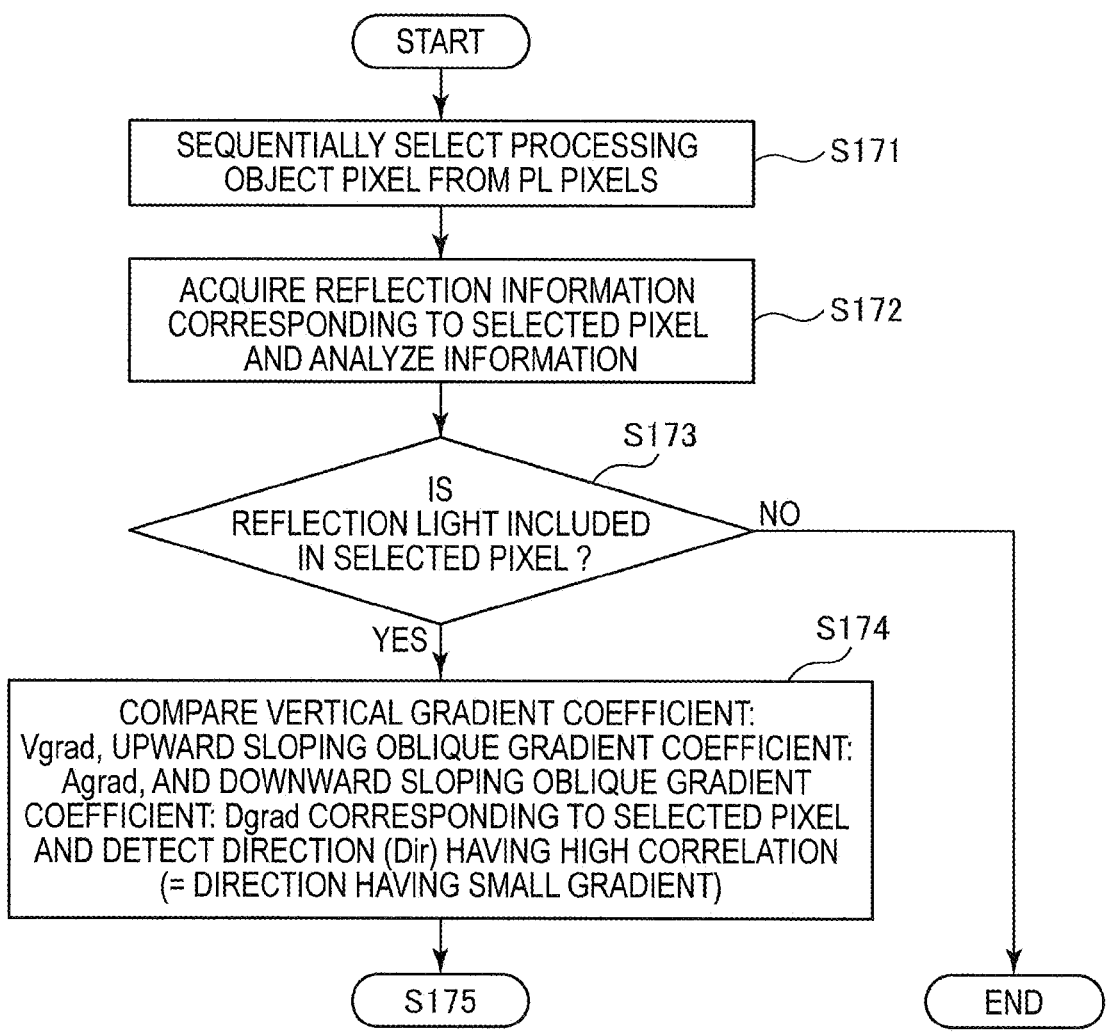
FIG. 21 is a flowchart illustrating a specific example of interpolation processing that is executed by an interpolation processing unit.
Figure 22:
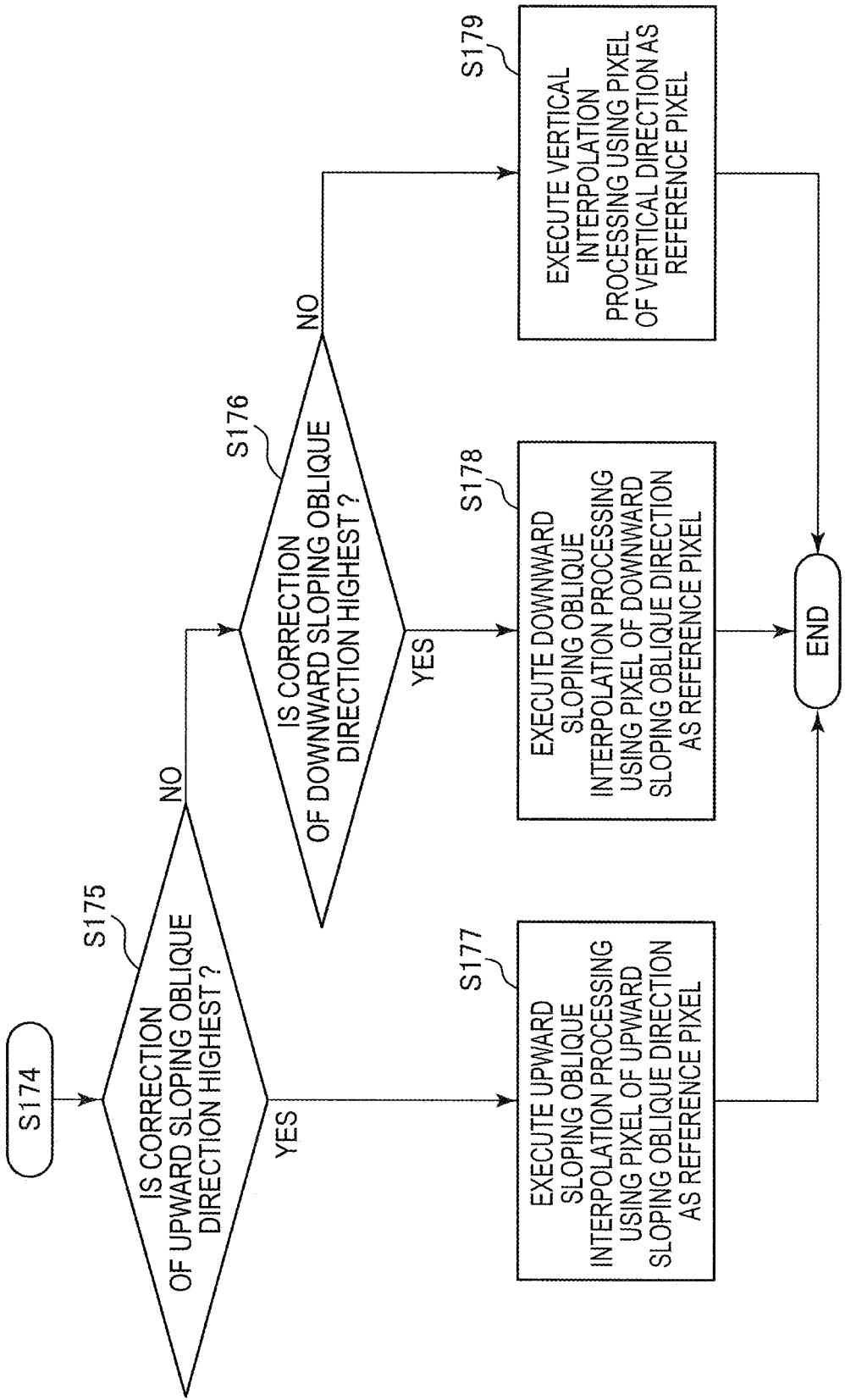
FIG. 22 is a flowchart illustrating a specific example of interpolation processing that is executed by the interpolation processing unit.

FIGS. 21 and 22 are flowcharts illustrating sequences of the interpolation processing that is executed by the interpolation processing unit 104.

The processing of each step of the flowcharts illustrated in FIGS. 21 and 22 will be described.

First, in step S171, the interpolation processing unit 104 sequentially selects the processing object pixels from the PL pixels becoming the interpolation processing objects.

Next, the interpolation processing unit 104 sequentially executes the processing of step S172 and the following processing.

In step S172, the interpolation processing unit 104 executes analysis processing of reflection information corresponding to one PL pixel selected as the interpolation processing object, that is, the reflection information 123 generated by the reflection detecting unit 103 illustrated in FIG. 9.

Specifically, the interpolation processing unit 104 determines whether reflection light is included in a pixel value of the one PL pixel selected as the interpolation processing object.

In step S173, when it is determined that the reflection light is included in the selected pixel, the processing proceeds to step S174.

In step S173, when it is determined that the reflection light is not included in the selected pixel, the processing ends without executing the interpolation processing. In this case, with respect to the PL pixel not including the reflection light, the PL pixel in which the brightness is corrected by the brightness correcting unit 101 is output.

Meanwhile, in step S173, when it is determined that the reflection light is included in the selected pixel, the processing proceeds to step S174 and the interpolation processing in which the N pixel is applied as the reference pixel is executed.

In step S174, the interpolation processing unit 104 executes analysis processing of the gradient information corresponding to the one PL pixel selected as the interpolation processing object, that is, the gradient information 122 generated by the gradient detecting unit 102. Specifically, the interpolation processing unit 104 executes comparison processing of the three gradient coefficients of the vertical gradient coefficient: Vgrad, the upward sloping gradient coefficient: Agrad, and the downward sloping gradient coefficient: Dgrad that are included in the gradient information 122 generated by the gradient detecting unit 102. The interpolation processing unit 104 compares the gradient coefficients and selects a direction (Dir) having a high correlation.

The direction in which the gradient coefficient is large is a direction in which a change rate of the pixel value is high.

The interpolation processing unit 104 compares the three gradient coefficients and selects a direction in which the gradient coefficient is smallest as the direction (Dir) having the high correlation.

The direction (Dir) that has the high correlation corresponds to a direction in which a change rate of the pixel value is small, that is, an edge direction.

Next, in step S175, the interpolation processing unit 104 determines whether the upward sloping gradient coefficient: Agrad is smallest and the correlation of the upward sloping direction is highest on the basis of the comparison of the three gradient coefficients of the vertical gradient coefficient: Vgrad, the upward sloping gradient coefficient: Agrad, and the downward sloping gradient coefficient: Dgrad.

In step S175, when it is determined that the correction of the upward sloping direction is highest, the processing proceeds to step S177.

In other cases, the processing proceeds to step S176.

When it is determined that the correlation of the upward sloping direction is highest in step S175, and the processing proceeds to step S177, in step S177, the interpolation processing unit 104 executes the interpolation processing using the reference pixels of the upward sloping direction, with respect to the selected interpolation object pixels (PL pixels). The pixels that are selected as the reference pixels are pixels that have the same colors as the selected interpolation object pixels (PL pixels) and are at least the N pixels (non-polarization pixels) that are closest to the interpolation object pixels (PL pixels).

Specifically, the interpolation processing unit 104 selects the two or more pixels having the same color in the upper N pixel region and the lower N pixel region of the PL pixel region along the line of the upward sloping direction of the selected interpolation object pixels (PL pixels) as the reference pixels and executes the linear interpolation processing to which the pixel values of the reference pixels are applied.

Meanwhile, in step S175, when it is determined that the correlation of the upward sloping direction is not highest, the processing proceeds to step S176. In step S176, the interpolation processing unit 104 determines whether the downward sloping gradient coefficient: Dgrad is smallest and the correlation of the downward sloping direction is highest on the basis of the comparison of the three gradient coefficients of the vertical gradient coefficient: Vgrad, the upward sloping gradient coefficient: Agrad, and the downward sloping gradient coefficient: Dgrad.

In step S176, when it is determined that the correlation of the downward sloping direction is highest, the processing proceeds to step S178.

In other cases, the processing proceeds to step S179.

When it is determined that the correlation of the upward sloping direction is highest in step S176 and the processing proceeds to step S178, in step S178, the interpolation processing unit 104 executes the interpolation processing using the reference pixels of the downward sloping direction with respect to the selected interpolation object pixels (PL pixels). The pixels that are selected as the reference pixels are pixels that have the same colors as the selected interpolation object pixels (PL pixels) and are at least the N pixels (non-polarization pixels) that are closest to the interpolation object pixels (PL pixels).

Specifically, the interpolation processing unit 104 selects the two or more pixels having the same color in the upper N pixel region and the lower N pixel region of the PL pixel region along the line of the upward sloping direction of the selected interpolation object pixels (PL pixels) as the selected pixels and executes the linear interpolation processing to which the pixel values of the reference pixels are applied.

In step S176, when it is determined that the correlation of the upward sloping direction is not highest, the processing proceeds to step S179.

In step S179, the interpolation processing unit 104 executes the interpolation processing using the reference pixels of the vertical direction, with respect to the selected interpolation object pixels (PL pixels). The pixels that are selected as the reference pixels are pixels that have the same colors as the selected interpolation object pixels (PL pixels) and are the N pixels (non-polarization pixels) that are closest to the interpolation object pixels (PL pixels).

Specifically, the interpolation processing unit 104 selects the two or more pixels having the same color in the upper N pixel region and the lower N pixel region of the PL pixel region along the line of the vertical direction of the selected interpolation object pixels (PL pixels) as the reference pixels and executes the linear interpolation processing to which the pixel values of the reference pixels are applied.

The interpolation processing example with respect to the image photographed in the 2D image photographing mode has been described.

For a summary of the interpolation processing, the processing that is executed by the image correcting unit 100 illustrated in FIGS. 8 and 9 can be summarized as follows.

(a) Correction of the brightness of the PL pixel and the pixel adjacent to the PL pixel with the same brightness level as the N pixel not adjacent to the PL pixel (b) Detection of the gradient information corresponding to each PL pixel becoming the interpolation processing object (c) Detection of reflection information on whether reflection light is included in each PL pixel becoming the interpolation processing object (d) Output of the PL pixel in which the brightness correction and the interpolation processing using the N pixels of the direction having the high correlation selected from the three directions of the vertical direction, the upward sloping direction, and the downward sloping direction as the reference pixels are performed, when the PL pixel becoming the interpolation processing object includes the reflection light (e) Output of the PL pixel in which the brightness correction is performed, when the PL pixel becoming the interpolation processing object does not include the reflection light The image correcting unit 100 generates the interpolation image, that is, the interpolation image (2D-Raw image) 62 illustrated in FIG. 8, by the processing.

[2-(2). Interpolation Processing Example 1 with respect to Image Photographed in 3D Image Photographing Mode]

Next, the interpolation processing example 1 with respect to the image photographed in the 3D image photographing mode will be described.

As described above with reference to FIG. 7, the imaging apparatus 10 has a configuration in which a photographing mode of the image can be switched into a 2D mode to photograph a 2D image and a 3D mode to photograph a left eye image and a right eye image to be applicable to display of a three-dimensional image.

As illustrated in FIGS. 7A and 7B, the first polarizing unit 12 is set to the optical path in the 3D mode and the first polarizing unit 12 is removed from the optical path in the 2D mode.

When an image is photographed in the 3D mode, the following images are photographed in the PL pixels (polarization pixels), as described above.

The left eye image (image viewed from the center of gravity point 31 of FIG. 1B) is photographed in the vertical polarization pixel and the right eye image (image viewed from the center of gravity point 32 of FIG. 1B) is photographed in the horizontal polarization pixel. In the N pixel (non-polarization pixel), which is the total transmission pixel, an image viewed from the center of the lens (image viewed from the center point 33 of FIG. 1B) is photographed.

The interpolation processing example to be described below is an example of interpolation processing that is executed in the image correcting unit 100 with respect to the image photographed in the 3D mode.

In this embodiment, the entire configuration of the imaging apparatus is the same as the configuration illustrated in FIGS. 1A to 1C and the configuration of the image processing unit 17 is the same as the configuration illustrated in FIG. 8.

The configuration of the image correcting unit 100 of the image processing unit 17 is the same as the configuration illustrated in FIG. 9 that has already been described in 2-(1). Interpolation Processing Example with respect to Image Photographed in 2D Image Photographing Mode.

As illustrated in FIG. 9, the image correcting unit 100 includes a brightness correcting unit 101, a gradient detecting unit 102, a reflection detecting unit 103, and an interpolation processing unit 104.

As described above, the image correcting unit 100 receives the total pixel signal 81 from the polarization pixel separating unit 51 illustrated in FIG. 8.

That is, the image correcting unit 100 receives the N pixel (non-polarization pixel) signal configured by the total transmission pixels and the PL pixel (polarization pixel) signal.

In this embodiment, the processing that is executed by the brightness correcting unit 101, the gradient detecting unit 102, and the reflection detecting unit 103 of the image correcting unit 100 becomes the same processing as the processing already described in 2-(1). Interpolation Processing Example with respect to Image Photographed in 2D Image Photographing Mode.

That is, (a) the brightness correcting unit 101 executes the brightness correction processing for correcting the brightness of the PL pixel and the pixel adjacent to the PL pixel with the same brightness level as the N pixel not adjacent to the PL pixel.

(b) The gradient detecting unit 102 executes the detection of the gradient information corresponding to each PL pixel becoming the interpolation processing object.

(c) The reflection detecting unit 103 executes the detection of the reflection information on whether the reflection light is included in each PL pixel becoming the interpolation processing object.

The processing described above becomes the same processing as the processing already described in 2-(1). Interpolation Processing Example with respect to Image Photographed in 2D Image Photographing Mode.

The processing in the interpolation processing unit 104 becomes processing that is different from the processing already described (processing described with reference to FIGS. 20 and 21).

Figure 23:
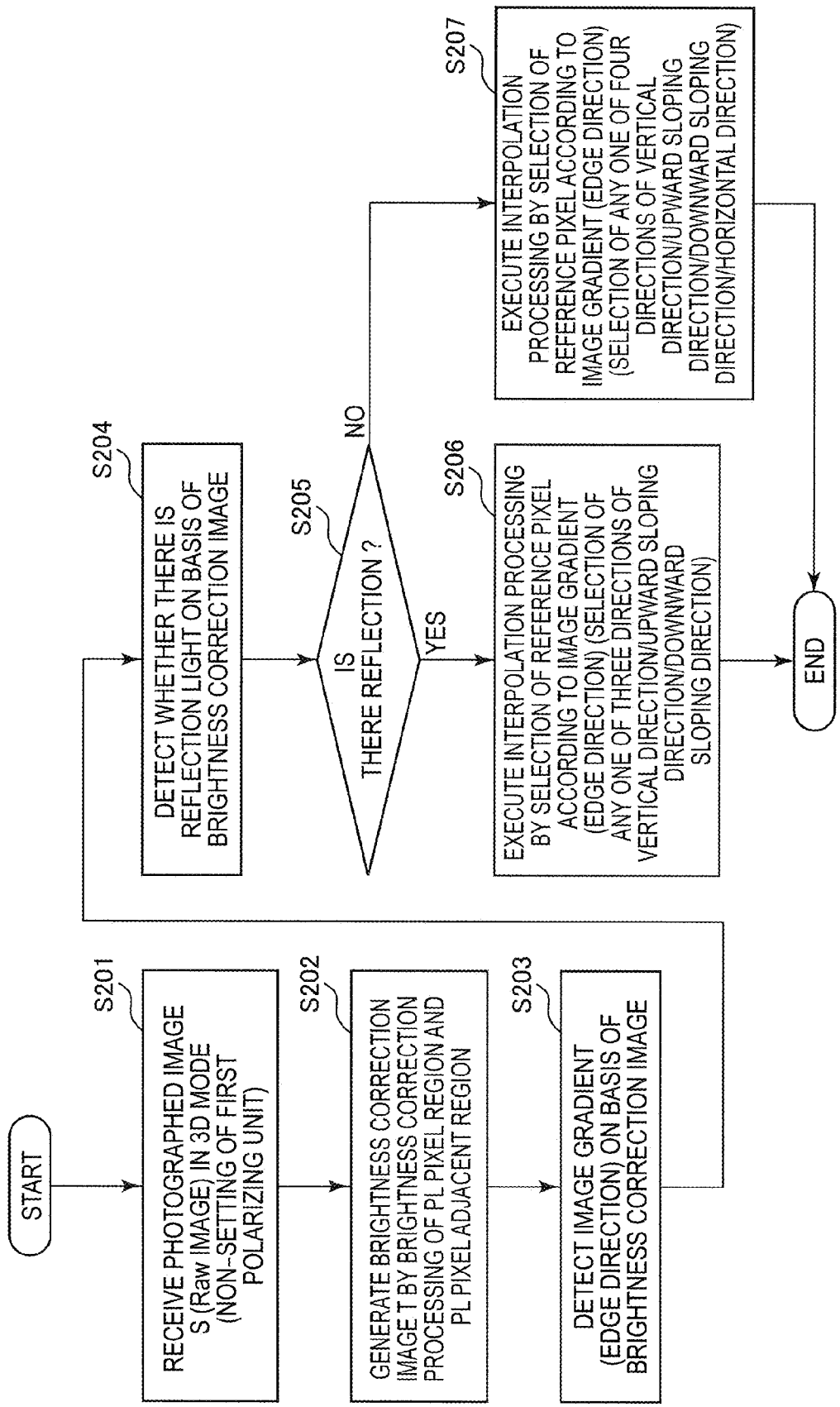
FIG. 23 is a flowchart illustrating an example of a sequence of processing that is executed by the image correcting unit.

FIG. 23 is a flowchart illustrating a sequence of processing that is executed by the image correcting unit 100 according to this embodiment.

In step S201, the image correcting unit 100 receives an image S (Raw image) that is photographed in the 3D mode (setting of the first polarizing unit).

The processing of steps S202 to S205 to be described below becomes the same processing as the processing of steps S102 to S105 already described with reference to FIG. 10 in 2-(1). Interpolation Processing Example with respect to Image Photographed in 2D Image Photographing Mode.

That is, in step S202, the image correcting unit 100 generates a brightness correction image T by the brightness correction processing of the PL pixel region and the PL pixel peripheral area.

This processing is the processing that is executed by the brightness correcting unit 101 illustrated in FIG. 9.

Next, in step S203, the image correcting unit 100 detects the image gradient (edge direction) on the basis of the brightness correction image T.

This processing is the processing that is executed by the gradient detecting unit 102 illustrated in FIG. 9.

Next, in step S204, the image correcting unit 100 detects whether there is reflection light on the basis of the brightness correction image.

This processing is the processing that is executed by the reflection detecting unit 103 illustrated in FIG. 9.

In step S205, with respect to the pixel (PL pixel) in which it is determined that the reflection light is detected, the image correcting unit 100 executes the correction processing, specifically, the interpolation processing using the peripheral N pixels as the reference pixels, in step S206.

The interpolation processing in step S206 is executed by determining setting directions of the reference pixels according to gradient information of three directions of a vertical direction, an upward sloping direction, and a downward sloping direction, among the gradient information generated by the gradient detecting unit 102. Specifically, the N pixels of the specific direction in which the gradient is small, that is, in which the pixel value change is small, are selected as the reference pixels and the interpolation processing using the pixel values of the specific direction, for example, the linear interpolation processing, is executed.

This processing becomes the same processing as the processing of step S106 already described with reference to FIG. 10 in 2-(1). Interpolation Processing Example with respect to Image Photographed in 2D Image Photographing Mode.

In step S205, with respect to the pixel (PL pixel) in which it is determined that the reflection light is not detected, the image correcting unit 100 executes the correction processing, specifically, the interpolation processing using the peripheral N pixels as the reference pixels, in step S207.

The interpolation processing in step S207 is executed by determining setting directions of the reference pixels according to the gradient information of four directions of a vertical direction, an upward sloping direction, a downward sloping direction, and a horizontal direction, among the gradient information generated by the gradient detecting unit 102. Specifically, the N pixels of the specific direction in which the gradient is small, that is, in which the pixel value change is small, are selected as the reference pixels and the interpolation processing using the pixel value of the specific direction, for example, the linear interpolation processing, is executed.

In the processing described with reference to FIG. 10 in 2-(1). Interpolation Processing Example with respect to Image Photographed in 2D Image Photographing Mode, the pixels in which the brightness is corrected are used as the output pixels without executing the interpolation processing with respect to the PL pixel in which the reflection light is not detected.

However, in this embodiment, with respect to the PL pixel in which the reflection light is not detected, the reference pixels are determined according to the gradient information and the interpolation processing using the pixel values of the reference pixels is executed.

This point is different from the previous processing example.

That is, the interpolation processing aspect that is executed in the interpolation processing unit 104 is different.

The interpolation processing that is executed by the interpolation processing unit 104 will be described with reference to flowcharts illustrated in FIGS. 24 to 26.

The interpolation processing unit 104 receives the brightness correction image 121 that is generated by the brightness correcting unit 101, the gradient information 122 that is generated by the gradient detecting unit 102, and the reflection information 123 that is detected by the reflection detecting unit 103, as described with reference to FIG. 9.

The interpolation processing unit 104 executes pixel interpolation processing as correction processing of the pixel value of the PL pixel region. When the interpolation processing unit 104 executes the interpolation processing, the interpolation processing unit 104 uses the gradient information 122 generated by the gradient detecting unit 102 and the reflection information 123 detected by the reflection detecting unit 103 and executes the interpolation processing according to an interpolation aspect determined according to the information.

As the result of the interpolation processing, the 2D-Raw image 62 that is the output of the image correcting unit 100 illustrated in FIG. 8 is generated.

Figure 24:
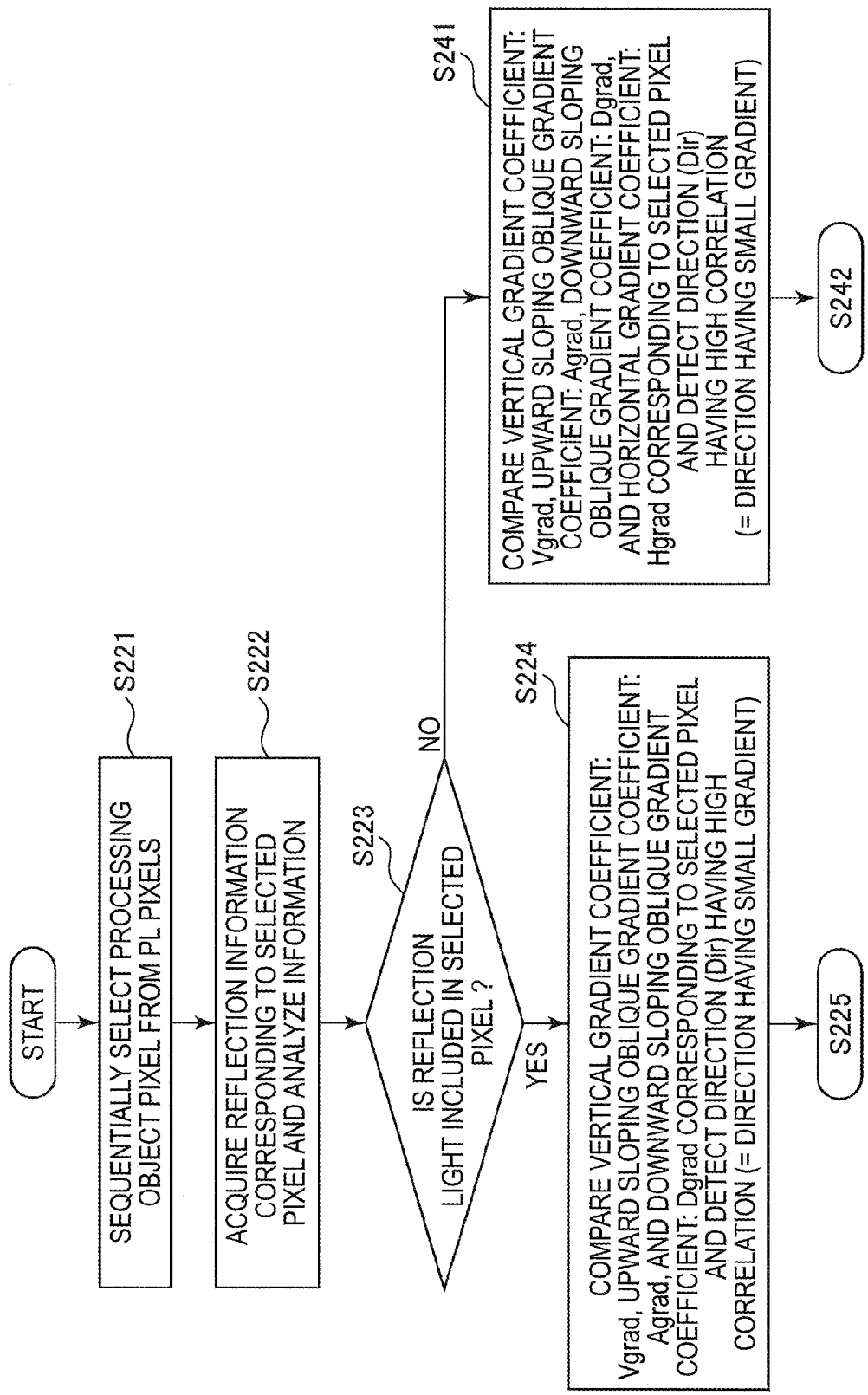
FIG. 24 is a flowchart illustrating a specific example of interpolation processing that is executed by the interpolation processing unit.
Figure 25:
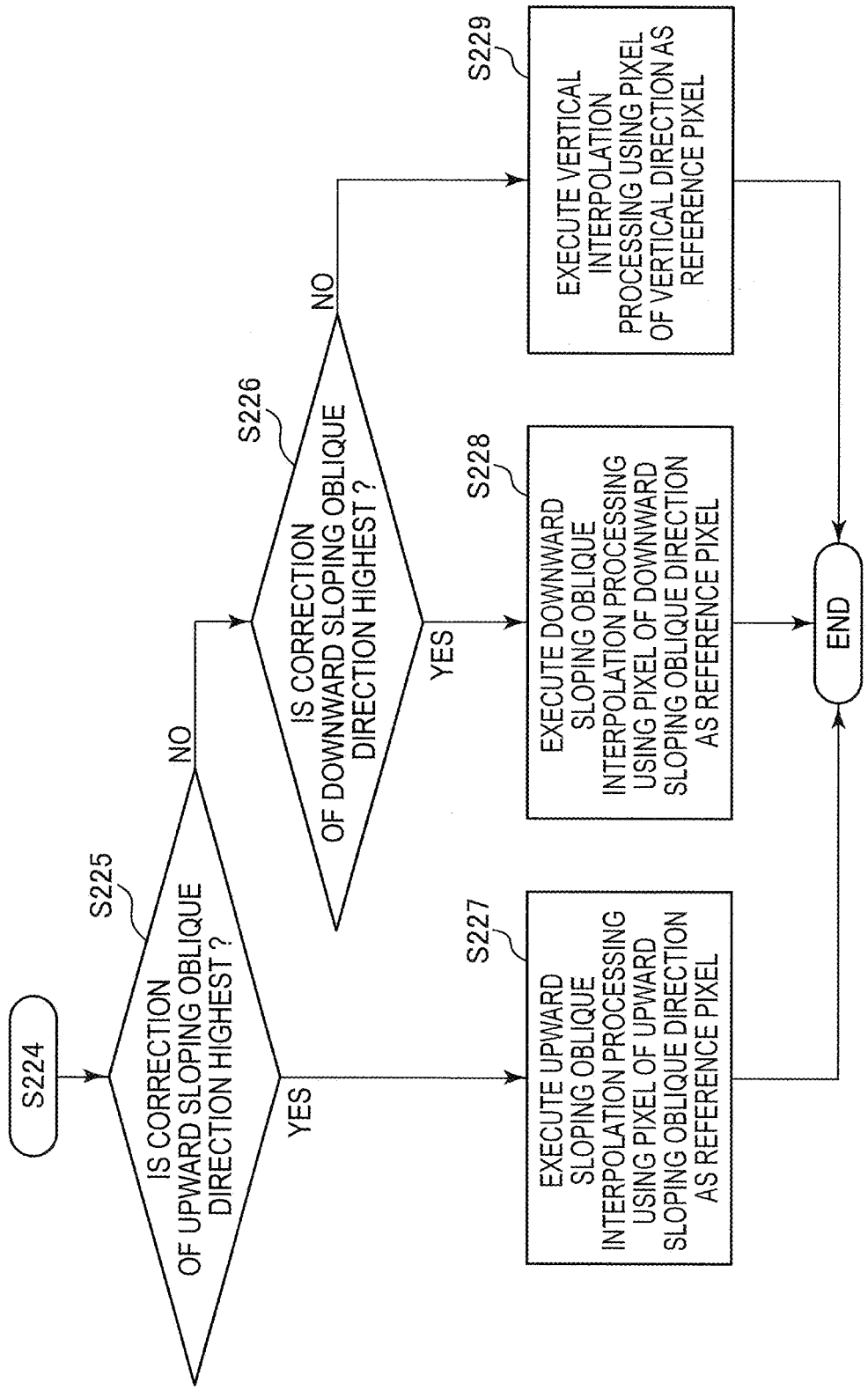
FIG. 25 is a flowchart illustrating a specific example of interpolation processing that is executed by the interpolation processing unit.
Figure 26:
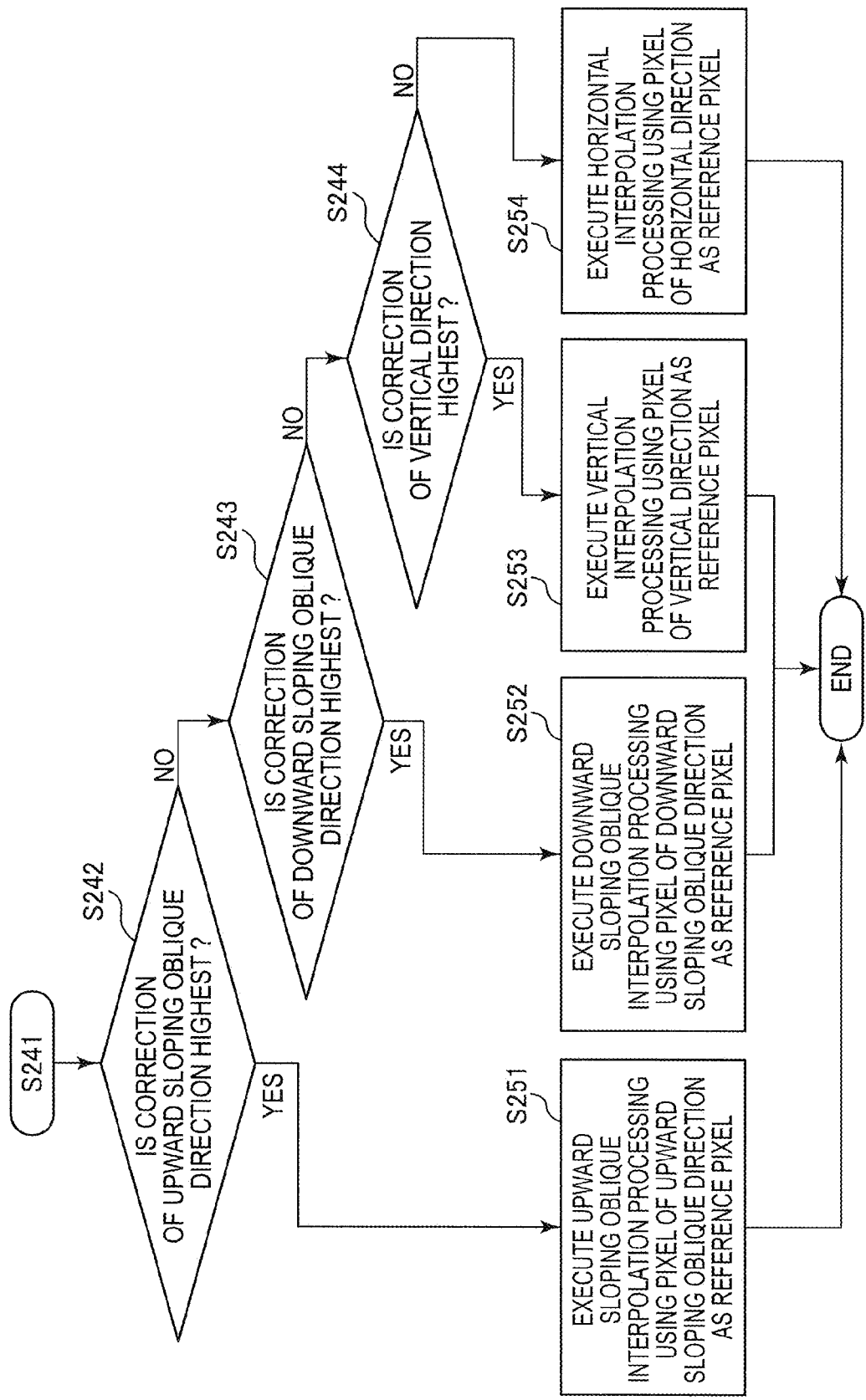
FIG. 26 is a flowchart illustrating a specific example of interpolation processing that is executed by the interpolation processing unit.

The processing of each step of the flowcharts that are illustrated in FIGS. 24 to 26 will be described.

First, in step S221, the interpolation processing unit 104 sequentially selects the processing object pixels from the PL pixels becoming the interpolation processing objects.

Next, the processing of step S222 and the following processing are sequentially executed with respect to the selected pixels.

In step S222, the interpolation processing unit 104 executes analysis processing of the reflection information corresponding to one PL pixel selected as the interpolation processing object, that is, the reflection information 123 generated by the reflection detecting unit 103 illustrated in FIG. 9.

Specifically, the interpolation processing unit 104 determines whether reflection light is included in a pixel value of the one PL pixel selected as the interpolation processing object.

In step S223, when it is determined that the reflection light is included in the selected pixel, the processing proceeds to step S224.

In step S223, when it is determined that the reflection light is not included in the selected pixel, the processing proceeds to step S241.

The interpolation processing of step S224 and the following steps when it is determined that the reflection light is included in the selected pixel becomes the same processing as the processing already described with reference to FIGS. 21 and 22 in 2-(1). Interpolation Processing Example with respect to Image Photographed in 2D Image Photographing Mode.

That is, in step S223, when it is determined that the reflection light is included in the selected pixel, the processing proceeds to step S224 and the interpolation processing unit 104 executes analysis processing of the gradient information corresponding to the one PL pixel selected as the interpolation processing object, that is, the gradient information 122 generated by the gradient detecting unit 102. Specifically, the interpolation processing unit 104 executes comparison processing of the three gradient coefficients of the vertical gradient coefficient: Vgrad, the upward sloping gradient coefficient: Agrad, and the downward sloping gradient coefficient: Dgrad that are included in the gradient information 122 generated by the gradient detecting unit 102. The interpolation processing unit 104 compares the gradient coefficients and selects the direction (Dir) having the high correlation.

The direction in which the gradient coefficient is large is a direction in which a change rate of the pixel value is high.

The interpolation processing unit 104 compares the three gradient coefficients and selects the direction in which the gradient coefficient is smallest as the direction (Dir) having the high correlation.

The direction (Dir) that has the high correlation corresponds to a direction in which a change rate of the pixel value is small, a so-called edge direction.

Next, in step S225, the interpolation processing unit 104 determines whether the upward sloping gradient coefficient: Agrad is smallest and the correlation of the upward sloping direction is highest on the basis of the comparison of the three gradient coefficients of the vertical gradient coefficient: Vgrad, the upward sloping gradient coefficient: Agrad, and the downward sloping gradient coefficient: Dgrad.

In step S225, when it is determined that the correction of the upward sloping direction is highest, the processing proceeds to step S227.

In other cases, the processing proceeds to step S226.

When it is determined that the correlation of the upward sloping direction is highest in step S225 and the processing proceeds to step S227, in step S227, the interpolation processing unit 104 executes the interpolation processing using the reference pixels of the upward sloping direction, with respect to the selected interpolation object pixels (PL pixels). The pixels that are selected as the reference pixels are pixels that have the same colors as the selected interpolation object pixels (PL pixels) and are at least the N pixels (non-polarization pixels) that are closest to the interpolation object pixels (PL pixels).

Specifically, the interpolation processing unit 104 selects the two or more pixels having the same color in the upper N pixel region and the lower N pixel region of the PL pixel region along the line of the upward sloping direction of the selected interpolation object pixels (PL pixels) as the reference pixels and executes the linear interpolation processing to which the pixel values of the reference pixels are applied.

Meanwhile, in step S225, when it is determined that the correlation of the upward sloping direction is not highest, the processing proceeds to step S226. In step S226, the interpolation processing unit 104 determines whether the downward sloping gradient coefficient: Dgrad is smallest and the correlation of the downward sloping direction is highest on the basis of the comparison of the three gradient coefficients of the vertical gradient coefficient: Vgrad, the upward sloping gradient coefficient: Agrad, and the downward sloping gradient coefficient: Dgrad.

In step S226, when it is determined that the correlation of the downward sloping direction is highest, the processing proceeds to step S228.

In other cases, the processing proceeds to step S229.

When it is determined that the correlation of the downward sloping direction is highest in step S226 and the processing proceeds to step S228, in step S228, the interpolation processing unit 104 executes the interpolation processing using the reference pixels of the downward sloping direction with respect to the selected interpolation object pixels (PL pixels). The pixels that are selected as the reference pixels are pixels that have the same colors as the selected interpolation object pixels (PL pixels) and are at least the N pixels (non-polarization pixels) that are closest to the interpolation object pixels (PL pixels).

Specifically, the interpolation processing unit 104 selects the two or more pixels having the same color in the upper N pixel region and the lower N pixel region of the PL pixel region along the line of the downward sloping direction of the selected interpolation object pixels (PL pixels) as the reference pixels and executes the linear interpolation processing to which the pixel values of the reference pixels are applied.

In step S226, when it is determined that the correlation of the downward sloping direction is not highest, the processing proceeds to step S229.

In step S229, the interpolation processing unit 104 executes the interpolation processing using the reference pixels of the vertical direction with respect to the selected interpolation object pixels (PL pixels). The pixels that are selected as the reference pixels are pixels that have the same colors as the selected interpolation object pixels (PL pixels) and are at least the N pixels (non-polarization pixels) that are closest to the interpolation object pixels (PL pixels).

Specifically, the interpolation processing unit 104 selects the two or more pixels having the same color in the upper N pixel region and the lower N pixel region of the PL pixel region along the line of the vertical direction of the selected interpolation object pixels (PL pixels) as the reference pixels and executes the linear interpolation processing to which the pixel values of the reference pixels are applied.

Next, processing when it is determined that the reflection light is not included in the PL pixel as the interpolation object pixel in step S223 of the flow illustrated in FIG. 24 and the processing proceeds to step S241 will be described.

This processing corresponds to the processing of step S207 of the flow illustrated in FIG. 23, that is, the interpolation processing when it is determined that the reflection light is not included in the PL pixel as the interpolation object pixel.

In step S241 of the flow illustrated in FIG. 24, the interpolation processing unit 104 executes analysis processing of the gradient information corresponding to one PL pixel selected as the interpolation processing object, that is, the gradient information 122 generated by the gradient detecting unit 102. Specifically, the interpolation processing unit 104 executes comparison processing of the four gradient coefficients of the vertical gradient coefficient: Vgrad, the upward sloping gradient coefficient: Agrad, the downward sloping gradient coefficient: Dgrad, and the horizontal gradient coefficient: Hgrad that are included in the gradient information 122 generated by the gradient detecting unit 102. The interpolation processing unit 104 compares the gradient coefficients and selects the direction (Dir) having the high correlation.

The direction in which the gradient coefficient is large is a direction in which a change rate of the pixel value is high.

The interpolation processing unit 104 compares the four gradient coefficients and selects the direction in which the gradient coefficient is smallest as the direction (Dir) having the high correlation.

The direction (Dir) that has the high correlation corresponds to a direction in which a change rate of the pixel value is small, that is, an edge direction.

Next, in step S242 illustrated in FIG. 26, the interpolation processing unit 104 determines whether the upward sloping gradient coefficient: Agrad is smallest and the correlation of the upward sloping direction is highest on the basis of the comparison of the four gradient coefficients of the vertical gradient coefficient: Vgrad, the upward sloping gradient coefficient: Agrad, the downward sloping gradient coefficient: Dgrad, and the horizontal gradient coefficient: Hgrad.

In step S242, when it is determined that the correlation of the downward sloping direction is highest, the processing proceeds to step S251.

In other cases, the processing proceeds to step S243.

When it is determined that the correlation of the upward sloping direction is highest in step S242 and the processing proceeds to step S251, in step S251, the interpolation processing unit 104 executes the interpolation processing using the reference pixels of the upward sloping direction with respect to the selected interpolation object pixels (PL pixels). The pixels that are selected as the reference pixels are pixels that have the same colors as the selected interpolation object pixels (PL pixels) and are at least the N pixels (non-polarization pixels) that are closest to the interpolation object pixels (PL pixels).

Specifically, the interpolation processing unit 104 selects the two or more pixels having the same color in the upper N pixel region and the lower N pixel region of the PL pixel region along the line of the upward sloping direction of the selected interpolation object pixels (PL pixels) as the reference pixels and executes the linear interpolation processing to which the pixel values of the reference pixels are applied.

Meanwhile, in step S242, when it is determined that the correlation of the upward sloping direction is not highest, the processing proceeds to step S243.

In step S243, the interpolation processing unit 104 determines whether the downward sloping gradient coefficient: Dgrad is smallest and the correlation of the downward sloping direction is highest on the basis of the comparison of the four gradient coefficients of the vertical gradient coefficient: Vgrad, the upward sloping gradient coefficient: Agrad, the downward sloping gradient coefficient: Dgrad, and the horizontal gradient coefficient: Hgrad.

In step S243, when it is determined that the correlation of the downward sloping direction is highest, the processing proceeds to step S252.

In other cases, the processing proceeds to step S244.

When it is determined that the correlation of the upward sloping direction is highest in step S243 and the processing proceeds to step S252, in step S252, the interpolation processing unit 104 executes the interpolation processing using the reference pixels of the downward sloping direction with respect to the selected interpolation object pixels (PL pixels). The pixels that are selected as the reference pixels are pixels that have the same colors as the selected interpolation object pixels (PL pixels) and are at least the N pixels (non-polarization pixels) that are closest to the interpolation object pixels (PL pixels).

Specifically, the interpolation processing unit 104 selects the two or more pixels having the same color in the upper N pixel region and the lower N pixel region of the PL pixel region along the line of the downward sloping direction of the selected interpolation object pixels (PL pixels) as the reference pixels and executes the linear interpolation processing to which the pixel values of the reference pixels are applied.

In step S243, when it is determined that the correlation of the downward sloping direction is not highest, the processing proceeds to step S244. In step S244, the interpolation processing unit 104 determines whether the vertical gradient coefficient: Vgrad is smallest and the correlation of the vertical direction is highest, on the basis of the comparison of the four gradient coefficients of the vertical gradient coefficient: Vgrad, the upward sloping gradient coefficient: Agrad, the downward sloping gradient coefficient: Dgrad, and the horizontal gradient coefficient: Hgrad.

In step S244, when it is determined that the correlation of the vertical direction is highest, the processing proceeds to step S253.

In other cases, the processing proceeds to step S254.

When it is determined that the correlation of the vertical direction is highest in step S244 and the processing proceeds to step S253, in step S253, the interpolation processing unit 104 executes the interpolation processing using the reference pixels of the vertical direction with respect to the selected interpolation object pixels (PL pixels). The pixels that are selected as the reference pixels are pixels that have the same colors as the selected interpolation object pixels (PL pixels) and are at least the N pixels (non-polarization pixels) that are closest to the interpolation object pixels (PL pixels).

Specifically, the interpolation processing unit 104 selects the two or more pixels having the same color in the upper N pixel region and the lower N pixel region of the PL pixel region along the line of the vertical direction of the selected interpolation object pixels (PL pixels) as the reference pixels and executes the linear interpolation processing to which the pixel values of the reference pixels are applied.

In step S244, when it is determined that the correlation of the vertical direction is not highest, the processing proceeds to step S254. That is, this case is in which it is determined that the correction of the horizontal direction is highest.

In step S254, the interpolation processing unit 104 executes the interpolation processing using the reference pixels of the horizontal direction with respect to the selected interpolation object pixels (PL pixels). The pixels that are selected as the reference pixels are the PL pixels that have the same colors as the selected interpolation object pixels (PL pixels).

A specific example of the interpolation processing of the horizontal direction will be described with reference to FIG. 27.

Figure 27:
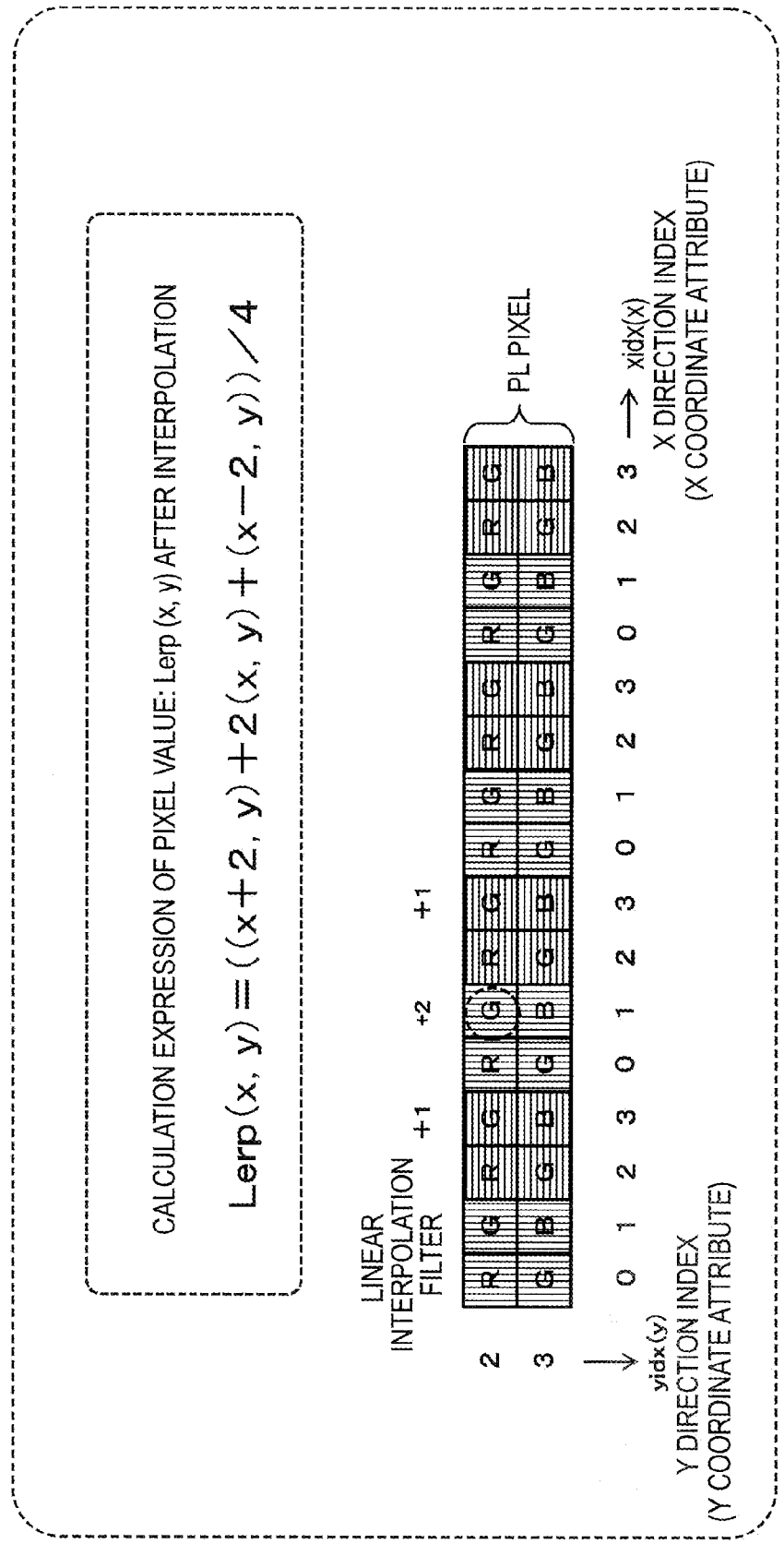
FIG. 27 is a flowchart illustrating a specific example of interpolation processing that is executed by the interpolation processing unit.

FIG. 27 illustrates an example of an expression to calculate an interpolation pixel value: Lerp (x, y) of the PL pixel becoming the interpolation object pixel by linear interpolation and a linear filter applied to the linear interpolation.

The interpolation pixel value: Lerp (x, y) of the PL pixel (x, y) that becomes the interpolation object pixel is calculated by the following expression.

$$Lerp(x,y)=((x+2,y)+2(x,y)+(x-2,y))/4$$

This expression is an expression to calculate the interpolation pixel value by adding the pixel value of the interpolation object pixel and the pixel values of the pixels positioned at the left and right sides of the interpolation object pixel, closest to the interpolation object pixel, and having the same color after setting the weight of 1:2:1.

As can be understood from the filter setting example of FIG. 27, when the interpolation processing of the G pixel of the vertical polarization region is executed, the pixel values of the G pixels of the left and right horizontal polarization regions are used as the pixel values of the reference pixels.

That is, in this processing example, when the interpolation of the horizontal direction of the PL pixel is executed, the interpolation using the right eye pixel as the reference pixel is executed in the case of the interpolation of the left eye pixel and the interpolation using the left eye pixel as the reference pixel is executed in the case of the interpolation of the right eye pixel.

The interpolation of the horizontal direction is executed when the reflection light is not included and the change rates of the pixel values of the horizontal direction are lower than the change rates of the pixel values of the other directions and when it is determined that the correction of the horizontal direction is high.

Because the reflection light is not included and it is determined that the difference of the pixel values between the pixels having the different polarization directions is small, the possibility of incorrectly setting the pixel values is low, even when the processing is executed using the pixels of the different polarization directions as the reference pixels.

The interpolation processing example 1 with respect to the image photographed in the 3D image photographing mode has been described.

For a summary of the interpolation processing, the processing that is executed by the image correcting unit 100 illustrated in FIGS. 8 and 9 can be summarized as follows.
(a) Correction of the brightness of the PL pixel and the pixel adjacent to the PL pixel with the same brightness level as the N pixel not adjacent to the PL pixel
(b) Detection of the gradient information corresponding to each PL pixel becoming the interpolation processing object
(c) Detection of reflection information on whether reflection light is included in each PL pixel becoming the interpolation processing object
(d) Output of the PL pixel in which the brightness correction and the interpolation processing using the N pixels of the direction having the high correlation to be selected from the three directions of the vertical direction, the upward sloping direction, and the downward sloping direction as the reference pixels are performed, when the PL pixel becoming the interpolation processing object includes the reflection light
(e) Output of the PL pixel in which the brightness correction and the interpolation processing using the N pixels of the direction having the high correlation to be selected from the four directions of the vertical direction, the upward sloping direction, the downward sloping direction, and the horizontal direction as the reference pixels are performed, when the PL pixel becoming the interpolation processing object does not include the reflection light The image correcting unit 100 generates the interpolation image, that is, the interpolation image (2D-Raw image) 62 illustrated in FIG. 8, by the processing.

[2-(3). Interpolation Processing Example 2 with respect to Image Photographed in 3D Image Photographing Mode]

Next, the interpolation processing example 2 with respect to the image photographed in the 3D image photographing mode will be described.

The interpolation processing example to be described below is an example of interpolation processing that is executed in the image correcting unit 100 with respect to the image photographed in the 3D mode.

In this embodiment, the entire configuration of the imaging apparatus is the same as the configuration illustrated in FIGS. 1A to 1C and the configuration of the image processing unit 17 is the same as the configuration illustrated in FIG. 8.

The configuration of the image correcting unit 100 of the image processing unit 17 is the same as the configuration illustrated in FIG. 9.

As illustrated in FIG. 9, the image correcting unit 100 includes a brightness correcting unit 101, a gradient detecting unit 102, a reflection detecting unit 103, and an interpolation processing unit 104.

As described above, the image correcting unit 100 receives the total pixel signal 81 from the polarization pixel separating unit 51 illustrated in FIG. 8.

That is, the image correcting unit 100 receives the N pixel (non-polarization pixel) signal configured by the total transmission pixels and the PL pixel (polarization pixel) signal.

In this embodiment, only the processing of the brightness correcting unit 100 of the image correcting unit 100 in 2-(2). Interpolation Processing Example 1 with respect to Image Photographed in 3D Image Photographing Mode described above is changed. The other processing, that is, the processing of each of the gradient detecting unit 102, the reflection detecting unit 103, and the interpolation processing unit 104, is the same processing as the processing already described in 2-(2). Interpolation Processing Example 1 with respect to Image Photographed in 3D Image Photographing Mode.

Figure 28:
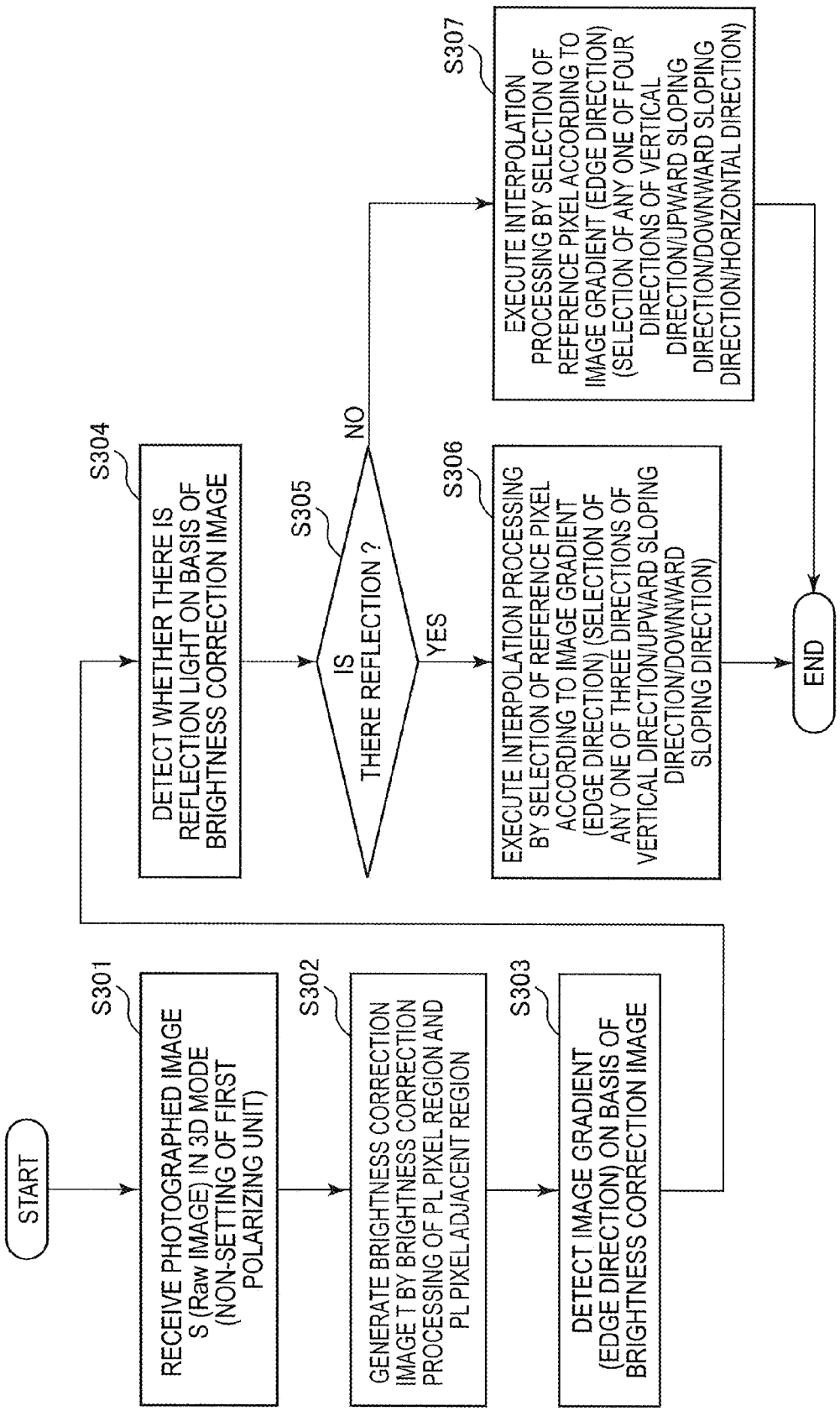
FIG. 28 is a flowchart illustrating an example of a sequence of processing that is executed by the image correcting unit.

FIG. 28 is a flowchart illustrating a sequence of processing that is executed by the image correcting unit 100 according to this embodiment.

In step S301, the image correcting unit 100 receives an image S (Raw image) that is photographed in the 3D mode (setting of the first polarizing unit).

In step S302, the image correcting unit 100 generates a brightness correction image T by the brightness correction processing of the PL pixel region and the PL pixel peripheral area.

In this processing example, the brightness correction processing becomes processing different from the processing already described in 2-(2). Interpolation Processing Example 1 with respect to Image Photographed in 3D Image Photographing Mode.

The other processing, that is, the processing of steps S303 to S307, becomes the same processing as the processing of steps S203 to S207 of the flow illustrated in FIG. 23 that has already been described as the processing of 2-(2). Interpolation Processing Example 1 with respect to Image Photographed in 3D Image Photographing Mode.

The detailed configuration of the brightness correction processing of step S302 in this processing example will be described with reference to FIGS. 29 and 30.

Figure 29:
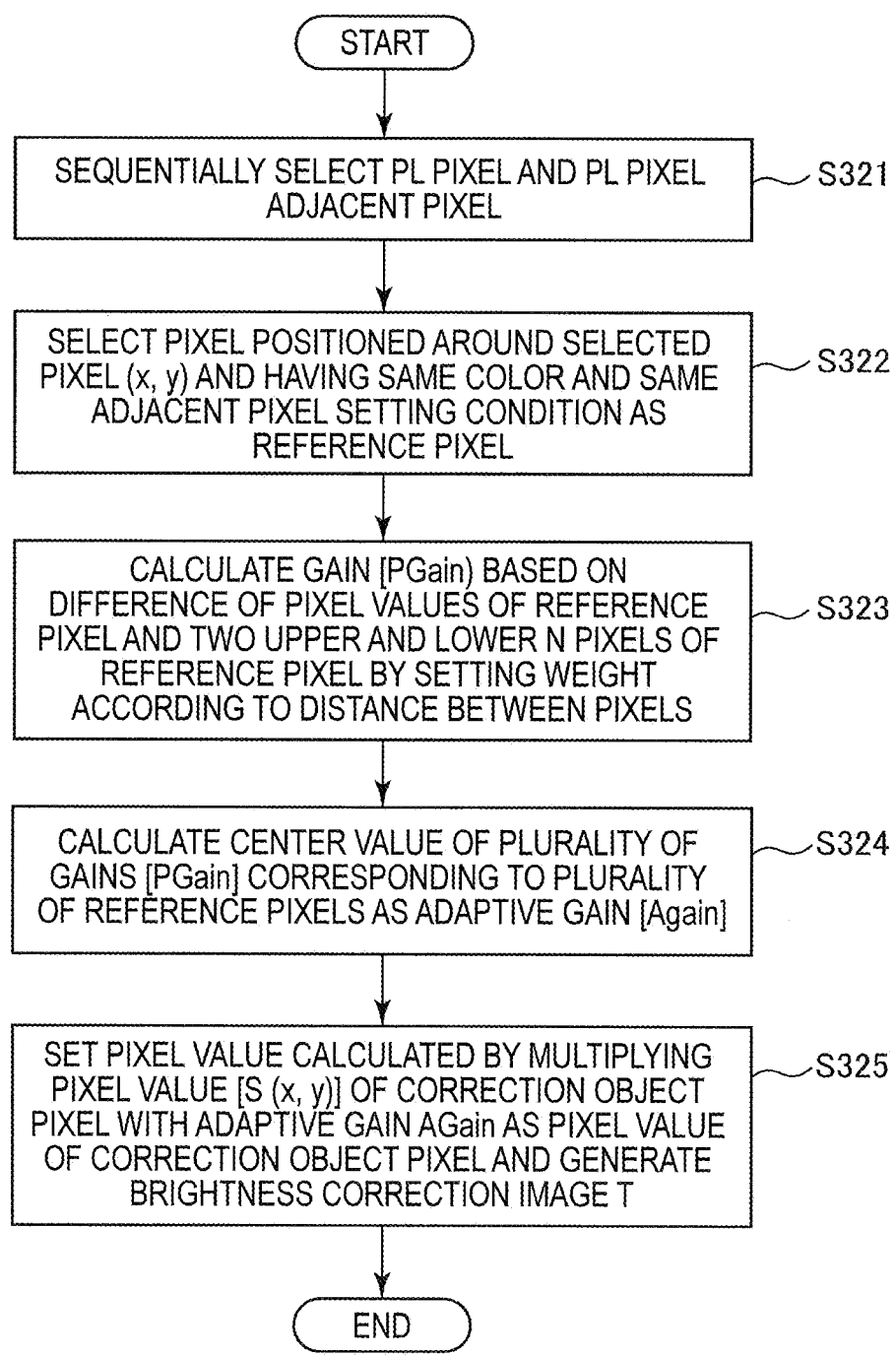
FIG. 29 is a flowchart illustrating a specific example of brightness correction processing that is executed by the brightness correcting unit.

A flowchart illustrated in FIG. 29 is a flowchart illustrating a detailed sequence of the brightness correction processing of step S302 of the flow illustrated in FIG. 28.

The processing of each step will be described.

First, in step S321, the brightness correcting unit 101 of the image correcting unit 100 illustrated in FIG. 9 selects one of the PL pixels and the PL pixel adjacent pixels that become the brightness correction objects.

In this processing example, the brightness correction object pixels are the PL pixels and the PL pixel adjacent pixels, similar to the processing example described above.

In step S322, the brightness correcting unit 101 selects the pixels having the same color and the same adjacent pixel setting condition as the reference pixels from the peripheral region of the pixel (x, y) selected as the brightness correction object.

A specific example of the pixel selection will be described with reference to FIG. 30.

Figure 30:
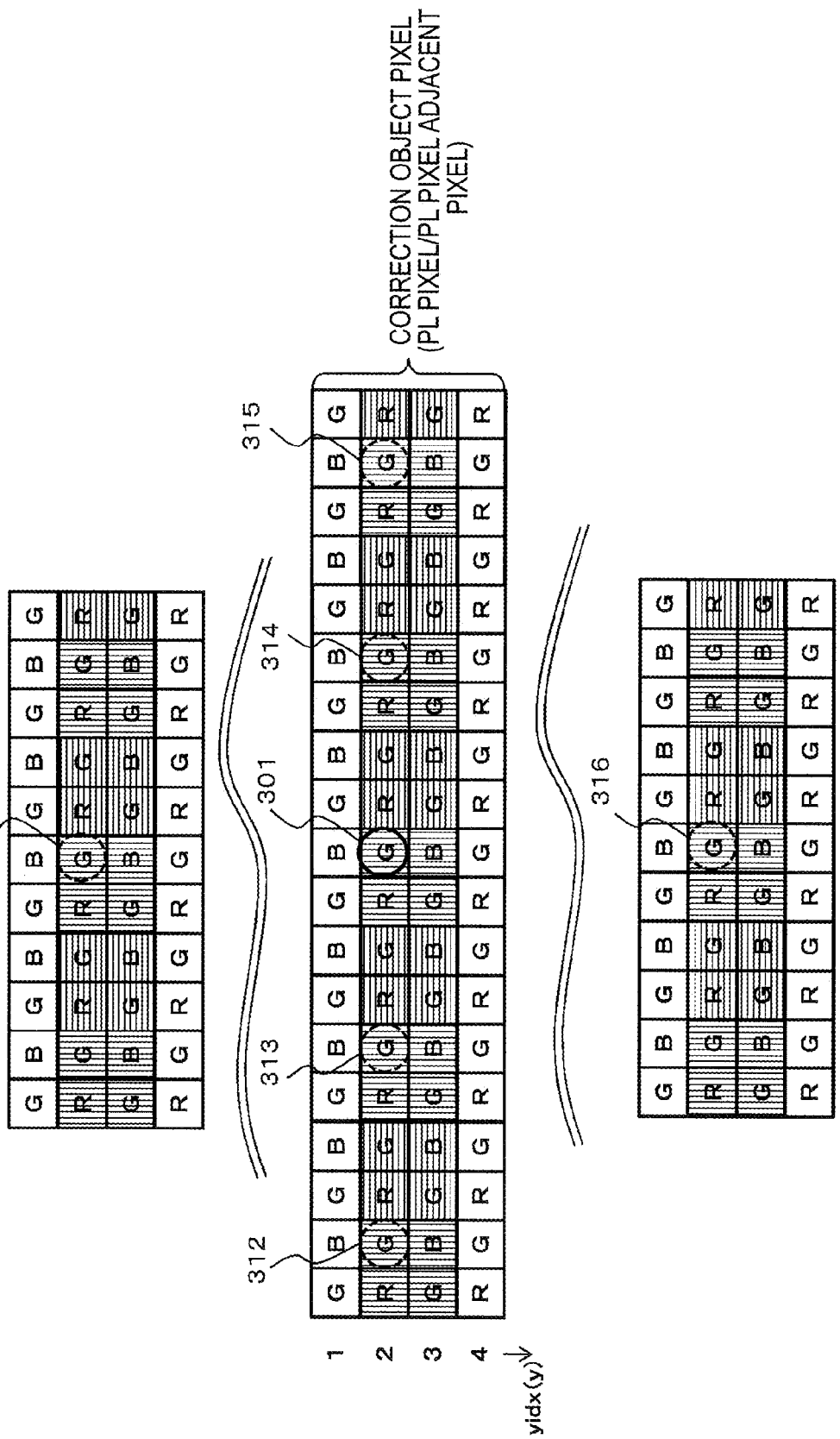
FIG. 30 is a diagram illustrating a specific example of brightness correction processing that is executed by the brightness correcting unit.

FIG. 30 illustrates an example of reference pixels 311 to 316 when a G pixel 301 in the PL pixel region is selected as the brightness correction object pixel.

The reference pixels 311 to 316 are pixels that have the same color and the same adjacent pixel setting condition as the G pixel 301 selected as the brightness correction object.

All of the reference pixels 311 to 316 are vertical polarization pixels of the G pixels and are pixels in which setting of the eight peripheral pixels is the same.

These pixels are selected as the reference pixels.

Next, in step S323, gain (PGain) based on the difference (ratio) of the pixel values with the two upper and lower N pixels is calculated with respect to each of the selected reference pixels. Processing for calculating the gain (PGain) is the same processing as the processing for calculating the gain already described with reference to FIG. 14 (reference diagram).

In the processing that has already been described with reference to FIG. 14, only the gain that corresponds to one interpolation object pixel is calculated. However, in this processing example, seven gains (PGain) that correspond to a total of seven pixels including the interpolation object pixel and the six reference pixels having the same condition positioned around the interpolation object pixel are calculated.

Next, in step S324, a center value (median value) is calculated from the seven gains (PGain) corresponding to the total of seven pixels including the interpolation object pixel and the six reference pixels having the same condition positioned around the interpolation object pixel, which are calculated in step S323.

The center value is used as adaptive gain (AGain).

Finally, in step S325, the pixel value [S (x, y)] of the correction object pixel is multiplied by the adaptive gain (PGain) and the brightness correction pixel value is calculated.

This processing is executed with respect to all of the PL pixels and the PL pixel adjacent pixels, the brightness correction is performed, the obtained values are set as the pixel values of the PL pixels and the PL pixel adjacent pixels, and the brightness correction image T is generated.

In this processing example, when the brightness of the PL pixels and the PL pixel adjacent pixels is corrected, the gains according to the pixel value ratios (brightness ratios) of the reference pixels and the peripheral N pixels are calculated by referring to the correction object pixel and the plurality of pixels having the same condition positioned around the correction object pixel and the center value of the plurality of gains is finally calculated as the gain applied to the brightness correction of the interpolation pixel.

By this processing, even when an error is generated in the interpolation pixel or the N pixels around the interpolation pixel, the brightness correction in which an influence of the error is decreased can be performed.

[2-(4) Interpolation Processing Example 3 with Respect to Image Photographed in a 3D Image Photographing Mode]

Next, the interpolation processing example 3 with respect to the image photographed in the 3D image photographing mode will be described.

In the interpolation processing examples with respect to the image photographed in the 3D image photographing mode, that is, the interpolation processing example 1 with respect to the image photographed in the 3D image photographing mode and the interpolation processing example 2 with respect to the image photographed in the 3D image photographing mode, the processing with respect to the photographed image when the setting of the second polarizing unit 15 is the region setting described with reference to FIG. 11 is executed.

That is, the PL pixel (polarization pixel) regions of the two rows in which the vertical polarization region 15V and the horizontal polarization region 15H are set and are alternately arranged in units of rectangular regions including the four pixels of 2×2 and the N pixel (non-polarization pixel) regions 15A, which are the total transmission pixels of the fourteen rows, are repetitively arranged in the vertical direction (Y direction).

The image processing apparatus according to the present disclosure can be applied to the image to which the polarization region is set and an image to which another polarization region is set.

Figure 31:
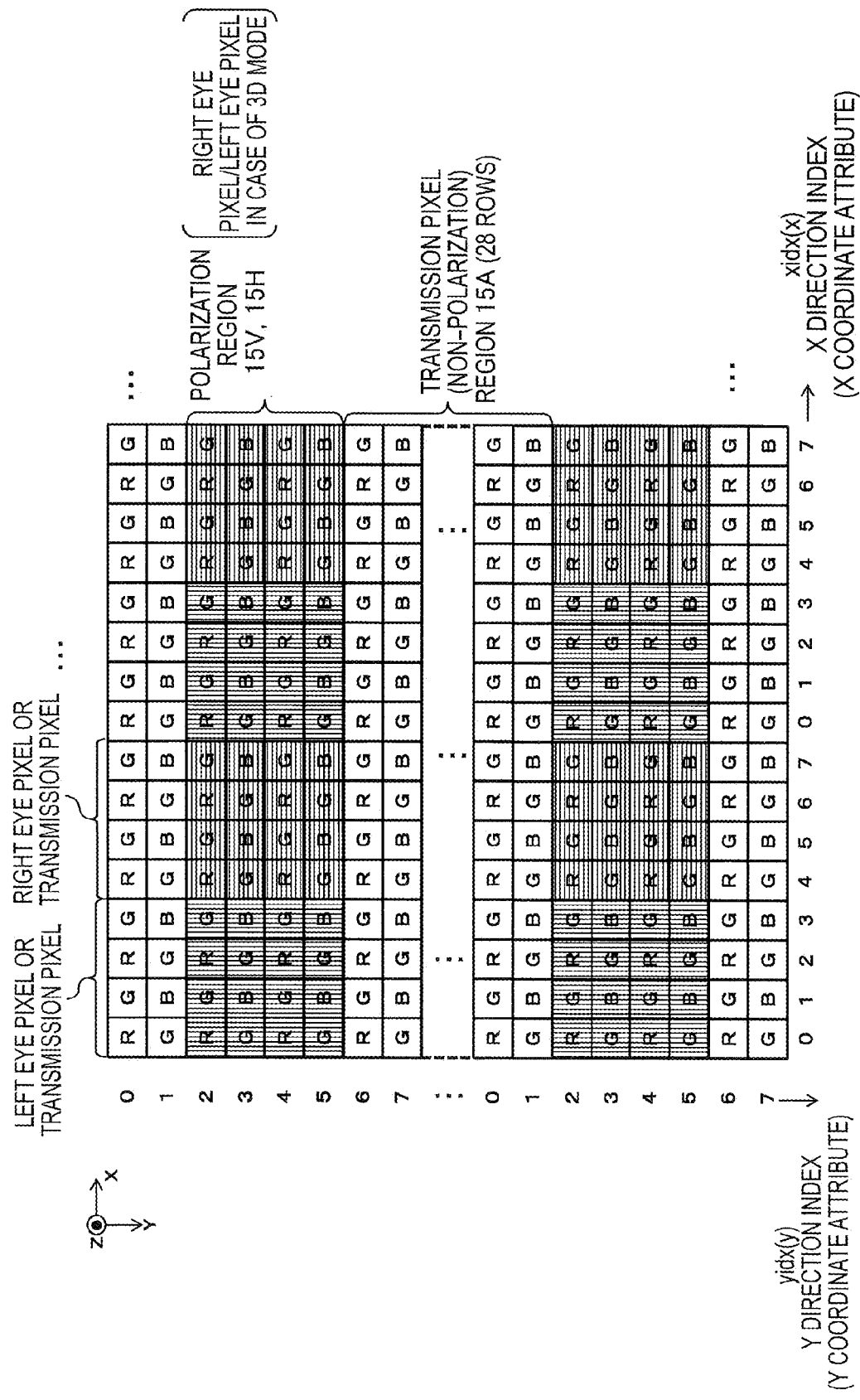
FIG. 31 is a diagram illustrating an example of an input image (Raw image) of the image correcting unit 100 and a setting example of an index to determine an attribute of each pixel of an image.

For example, a configuration illustrated in FIG. 31 may be used as the setting of the polarization region.

That is, PL pixel (polarization pixel) regions of four rows in which the vertical polarization region 15V and the horizontal polarization region 15H are set and are alternately arranged in unit of rectangular regions including sixteen pixels of 4×4 and the N pixel (non-polarization pixel) regions 15A, which are the total transmission pixels of twenty eight rows, are repetitively arranged in the vertical direction (Y direction).

For example, the image correcting unit 100 illustrated in FIGS. 8 and 9 can apply the same processing as the processing example described above to the photographed image having the polarization region of the above setting and execute the interpolation processing of the PL pixels.

Specifically, the following processing is executed.

(a) Correction of the brightness of the PL pixel and the pixel adjacent to the PL pixel with the same brightness level as the N pixel not adjacent to the PL pixel, (b) Detection of the gradient information corresponding to each PL pixel becoming the interpolation processing object, (c) Detection of reflection information on whether reflection light is included in each PL pixel becoming the interpolation processing object, (d) Output of the PL pixel in which the brightness correction and the interpolation processing using the N pixels of the direction having the high correlation to be selected from the three directions of the vertical direction, the upward sloping direction, and the downward sloping direction as the reference pixels are performed when the PL pixel becoming the interpolation processing object includes the reflection light, (e) Output of the PL pixel in which the brightness correction and the interpolation processing using the N pixels of the direction having the high correlation to be selected from the four directions of the vertical direction, the upward sloping direction, the downward sloping direction, and the horizontal direction as the reference pixels are performed when the PL pixel becoming the interpolation processing object does not include the reflection light.

The image correcting unit 100 generates the interpolation image, that is, the interpolation image (2D-Raw image) 62 illustrated in FIG. 8, by the processing.

However, as illustrated in FIG. 31, indexes (xindx (x), yindx (y)) to determine attributes of the pixels are changed according to the setting change of the polarization region.

FIG. 32 illustrates a setting example of the indexes showing the pixel attributes.

As illustrated in FIG. 32, kinds of the indexes showing the pixel attributes are as follows.
(1) X Coordinate Attribute (X index) [xidx (x)]
(2) Y Coordinate Attribute (Y index) [yidx (y)]
(3) Viewing Point Attribute (viewing point index) [ep (x, y)]
(4) Color Attribute (color index) [color (x, y)]

A correspondence relation between a value of each attribute (index) and identification information is as follows.
(1) X Coordinate Attribute (X index) [xidx (x)]
xidx (x)=0, 1, 2, 3: left eye pixels or non-polarization (total transmission) pixels of column including left eye pixels
xidx (x)=4, 5, 6, 7: right eye pixels or non-polarization (total transmission) pixels of column including right eye pixels
(2) Y Coordinate Attribute (Y index) [yidx (y)]
yindx (y)=0, 7: non-polarization (total transmission) pixels apart from polarization pixel (PL pixel)
yindx (y)=1, 6: non-polarization (total transmission) pixels apart from polarization pixel (PL pixel)
yindx (y)=2, 3, 4, 5: polarization pixels (PL pixels)
(3) Viewing Point Attribute (viewing point index) [ep (x, y)]
ex (x, y)=0: total transmission pixel (non-polarization pixel)
ex (x, y)=−1: left eye pixel (vertical polarization pixel)
ex (x, y)=+1: right eye pixel (horizontal polarization pixel)
(4) Color Attribute (color index) [color (x, y)]
Color (x, y)=0: red (R) pixel
Color (x, y)=1: green (G) pixel
Color (x, y)=2: blue (B) pixel The image correcting unit 100 sets the index to correspond to the pixel of the input processing object image and executes processing based on the index information.

The image correcting unit 100 determines the pixel attributes according to the indexes set according to the setting of the polarization region, executes each processing of (a) to (e) described above, and executes the interpolation processing of the PL pixels and the PL pixel adjacent pixels. In this processing, basic processing is the same even when a setting aspect of the polarization region is changed in various forms. However, the pixel positions of the reference pixels or the filters applied in the filter processing should be changed appropriately according to the pixel arrangement.

In the interpolation processing that is executed by the interpolation processing unit 104 in the image correcting unit 100 illustrated in FIG. 9, a direction of the reference pixels is selected according to the gradient information and presence or absence of the reflection light.

When there is reflection light, the direction having the highest correlation among the directions other than the horizontal direction, that is, applying the PL pixel as the reference pixel is selected as the reference pixel direction.

When there is no reflection light, the direction having the highest correlation among the directions including the horizontal direction is selected as the reference pixel direction.

In the embodiment described above, the four directions of the vertical direction, the horizontal direction, the upward sloping direction, and the downward sloping direction are set as the gradient detection directions.

However, only the vertical direction and the horizontal direction may be set as the gradient detection directions and the reference direction may be selected from the two directions on the basis of the reflection information and the gradient information.

[3. Summary of Configuration of Present Disclosure]

The configuration of the present disclosure has been described with reference to the specific embodiments. However, it will be apparent to those skilled in the art that various modifications and substitutions can be made without departing from the scope of the present disclosure. Therefore, it should be understood that the above embodiments are not limitative in all aspects. The scope of the present disclosure is defined by the appended claims.

Additionally, the present technology may also be configured as below.
(1) An image processing apparatus including:
a first polarizing unit that has a first polarization region and a second polarization region to transmit different polarized light corresponding to different viewing point images;
a second polarizing unit that causes transmission light of the first polarizing unit to be incident and includes a third polarization region to transmit only the transmission light of the first polarization region, a fourth polarization region to transmit only transmission light of the second polarization region, and a total transmission region to transmit the transmission light of the first polarization region and the second polarization region;
an imaging element that receives the transmission light of the second polarizing unit; and
an image processing unit that executes signal processing with respect to an output signal of the imaging element,
wherein the image processing unit includes:
a parallax detecting unit that applies two different viewing point images of an image based on the transmission light of the third polarization region of the second polarizing unit and an image based on the transmission light of the fourth polarization region of the second polarizing unit and generates parallax information in which an object distance is reflected;
an image correcting unit that executes correction processing with respect to an input image from the imaging element and generates a two-dimensional image; and
a parallax image generating unit that applies the parallax information generated by the parallax detecting unit, executes image conversion processing of the two-dimensional image generated by the image correcting unit, and generates a left eye image and a right eye image for three-dimensional image display.
(2) The image processing apparatus according to (1),
wherein the image correcting unit includes:
a brightness correcting unit that executes brightness correction to match brightness of polarization region pixels (PL pixels) and polarization region pixel adjacent pixels (PL pixel adjacent pixels), which are pixels corresponding to the third polarization region and the fourth polarization region of the second polarizing unit, with brightness of total transmission region pixels (N pixels) corresponding to the total transmission region;
a reflection detecting unit that generates reflection information, which is determination information on whether a reflection light component is included in each pixel value, in units of polarization region pixels (PL pixels);
a gradient detecting unit that generates gradient information corresponding to pixel value change rates of a plurality of directions of peripheral pixels in units of polarization region pixels (PL pixels); and
an interpolation processing unit that selects reference pixels according to the reflection information and the gradient information, applies pixel values of the selected reference pixels, and executes pixel value interpolation processing of the polarization region pixels (PL pixels).
(3) The image processing apparatus according to (1) or (2),
wherein the interpolation processing unit determines a direction having a high correlation in which a gradient is small on the basis of gradient information of non-polarization region pixels (N pixels) becoming interpolation processing objects, and executes interpolation processing using pixels in the direction having the high correlation as the reference pixels.

(4) The image processing apparatus according to any one of (1) to (3), wherein the interpolation processing unit determines a direction having a high correlation in which a gradient is small on the basis of gradient information of non-polarization region pixels (N pixels) becoming interpolation processing objects, and executes interpolation processing using the non-polarization region pixels (N pixels) in the direction having the high correlation as the reference pixels.

(5) The image processing apparatus according to any one of (1) to (4), wherein, when reflection information of the polarization region pixels (PL pixels) becoming interpolation processing objects shows that there is reflection, the interpolation processing unit selects non-polarization region pixels (N pixels) in a direction having a high correlation as the reference pixels on the basis of the gradient information, and executes interpolation processing to which the selected reference pixels are applied.

(6) The image processing apparatus according to any one of (1) to (5), wherein, when reflection information of the polarization region pixels (PL pixels) becoming interpolation processing objects shows that there is no reflection, the interpolation processing unit selects non-polarization region pixels (N pixels) in a direction having a high correlation or the polarization region pixels (PL pixels) as the reference pixels on the basis of the gradient information, and executes interpolation processing to which the selected reference pixels are applied.

(7) The image processing apparatus according to any one of (1) to (6), wherein, in interpolation processing with respect to a photographed image of a 2D mode photographed in a state in which the first polarizing unit is removed from an optical path, the interpolation processing unit outputs a pixel value in which the brightness is corrected by the brightness correcting unit, without executing the interpolation processing of the polarization region pixels (PL pixels), when reflection information of the polarization region pixels (PL pixels) becoming interpolation processing objects shows that there is no reflection.

(8) The image processing apparatus according to any one of (1) to (7), wherein the brightness correcting unit calculates gains corresponding to brightness ratios with the total transmission region pixels (N pixels) around the polarization region pixels (PL pixels) or the polarization region pixel adjacent pixels (PL pixel adjacent pixels) becoming brightness correction objects, multiplies the brightness correction object pixels with the calculated gains, and executes brightness correction.

(9) The image processing apparatus according to any one of (1) to (8), wherein the reflection detecting unit detects a difference of a pixel value of an imaging element corresponding to a position of the third polarization region of the second polarizing unit and a pixel value of an imaging element corresponding to a position of the fourth polarization region of the second polarizing unit and generates reflection information, which is determination information on whether a reflection light component is included in a pixel value of the polarization region pixel (PL pixel), on the basis of the difference.

(10) The image processing apparatus according to any one of (1) to (9), wherein the image correcting unit sets an index showing a pixel attribute in units of pixels forming an output image from the imaging element and determines processing according to the index.

(11) The image processing apparatus according to any one of (1) to (10), wherein the index includes a coordinate attribute showing a pixel position, a viewing point attribute showing a viewing point position, and a color attribute showing a pixel color.

A method of the processing that is executed in the apparatus and a program for executing the processing are included in the configuration of the present disclosure.

The series of processes described in the present disclosure can be executed by hardware, software, or a combination of the hardware and the software. When the series of processes is executed by the software, a program having a recorded processing sequence may be installed in a memory in a computer embedded in dedicated hardware and may be executed or may be installed in a general-purpose computer in which various processing can be executed and may be executed. For example, the program may be recorded previously in a recording medium. The program may be installed from the recording medium to the computer or the program may be received through a network such as a local area network (LAN) and the Internet and may be installed in the recording medium such as an embedded hard disk.

The various processing described in the present disclosure may be executed temporally according to the order described or may be executed in parallel or individually according to the processing capability of an apparatus executing the processing or the necessity. In the present disclosure, a system has a logical set configuration of a plurality of apparatuses and each apparatus may not be provided in the same casing.

As described above, according to one embodiment of the present disclosure, a configuration that executes interpolation processing of a two-dimensional image used for generating an image to be applied to three-dimensional image display is provided.

For example, an image processing apparatus according to the present disclosure includes a first polarizing unit that has a first polarization region and a second polarization region to transmit different polarized light corresponding to different viewing point images, a second polarizing unit that includes a third polarization region to transmit only transmission light of the first polarization region, a fourth polarization region to transmit only transmission light of the second polarization region, and a total transmission region to transmit the total transmission light of the first polarization region and the second polarization region, an imaging element, and an image processing unit that executes signal processing with respect to an output signal of the imaging element. In this configuration, the image processing unit executes correction processing to which presence or absence of reflection light or gradient information is applied, with respect to an input image from the imaging element, and generates a two-dimensional image. The image processing unit applies parallax information generated on the basis of each transmission light of the third polarization region and the fourth polarization region, executes image conversion of the two-dimensional image, and generates a left eye image and a right eye image for three-dimensional image display.

By this configuration, a two-dimensional image that has a small error can be generated by interpolation processing based on the reflection light or the gradient information and a left eye image and a right eye image for high-definition three-dimensional image display can be generated by 2D3D conversion processing based on the two-dimensional image having high quality.

The present disclosure contains subject matter related to that disclosed in Japanese Priority Patent Application JP 2011-152885 filed in the Japan Patent Office on Jul. 11, 2011, the entire content of which is hereby incorporated by reference.

What is claimed is:

1. An image processing apparatus comprising:
a first polarizing unit which includes a first polarization region and a second polarization region and configured to transmit different polarized light corresponding to different viewing point images;
a second polarizing unit configured to cause transmission light of the first polarizing unit to be incident and includes a third polarization region to transmit only the transmission light of the first polarization region, a fourth polarization region to transmit only transmission light of the second polarization region, and a total transmission region to transmit the transmission light of the first polarization region and the second polarization region;
an imaging element configured to receive the transmission light of the second polarizing unit; and
an image processing unit configured to execute signal processing with respect to an output signal of the imaging element, wherein the image processing unit includes:
a parallax detecting unit configured to apply two different viewing point images of an image based on the transmission light of the third polarization region of the second polarizing unit and an image based on the transmission light of the fourth polarization region of the second polarizing unit and generate parallax information in which an object distance is reflected;
a reflection detecting unit configured to generate reflection information, which is determination information on whether a reflection light component is included in each pixel value, in units of polarization region pixels (PL pixels);
an interpolation processing unit configured to select reference pixels according to the reflection information, apply pixel values of the selected reference pixels, and execute pixel value interpolation processing of the polarization region pixels (PL pixels); and
a parallax image generating unit configured to apply the parallax information generated by the parallax detecting unit.

2. The image processing apparatus according to claim 1, wherein the interpolation processing unit is further configured to determine a direction having a high correlation, and execute interpolation processing using pixels in the direction having the high correlation as the reference pixels.

3. The image processing apparatus according to claim 1, wherein the interpolation processing unit is further configured to determine a direction having a high correlation, and execute interpolation processing using non-polarization region pixels (N pixels) in the direction having the high correlation as the reference pixels.

4. The image processing apparatus according to claim 1, wherein, in response to reflection information of the polarization region pixels (PL pixels) becoming interpolation processing objects shows that there is reflection, the interpolation processing unit is configured to select non-polarization region pixels (N pixels) in a direction having a high correlation as the reference pixels, and execute interpolation processing to which the selected reference pixels are applied.

5. The image processing apparatus according to claim 1, wherein, in response to reflection information of the polarization region pixels (PL pixels) becoming interpolation processing objects shows that there is no reflection, the interpolation processing unit is configured to select non-polarization region pixels (N pixels) in a direction having a high correlation or the polarization region pixels (PL pixels) as the reference pixels, and execute interpolation processing to which the selected reference pixels are applied.

6. The image processing apparatus according to claim 1, wherein the reflection detecting unit is further configured to detect a difference of a pixel value of an imaging element corresponding to a position of the third polarization region of the second polarizing unit and a pixel value of an imaging element corresponding to a position of the fourth polarization region of the second polarizing unit and generate reflection information, which is determination information on whether a reflection light component is included in a pixel value of the polarization region pixel (PL pixel), on the basis of the difference.

7. An image processing method that is executed by an image processing apparatus, wherein the image processing apparatus includes:
a first polarizing unit which includes a first polarization region and a second polarization region and configured to transmit different polarized light corresponding to different viewing point images; a second polarizing unit configured to cause transmission light of the first polarizing unit to be incident and includes a third polarization region to transmit only the transmission light of the first polarization region, a fourth polarization region to transmit only transmission light of the second polarization region, and a total transmission region to transmit the transmission light of the first polarization region and the second polarization region; an imaging element configured to receive the transmission light of the second polarizing unit; and an image processing unit configured to execute signal processing with respect to an output signal of the imaging element, wherein the image processing method comprising:
applying two different viewing point images of an image based on the transmission light of the third polarization region of the second polarizing unit and an image based on the transmission light of the fourth polarization region of the second polarizing unit and generating parallax information in which an object distance is reflected;
generating reflection information which is determination information on whether a reflection light component is included in each pixel value, in units of polarization region pixels (PL pixels);
selecting reference pixels according to the reflection information;
applying pixels values of the selected reference pixels;
executing pixel value interpolation processing of the polarization region pixels (PL pixels); and
applying the generated parallax information.

8. At least one non-transitory computer-readable storage medium having encoded thereon executable instructions that, when executed by at least one processor, cause the at least one processor to carry out steps of operating an image processing apparatus that includes:
  a first polarizing unit which includes a first polarization region and a second polarization region and configured to transmit different polarized light corresponding to different viewing point images; a second polarizing unit configured to cause transmission light of the first polarizing unit to be incident and includes a third polarization region to transmit only the transmission light of the first polarization region, a fourth polarization region to transmit only transmission light of the second polarization region, and a total transmission region to transmit the transmission light of the first polarization region and the second polarization region; an imaging element configured to receive the transmission light of the second polarizing unit; and an image processing unit configured to execute signal processing with respect to an output signal of the imaging element, wherein the steps comprising:

applying two different viewing point images of an image based on the transmission light of the third polarization region of the second polarizing unit and an image based on the transmission light of the fourth polarization region of the second polarizing unit and generating parallax information in which an object distance is reflected;

generating reflection information, which is determination information on whether a reflection light component is included in each pixel value, in units of polarization region pixels (PL pixels);

selecting reference pixels according to the reflection information;

applying pixel values of the selected reference pixels;

executing pixel value interpolation processing of the polarization region pixels (PL pixels); and applying the generated parallax information.

* * * * *